United States Patent
Rockel et al.

(10) Patent No.: US 12,461,589 B2
(45) Date of Patent: Nov. 4, 2025

(54) DEVICES, METHODS, AND GRAPHICAL USER INTERFACES FOR GENERATING REMINDERS FOR A USER EXPERIENCE SESSION IN AN EXTENDED REALITY ENVIRONMENT

(71) Applicant: Apple Inc., Cupertino, CA (US)

(72) Inventors: Philipp Rockel, San Francisco, CA (US); Christine E. Welch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 18/375,323

(22) Filed: Sep. 29, 2023

(65) Prior Publication Data

US 2024/0404210 A1 Dec. 5, 2024

Related U.S. Application Data

(60) Provisional application No. 63/470,931, filed on Jun. 4, 2023.

(51) Int. Cl.
| | |
|---|---|
| *G06F 3/01* | (2006.01) |
| *G06F 3/16* | (2006.01) |
| *G06T 19/00* | (2011.01) |
| *G16H 20/70* | (2018.01) |
| *G16H 40/63* | (2018.01) |

(Continued)

(52) U.S. Cl.
CPC .............. *G06F 3/011* (2013.01); *G06F 3/012* (2013.01); *G06F 3/013* (2013.01); *G06F 3/167* (2013.01); *G06T 19/006* (2013.01); *G16H 20/70* (2018.01); *G16H 40/63* (2018.01); *G16H 40/67* (2018.01); *G16H 50/30* (2018.01); *G16H 50/70* (2018.01)

(58) Field of Classification Search
None
See application file for complete search history.

(56) References Cited

U.S. PATENT DOCUMENTS

| | | |
|---|---|---|
| 7,199,700 B1 | 4/2007 | Mcpherson et al. |
| 8,562,489 B2 | 10/2013 | Burton et al. |

(Continued)

FOREIGN PATENT DOCUMENTS

| | | |
|---|---|---|
| AU | 2014337787 A1 | 5/2016 |
| CN | 101822894 A | 9/2010 |

(Continued)

OTHER PUBLICATIONS

Advisory Action received for U.S. Appl. No. 15/372,133, mailed on Aug. 28, 2019, 7 pages.

(Continued)

*Primary Examiner* — Jwalant Amin
(74) *Attorney, Agent, or Firm* — DLA Piper LLP (US)

(57) ABSTRACT

The present disclosure describes user interfaces and techniques for providing reminders for a user experience session. In some embodiments, while a user experience session is active, a computer system detects a change in direction of attention of a user. In response to detecting the change in direction of attention of the user, the computer system outputs a reminder to focus attention on the user experience session if the attention of the user meets reminder criteria, and forgoes outputting the reminder if the attention of the user does not meet the reminder criteria.

48 Claims, 32 Drawing Sheets

(51) Int. Cl.
  *G16H 40/67* (2018.01)
  *G16H 50/30* (2018.01)
  *G16H 50/70* (2018.01)

(56) References Cited

U.S. PATENT DOCUMENTS

| | | | |
|---|---|---|---|
| 10,080,530 | B2 | 9/2018 | Cheng et al. |
| 11,931,625 | B2 | 3/2024 | D'Auria et al. |
| 2003/0171643 | A1 | 9/2003 | Noguchi et al. |
| 2004/0254501 | A1 | 12/2004 | Mault |
| 2005/0165609 | A1 | 7/2005 | Zuberec et al. |
| 2007/0129883 | A1 | 6/2007 | Kuo et al. |
| 2007/0208269 | A1 | 9/2007 | Mumford et al. |
| 2008/0072902 | A1 | 3/2008 | Setzer et al. |
| 2008/0319279 | A1 | 12/2008 | Ramsay et al. |
| 2009/0024047 | A1 | 1/2009 | Shipley et al. |
| 2009/0227425 | A1 | 9/2009 | Shirasaki et al. |
| 2009/0263773 | A1 | 10/2009 | Kotlyar et al. |
| 2009/0322686 | A1 | 12/2009 | Jayasinghe |
| 2010/0011307 | A1 | 1/2010 | Desfossez et al. |
| 2010/0035669 | A1 | 2/2010 | Jang et al. |
| 2010/0069774 | A1 | 3/2010 | Bingham et al. |
| 2010/0095961 | A1 | 4/2010 | Tornesel et al. |
| 2010/0273610 | A1 | 10/2010 | Johnson |
| 2010/0331145 | A1 | 12/2010 | Lakovic et al. |
| 2011/0138311 | A1 | 6/2011 | Palmer |
| 2012/0015778 | A1 | 1/2012 | Lee et al. |
| 2013/0139107 | A1 | 5/2013 | Jung |
| 2013/0333703 | A1 | 12/2013 | Wallace et al. |
| 2014/0018049 | A1 | 1/2014 | Cannon et al. |
| 2014/0316191 | A1 | 10/2014 | De Zambotti et al. |
| 2014/0344375 | A1 | 11/2014 | Hauser et al. |
| 2015/0096564 | A1 | 4/2015 | Cosnek |
| 2015/0238722 | A1 | 8/2015 | Al-Ali |
| 2015/0283337 | A1 | 10/2015 | Adams et al. |
| 2015/0342518 | A1 | 12/2015 | Persidsky et al. |
| 2016/0007911 | A1 | 1/2016 | Wu et al. |
| 2016/0058337 | A1 | 3/2016 | Blahnik et al. |
| 2016/0114213 | A1 | 4/2016 | Lee |
| 2017/0243508 | A1 | 8/2017 | Cheng et al. |
| 2017/0332972 | A1 | 11/2017 | Nagasaki et al. |
| 2017/0354795 | A1 | 12/2017 | Blahnik et al. |
| 2018/0329584 | A1 | 11/2018 | Williams et al. |
| 2018/0329672 | A1* | 11/2018 | Sadak .................. G06F 1/1649 |
| 2019/0035293 | A1 | 1/2019 | Mei |
| 2019/0314641 | A1 | 10/2019 | Malchano et al. |
| 2019/0320939 | A1 | 10/2019 | Orvis et al. |
| 2020/0149921 | A1 | 5/2020 | Hoffman et al. |
| 2020/0265744 | A1 | 8/2020 | Lim et al. |
| 2021/0113116 | A1 | 4/2021 | Chen et al. |
| 2021/0286502 | A1 | 9/2021 | Lemay et al. |
| 2021/0338971 | A1 | 11/2021 | Blahnik et al. |
| 2022/0080261 | A1 | 3/2022 | Li |
| 2022/0114877 | A1* | 4/2022 | Barnes ..................... G08B 5/36 |
| 2022/0160276 | A1 | 5/2022 | Suzuki et al. |
| 2022/0313080 | A1* | 10/2022 | Hernandez .............. A61B 3/09 |
| 2022/0374106 | A1 | 11/2022 | Arney et al. |
| 2023/0154126 | A1 | 5/2023 | Santhar et al. |
| 2023/0267059 | A1* | 8/2023 | Tan ..................... G06F 11/3058 709/223 |
| 2023/0306695 | A1 | 9/2023 | Rockel et al. |
| 2023/0347104 | A1 | 11/2023 | Blahnik et al. |
| 2024/0081689 | A1 | 3/2024 | Kailay et al. |
| 2024/0282037 | A1 | 8/2024 | Xu et al. |
| 2024/0424372 | A1 | 12/2024 | Lee et al. |

FOREIGN PATENT DOCUMENTS

| | | |
|---|---|---|
| CN | 102488501 A | 6/2012 |
| CN | 116051690 A | 5/2023 |
| CN | 118946871 A | 11/2024 |
| DE | 102021206259 A1 | 12/2021 |
| EP | 2311533 A1 | 4/2011 |
| EP | 2866103 A2 | 4/2015 |
| EP | 4176796 A1 | 5/2023 |
| GB | 2610435 A | 3/2023 |
| JP | 2003-305094 A | 10/2003 |
| JP | 2003-339809 A | 12/2003 |
| JP | 2007-190275 A | 8/2007 |
| JP | 2007-190276 A | 8/2007 |
| JP | 2008-279126 A | 11/2008 |
| JP | 2009-119068 A | 6/2009 |
| JP | 2010-104456 A | 5/2010 |
| JP | 2010-533541 A | 10/2010 |
| JP | 2012-19852 A | 2/2012 |
| JP | 2012-35055 A | 2/2012 |
| JP | 2012-524638 A | 10/2012 |
| JP | 2012-524639 A | 10/2012 |
| JP | 2012-228540 A | 11/2012 |
| JP | 2013-128659 A | 7/2013 |
| JP | 2013-131215 A | 7/2013 |
| JP | 2016-506838 A | 3/2016 |
| JP | 2018-504159 A | 2/2018 |
| JP | 6991621 B1 | 1/2022 |
| KR | 10-2010-0024503 A | 3/2010 |
| KR | 10-2013-0142412 A | 12/2013 |
| KR | 10-2014-0138361 A | 12/2014 |
| WO | 2004/082751 A1 | 9/2004 |
| WO | 2005/018737 A1 | 3/2005 |
| WO | 2008/110956 A1 | 9/2008 |
| WO | 2009/002577 A1 | 12/2008 |
| WO | 2012/117376 A1 | 9/2012 |
| WO | 2014/107795 A1 | 7/2014 |
| WO | 2015/039979 A1 | 3/2015 |
| WO | 2016/022204 A1 | 2/2016 |
| WO | 2016/036472 A1 | 3/2016 |
| WO | 2018/209152 A1 | 11/2018 |
| WO | WO-2021247312 A1 * | 12/2021 ............. G06F 3/013 |
| WO | 2022/212070 A1 | 10/2022 |
| WO | 2023/183340 A1 | 9/2023 |
| WO | 2024/220888 A1 | 10/2024 |

OTHER PUBLICATIONS

Advisory Action received for U.S. Appl. No. 15/372,133, mailed on Jun. 2, 2020, 5 pages.
ALLTHINGSGIZMO, "How to Multitask on the AppleWatch", Available Online at: https://www.youtube.com/watch?v=Mxt2tfABwLg, Jul. 12, 2015, 2 pages.
Applicant-Initiated Interview Summary received for U.S. Appl. No. 15/372,133, mailed on Dec. 23, 2019, 6 pages.
Applicant-Initiated Interview Summary received for U.S. Appl. No. 15/372,133, mailed on May 4, 2020, 5 pages.
Applicant-Initiated Interview Summary received for U.S. Appl. No. 15/372,133, mailed on Nov. 12, 2020, 5 pages.
Applicant-Initiated Interview Summary received for U.S. Appl. No. 17/345,092, mailed on Feb. 28, 2023, 5 pages.
Applicant-Initiated Interview Summary received for U.S. Appl. No. 17/550,806, mailed on Apr. 21, 2023, 2 pages.
Applicant-Initiated Interview Summary received for U.S. Appl. No. 17/550,806, mailed on Sep. 15, 2023, 2 pages.
Benson Amanda, "Health App of the Month: Move, The Daily Activity Reminder", ThinkHealth, Retrieved from the internet: https://thinkhealth.priorityhealth.com/health-app-of-the-month-move-the-daily-activity-reminder/, Mar. 12, 2015, pp. 1-4.
Breathe Deeply Now! for Windows Phone Version, Online Available at: https://www.appx4fun.com/apps/5402/, Feb. 15, 2015, 11 pages.
Daniel About Tech, "Workout App Full Review! (Apple Watch)", Available Online at: https://www.youtube.com/watch?v=aHXCNfSccoY, Feb. 19, 2019, 2 pages.
Decision to Grant received for Danish Patent Application No. PA201770384, mailed on Jun. 28, 2019, 2 pages.
Extended European Search Report received for European Patent Application No. 17810736.3, mailed Nov. 7, 2019, 10 pages.
Final Office Action received for U.S. Appl. No. 15/372,133, mailed on Apr. 6, 2020, 16 pages.
Final Office Action received for U.S. Appl. No. 15/372,133, mailed on Apr. 18, 2019, 14 pages.

(56) References Cited

OTHER PUBLICATIONS

Final Office Action received for U.S. Appl. No. 17/550,806, mailed on Aug. 1, 2023, 21 pages.
Gil Lory, "How to Use the Activity and Workout Apps on Apple Watch", Online Available at: https://www.macrumors.com/how-to/apple-watch-activity-workout-apps/, May 4, 2015, 5 pages.
Intention to Grant received for Danish Patent Application No. PA201770384, mailed on Mar. 13, 2019, 2 pages.
Intention to Grant received for Danish Patent Application No. PA201770384, mailed on Nov. 14, 2018, 2 pages.
Intention to Grant received for European Patent Application No. 17810736.3, mailed on Aug. 8, 2023, 8 pages.
International Preliminary Report on Patentability received for PCT Patent Application No. PCT/US2017/035309, mailed on Dec. 20, 2018, 28 pages.
International Search Report and Written Opinion received for PCT Patent Application No. PCT/US2017/035309, mailed on Sep. 27, 2017, 31 pages.
International Search Report and Written Opinion received for PCT Patent Application No. PCT/US2022/030309, mailed on Sep. 15, 2022, 14 pages.
International Search Report and Written Opinion received for PCT Patent Application No. PCT/US2023/015826, mailed on Jul. 31, 2023, 18 pages.
Invitation to Pay Additional Fee received for PCT Patent Application No. PCT/US2017/035309, mailed on Jul. 14, 2017, 2 pages.
Invitation to Pay Additional Fees and Partial International Search Report received for PCT Patent Application No. PCT/US2023/015826, mailed on Jun. 7, 2023, 10 pages.
iphonetricks.org, "Apple Watch Activity App Setup & Usage Tips", Online Available at: https://www.iphonetricks.org/apple-watch-activity-app-setup-usage-tips/, May 4, 2015, 4 pages.
Non-Final Office Action received for U.S. Appl. No. 15/372,133, mailed on Jul. 24, 2018, 13 pages.
Non-Final Office Action received for U.S. Appl. No. 15/372,133, mailed on Oct. 3, 2019, 14 pages.
Non-Final Office Action received for U.S. Appl. No. 15/372,133, mailed on Sep. 14, 2020, 17 pages.
Non-Final Office Action received for U.S. Appl. No. 17/345,092, mailed on Jan. 25, 2023, 36 pages.
Non-Final Office Action received for U.S. Appl. No. 17/550,806, mailed on Nov. 28, 2022, 21 pages.
Notice of Acceptance received for Australian Patent Application No. 2017277848, mailed on Apr. 20, 2020, 3 pages.
Notice of Acceptance received for Australian Patent Application No. 2020203453, mailed on Feb. 10, 2021, 3 pages.
Notice of Acceptance received for Australian Patent Application No. 2021203301, mailed on Feb. 23, 2022, 3 pages.
Notice of Allowance received for Chinese Patent Application No. 201710400594.9, mailed on Jul. 30, 2020, 2 pages (1 page of English Translation and 1 page of Official Copy).
Notice of Allowance received for Japanese Patent Application No. 2018-563158, mailed on Nov. 8, 2019, 4 pages (1 page of English Translation and 3 pages of Official Copy).
Notice of Allowance received for Japanese Patent Application No. 2019-222213, mailed on Aug. 30, 2021, 4 pages (1 page of English Translation and 3 pages of Official Copy).
Notice of Allowance received for Korean Patent Application No. 10-2018-7034689, mailed on Mar. 27, 2020, 6 pages (2 pages of English Translation and 4 pages of Official Copy).
Notice of Allowance received for Korean Patent Application No. 10-2020-7016741, mailed on Feb. 24, 2021, 5 pages (2 pages of English Translation and 3 pages of Official Copy).
Notice of Allowance received for Korean Patent Application No. 10-2021-7015702, mailed on Dec. 27, 2021, 3 pages (Official Copy Only) See Communication Under Rule 37 CFR § 1.98(a) (3).
Notice of Allowance received for Korean Patent Application No. 10-2022-7010343, mailed on Feb. 27, 2023, 6 pages (2 pages of English Translation and 4 pages of Official Copy).
Notice of Allowance received for Korean Patent Application No. 10-2023-7018493, mailed on Jul. 18, 2023, 7 pages (2 pages of English Translation and 5 pages of Official Copy).
Notice of Allowance received for U.S. Appl. No. 15/372,133, mailed on Feb. 11, 2021, 8 pages.
Notice of Allowance received for U.S. Appl. No. 15/372,133, mailed on Feb. 26, 2021, 3 pages.
Notice of Allowance received for U.S. Appl. No. 17/345,092, mailed on Apr. 10, 2023, 9 pages.
Office Action received for Australian Patent Application No. 2017277848, mailed on Aug. 28, 2019, 4 pages.
Office Action received for Australian Patent Application No. 2017277848, mailed on Jan. 16, 2020, 4 pages.
Office Action received for Australian Patent Application No. 2017277848, mailed on Jun. 13, 2019, 4 pages.
Office Action received for Australian Patent Application No. 2017277848, mailed on Mar. 4, 2020, 3 pages.
Office Action received for Australian Patent Application No. 2017277848, mailed on Nov. 1, 2019, 4 pages.
Office Action received for Australian Patent Application No. 2020203453, mailed on Aug. 12, 2020, 4 pages.
Office Action received for Australian Patent Application No. 2020203453, mailed on Dec. 18, 2020, 4 pages.
Office Action received for Australian Patent Application No. 2020203453, mailed on Oct. 29, 2020, 4 pages.
Office Action received for Australian Patent Application No. 2021203301, mailed on Jan. 18, 2022, 3 pages.
Office Action received for Australian Patent Application No. 2021203301, mailed on Nov. 3, 2021, 3 pages.
Office Action received for Chinese Patent Application No. 201710400594.9, mailed on Apr. 23, 2018., 3 pages (1 page of English Translation and 2 pages of Official copy).
Office Action received for Chinese Patent Application No. 201710400594.9, mailed on Jul. 17, 2017., 2 pages (1 page of English Translation and 1 page of Official Copy).
Office Action received for Chinese Patent Application No. 201710400594.9, mailed on Mar. 20, 2020, 6 pages (3 pages of English Translation and 3 pages of Official Copy).
Office Action received for Chinese Patent Application No. 201710400594.9, mailed on May 14, 2019, 14 pages (5 pages of English Translation and 9 pages of Official Copy).
Office Action received for Chinese Patent Application No. 201710400594.9, mailed on Nov. 15, 2019, 12 pages (5 pages of English Translation and 7 pages of Official Copy).
Office Action received for Danish Patent Application No. PA201770384, mailed on Oct. 27, 2017, 7 pages.
Office Action received for European Patent Application No. 17810736.3, mailed on Nov. 11, 2020, 6 pages.
Office Action received for Japanese Patent Application No. 2019-222213, mailed on Jan. 4, 2021, 9 pages (5 pages of English Translation and 4 pages of Official Copy).
Office Action received for Japanese Patent Application No. 2021-159616, mailed on Dec. 5, 2022, 11 pages (6 pages of English Translation and 5 pages of Official Copy).
Office Action received for Japanese Patent Application No. 2021-159616, mailed on Jun. 9, 2023, 4 pages (2 pages of English Translation and 2 pages of Official Copy).
Office Action received for Korean Patent Application No. 10-2018-7034689, mailed on Nov. 28, 2019, 11 pages (5 pages of English Translation and 6 pages of Official Copy).
Office Action received for Korean Patent Application No. 10-2020-7016741, mailed on Jul. 22, 2020, 10 pages (4 pages of English Translation and 6 pages of Official Copy).
Office Action received for Korean Patent Application No. 10-2021-7015702, mailed on Jun. 19, 2021, 12 pages (6 pages of English Translation and 6 pages of Official Copy).
Office Action received for Korean Patent Application No. 10-2022-7010343, mailed on May 19, 2022, 12 pages (6 pages of English Translation and 6 pages of Official Copy).
Office Action received for Korean Patent Application No. 10-2022-7010343, mailed on Nov. 17, 2022, 6 pages (3 pages of English Translation and 3 pages of Official Copy).

(56) References Cited

OTHER PUBLICATIONS

Paced Breathing, ""How to use Paced Breathing"", Retrieved from https://pacedbreathing.blogspot.com/2014/03/how-to-use-paced-breathing .html on Sep. 9, 2020, Apr. 3, 2015, 7 pages.
Stachowiak Sandy, "Relax, breathe deep and regain focus with Hear and Now", Available online at: https://appadvice.com/appnn/2016/01/relax-breathe-deep-and-regain-focus-with-hear-and-now, Jan. 6, 2016, 3 pages.
Supplemental Notice of Allowance received for U.S. Appl. No. 15/372,133, mailed on Mar. 26, 2021, 3 pages.
Tiles and Toasts, "Toast Notification and Action Center Overview for Windows 10", Online Available at: https://blogs.msdn.microsoft.com/tiles_and_toasts/2015/07/08/toast-notification-and-action-center-overview-for-windows-10/, Jul. 8, 2015, 9 pages.
Time Out app, "Release Notes". Online Available at: www.dejal.com/timeout/release, 2016, 8 pages.
Time Out app, Screens shots and user guide. Online Available at: https://web.archive.org/web/20160314023701/http://www.dejal.com/timeout/images/, Mar. 14, 2016, 10 pages.
Wesley, "Apple Watch Series 1", online available at:—http://toolbox.info/blog/archives/1737-unknown.html, May 28, 2015, 5 pages (Official copy only) See Communication Under Rule 37 CFR § 1.98(a) (3).
Windowsunited, "Breathe Deeply Now! Please Take a Deep Breath and Relax", Online Available at: https://windowsunited.de/breathe-deeply-now-die-app-gegen-angszustaende/, Oct. 4, 2014, 8 pages.
Notice of Allowance received for Japanese Patent Application No. 2024-012084, mailed on Feb. 7, 2025, 4 pages (1 page of English Translation and 3 pages of Official Copy).
Advisory Action received for U.S. Appl. No. 17/550,806, mailed on Oct. 26, 2023, 6 pages.
Applicant-Initiated Interview Summary received for U.S. Appl. No. 18/108,852, mailed on Apr. 1, 2025, 2 pages.
Decision to Grant received for European Patent Application No. 17810736.3, mailed on Jan. 5, 2024, 2 pages.
Extended European Search Report received for European Patent Application No. 23216678.5, mailed on Mar. 7, 2024, 10 pages.
Hang et al., "Oh App, Where Art Thou? On App Launching Habits of Smartphone Users", Proceedings of the 15th international conference on Human-computer interaction with mobile devices and services, MobileHCI '13, Online available at: https://dl.acm.org/doi/10.1145/2493190.2493219, Aug. 27-30, 2013, 4 pages.
International Preliminary Report on Patentability received for PCT Patent Application No. PCT/US2022/030309, mailed on Nov. 30, 2023, 10 pages.
International Preliminary Report on Patentability received for PCT Patent Application No. PCT/US2023/015826, mailed on Oct. 3, 2024, 12 pages.
International Search Report and Written Opinion received for PCT Patent Application No. PCT/US2024/030403, mailed on Sep. 9, 2024, 13 pages.
Notice of Allowance received for Chinese Patent Application No. 202011096049.3, mailed on Mar. 20, 2024, 2 pages (1 page of English Translation and 1 page of Official Copy).
Notice of Allowance received for Chinese Patent Application No. 202011098154.0, mailed on May 22, 2024, 5 pages (1 page of English Translation and 4 pages of Official Copy).
Notice of Allowance received for Japanese Patent Application No. 2021-159616, mailed on Apr. 12, 2024, 4 pages (1 page of English Translation and 3 pages of Official Copy).
Notice of Allowance received for U.S. Appl. No. 17/550,806, mailed on Jun. 17, 2024, 39 pages.
Office Action received for Chinese Patent Application No. 202011096049.3, mailed on Jan. 9, 2024, 8 pages (4 pages of English Translation and 4 pages of Official Copy).
Office Action received for Chinese Patent Application No. 202011096049.3, mailed on Nov. 3, 2023, 27 pages (12 pages of English Translation and 15 pages of Official Copy).
Office Action received for Chinese Patent Application No. 202011098154.0, mailed on Dec. 26, 2023, 22 pages (11 pages of English Translation and 11 pages of Official Copy).
Office Action received for European Patent Application No. 22731014.1, mailed on Dec. 12, 2024, 8 pages.
Office Action received for Japanese Patent Application No. 2021-159616, mailed on Dec. 8, 2023, 4 pages (2 pages of English Translation and 2 pages of Official Copy).
Restriction Requirement received for U.S. Appl. No. 18/108,852, mailed on Jan. 22, 2025, 9 pages.
Supplemental Notice of Allowance received for U.S. Appl. No. 17/550,806, mailed on Jun. 28, 2024, 2 pages.
Wikipedia, "Nike+iPod", Online available at: http://en.wikipedia.org/w/index.php?title=Nike%2BiPod&oldid=420671395, Mar. 25, 2011, pp. 1-4.
Zou et al., "Prophet: What App You Wish to Use Next", UbiComp '13, Online available at: DOI: 10.1145/2494091.2494146, Sep. 8-12, 2013, pp. 167-170.
Intention to Grant received for European Patent Application No. 22731014.1, mailed on Jun. 2, 2025, 9 pages.
Non-Final Office Action received for U.S. Appl. No. 18/108,852, mailed on Jun. 10, 2025, 19 pages.

* cited by examiner

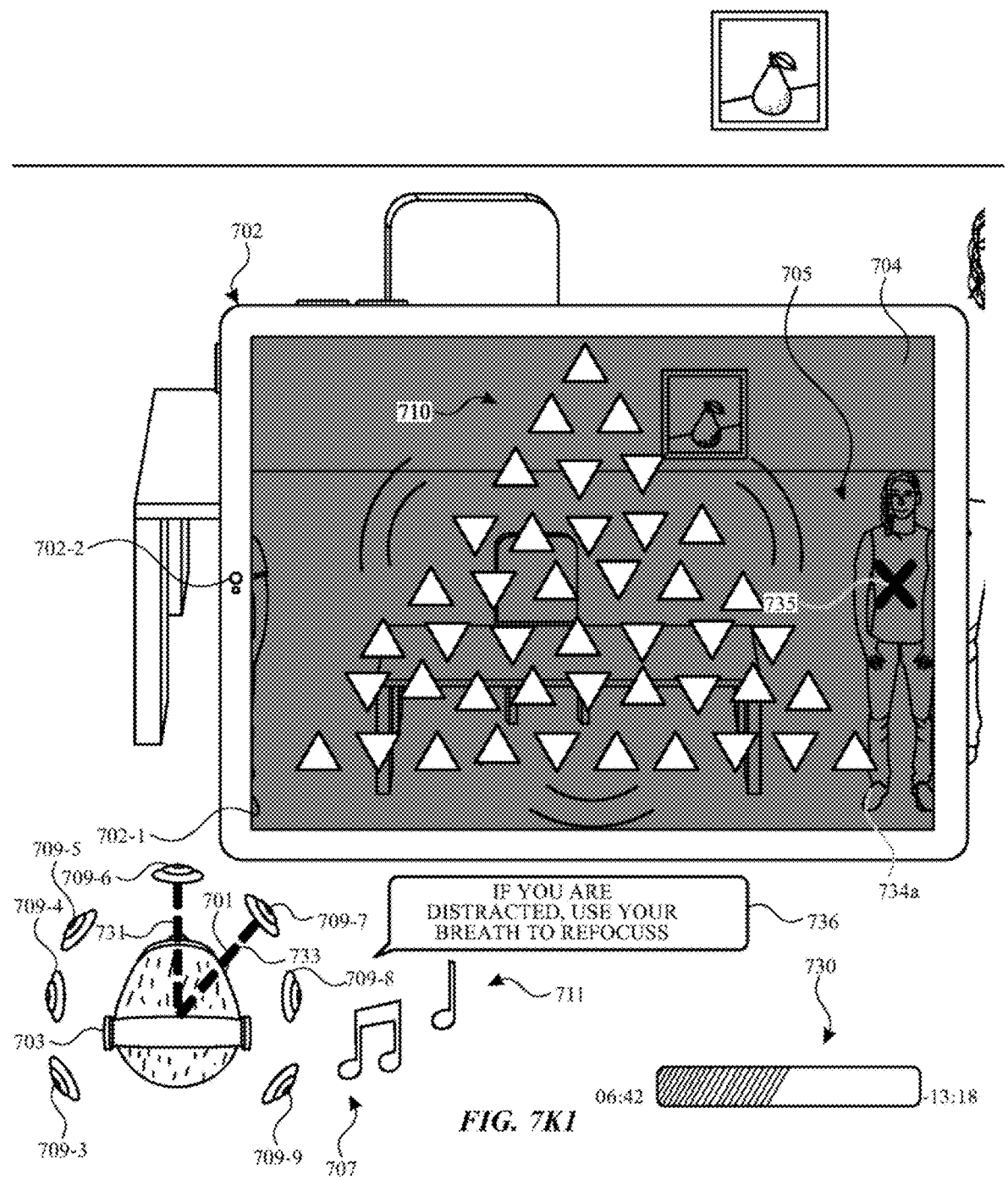
*FIG. 7K1*

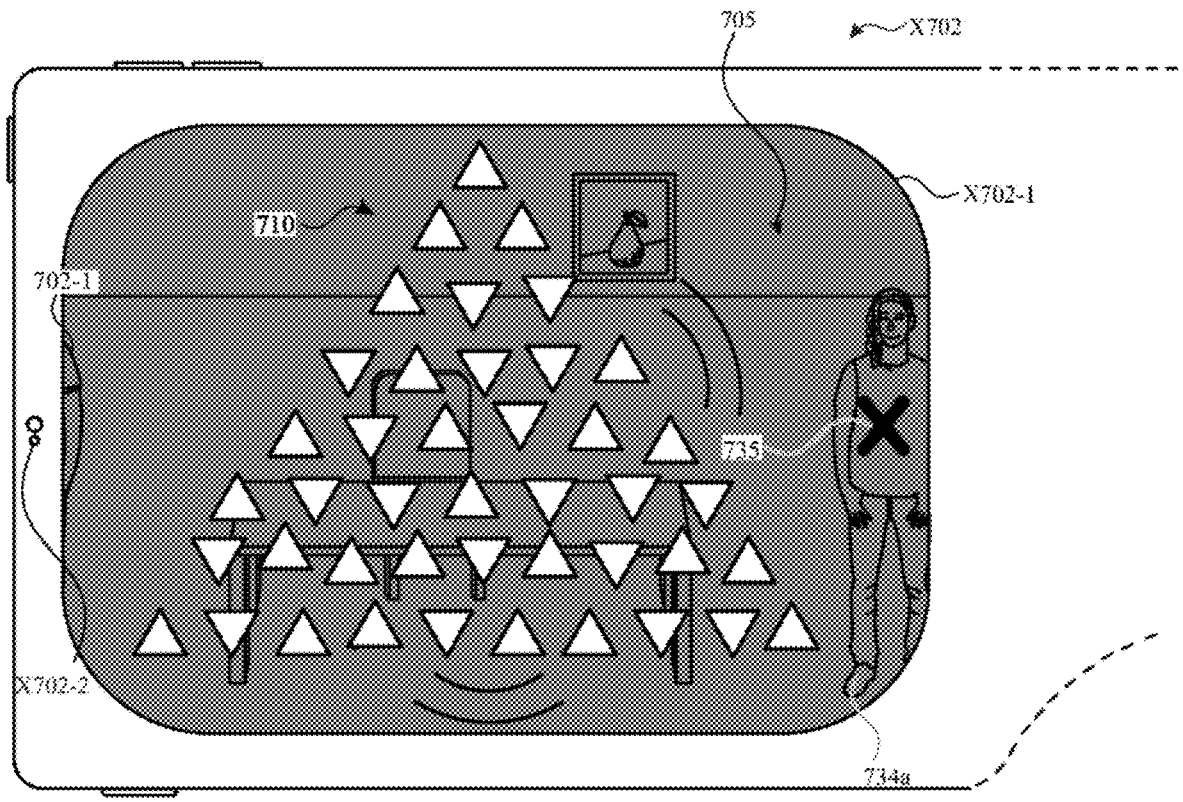
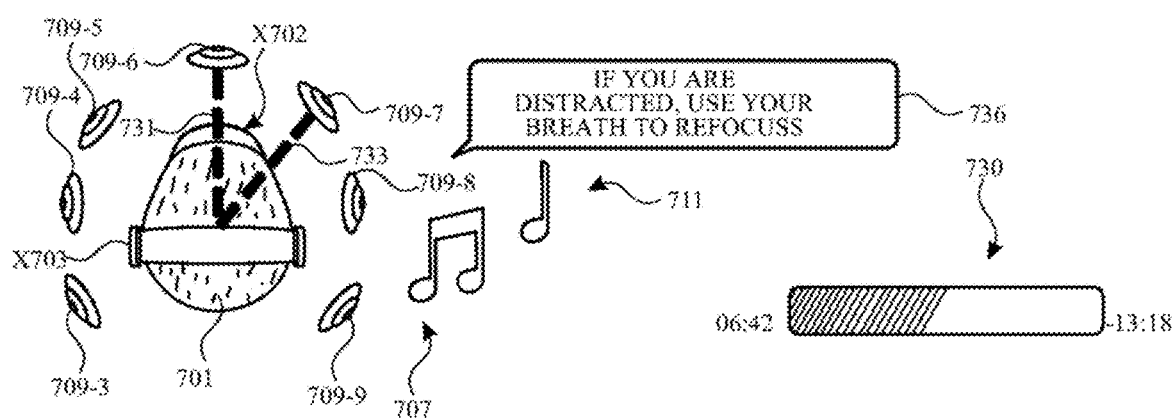
*FIG. 7K2*

800 ⤳

802
While a user experience session is active, detect, via the one or more sensors, a change in direction of attention of a user.

804
In response to detecting the change in direction of attention of the user:

806
In accordance with a determination that the attention of the user meets reminder criteria, output, via the one or more output generation components, a reminder to focus attention on the user experience session.

808
In accordance with a determination that the attention of the user does not meet the reminder criteria, forgo outputting the reminder to focus attention on the user experience session.

*FIG. 8*

DEVICES, METHODS, AND GRAPHICAL USER INTERFACES FOR GENERATING REMINDERS FOR A USER EXPERIENCE SESSION IN AN EXTENDED REALITY ENVIRONMENT

CROSS-REFERENCE TO RELATED APPLICATIONS

This application claims priority to U.S. Provisional Patent Application No. 63/470,931, entitled "DEVICES, METHODS, AND GRAPHICAL USER INTERFACES FOR GENERATING REMINDERS FOR A USER EXPERIENCE SESSION IN AN EXTENDED REALITY ENVIRONMENT," filed on Jun. 4, 2023, the content of which is hereby incorporated by reference in its entirety.

TECHNICAL FIELD

The present disclosure relates generally to computer systems that are in communication with one or more output generation components and one or more sensors that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for providing reminders for computer-generated user experience sessions in an extended reality environment are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing reminders for computer-generated user experience sessions in an extended reality environment that make interaction with the computer systems more efficient and intuitive for a user. Such methods and interfaces optionally complement or replace conventional methods for providing reminders for computer-generated user experience sessions in an extended reality environment. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for providing reminders for computer-generated user experience sessions in an extended reality environment. Such methods and interfaces may complement or replace conventional methods for providing reminders for computer-generated user experience sessions in an extended reality environment. Such methods and interfaces reduce the number, extent, and/or the nature of the inputs from a user and produce a more efficient human-machine interface. For battery-operated computing devices, such methods and interfaces conserve power and increase the time between battery charges. Such methods and interfaces also provide more realistic user experiences while saving storage space for visual and audio components of the user experience sessions.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method is described. The method is performed at a computer system that is in communication with one or more output generation components and one or more sensors. The method comprises: while a user experience session is active, detecting, via the one or more sensors, a change in direction of attention of a user; and in response to detecting the change in direction of attention of the user: in accordance with a determination that the attention of the user meets reminder criteria, outputting, via the one or more output generation components, a reminder to focus attention on the user experience session; and in accordance with a determination that the attention of the user does not meet the reminder criteria, forgoing outputting the reminder to focus attention on the user experience session.

In accordance with some embodiments, a non-transitory computer-readable storage medium is described. The non-transitory computer-readable storage medium stores one or more programs configured to be executed by one or more processors of a computer system that is in communication with one or more output generation components and one or more sensors, the one or more programs including instructions for: while a user experience session is active, detecting, via the one or more sensors, a change in direction of attention of a user; and in response to detecting the change in direction of attention of the user: in accordance with a determination that the attention of the user meets reminder criteria, outputting, via the one or more output generation components, a reminder to focus attention on the user experience session; and in accordance with a determination that the attention of the user does not meet the reminder criteria, forgoing outputting the reminder to focus attention on the user experience session.

In accordance with some embodiments, a transitory computer-readable storage medium is described. The non-transitory computer-readable storage medium stores one or more programs configured to be executed by one or more processors of a computer system that is in communication with one or more output generation components and one or more sensors, the one or more programs including instructions for: while a user experience session is active, detecting, via the one or more sensors, a change in direction of attention of a user; and in response to detecting the change in direction of attention of the user: in accordance with a determination that the attention of the user meets reminder criteria, outputting, via the one or more output generation components, a reminder to focus attention on the user experience session; and in accordance with a determination that the attention of the user does not meet the reminder criteria, forgoing outputting the reminder to focus attention on the user experience session.

In accordance with some embodiments, a computer system is described. The computer system is configured to communicate with one or more output generation components and one or more sensors. The computer system comprises: one or more processors; and memory storing one or more programs configured to be executed by the one or more processors, the one or more programs including instructions for while a user experience session is active, detecting, via the one or more sensors, a change in direction of attention of a user; and in response to detecting the change in direction of attention of the user: in accordance with a determination that the attention of the user meets reminder criteria, outputting, via the one or more output generation components, a reminder to focus attention on the user experience session; and in accordance with a determination that the attention of the user does not meet the reminder criteria, forgoing outputting the reminder to focus attention on the user experience session.

In accordance with some embodiments, a computer system is described. The computer system is configured to communicate with one or more output generation components and one or more sensors. The computer system comprises: means for, while a user experience session is active, detecting, via the one or more sensors, a change in direction of attention of a user; and means for, in response to detecting the change in direction of attention of the user: in accordance with a determination that the attention of the user meets reminder criteria, outputting, via the one or more output generation components, a reminder to focus attention on the user experience session; and in accordance with a determination that the attention of the user does not meet the reminder criteria, forgoing outputting the reminder to focus attention on the user experience session.

In accordance with some embodiments, a computer program product is described. The computer program product comprises one or more programs configured to be executed by one or more processors of a computer system that is in communication with one or more output generation components and one or more sensors, the one or more programs including instructions for: while a user experience session is active, detecting, via the one or more sensors, a change in direction of attention of a user; and in response to detecting the change in direction of attention of the user: in accordance with a determination that the attention of the user meets reminder criteria, outputting, via the one or more output generation components, a reminder to focus attention on the user experience session; and in accordance with a determination that the attention of the user does not meet the reminder criteria, forgoing outputting the reminder to focus attention on the user experience session.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is a block diagram illustrating a display generation component of a computer system that is configured to provide a visual component of the XR experience to the user in some embodiments.

FIG. 8 is a flow diagram of methods of providing reminders for computer-generated user experience sessions in an extended reality environment, in some embodiments.

DESCRIPTION OF EMBODIMENTS

Figure 1A:
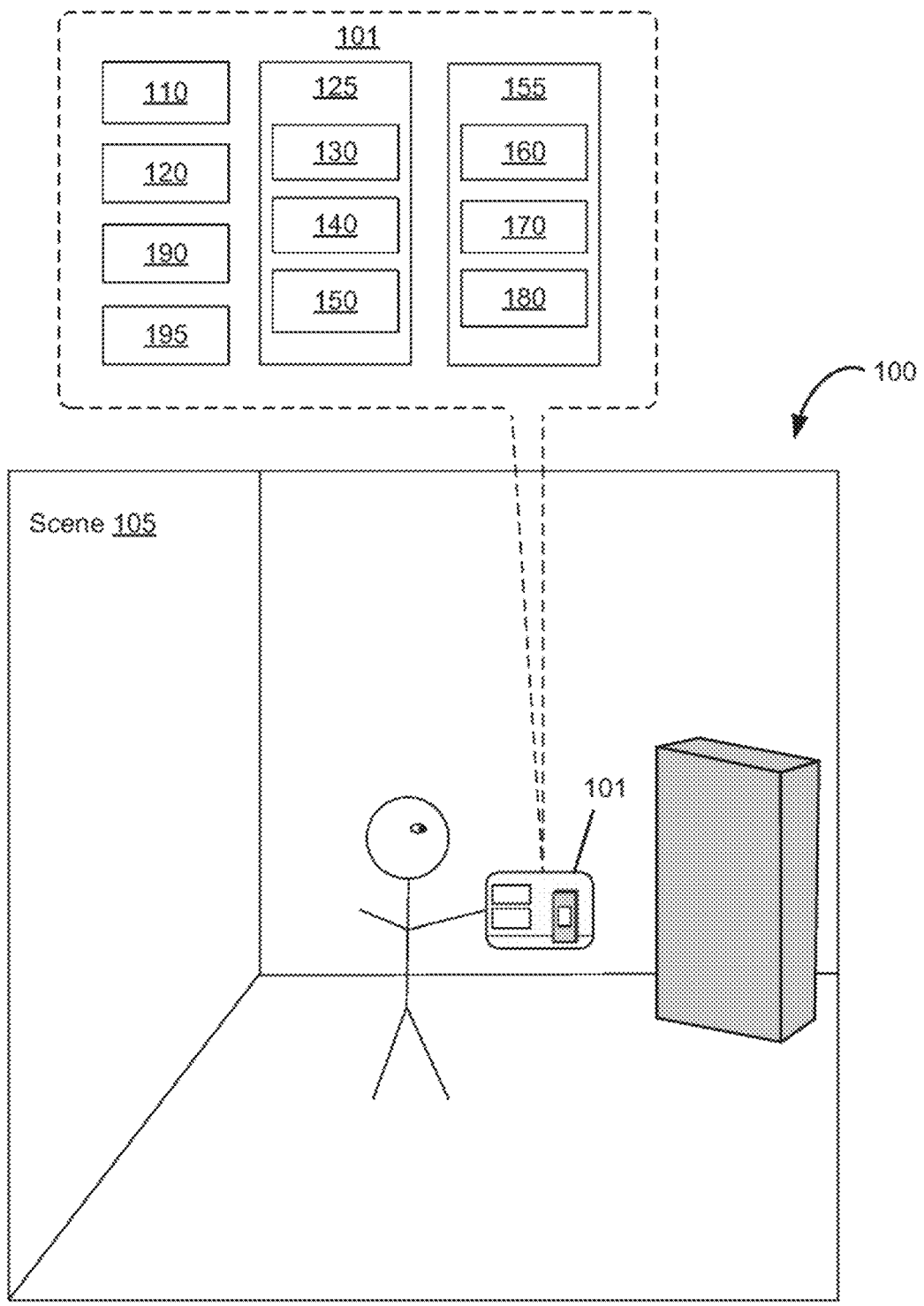
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve user interface interactions with virtual/augmented reality environments in multiple ways.

In some embodiments, while a user experience session is active, a computer system detects a change in direction of attention of a user. In response to detecting the change in direction of attention of the user, the computer system outputs a reminder to focus attention on the user experience session if the attention of the user meets reminder criteria. If the attention of the user does not meet the reminder criteria, the computer system does not output the reminder to focus attention on the user experience session.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

FIGS. 1A-6 provide a description of example computer systems for providing XR experiences to users (such as described below with respect to method 800). FIGS. 7A-7N illustrate example techniques for providing reminders for computer-generated user experience sessions in an extended reality environment, in some embodiments. FIG. 8 is a flow diagram of methods of providing reminders for computer-generated user experience sessions in an extended reality environment, in some embodiments. The user interfaces in FIGS. 7A-7N are used to illustrate the processes in FIG. 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space.

In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing passthrough video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media)(e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
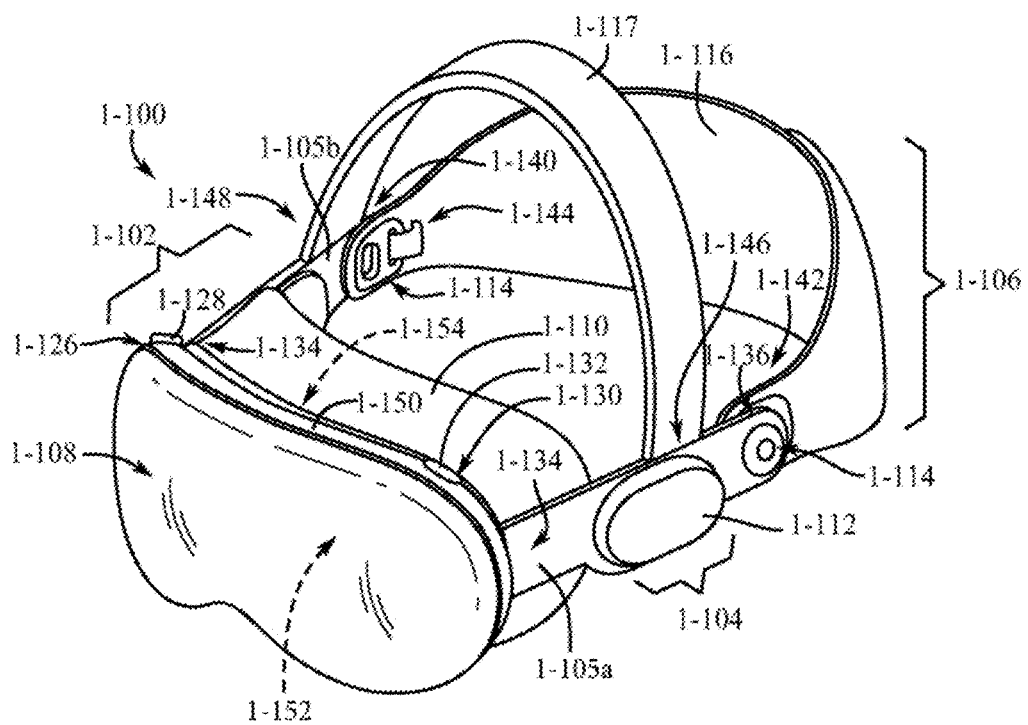
FIGS. 1I3-1P are examples of a computer system for providing XR experiences in the operating environment of FIG. 1A.
Figure 1C:
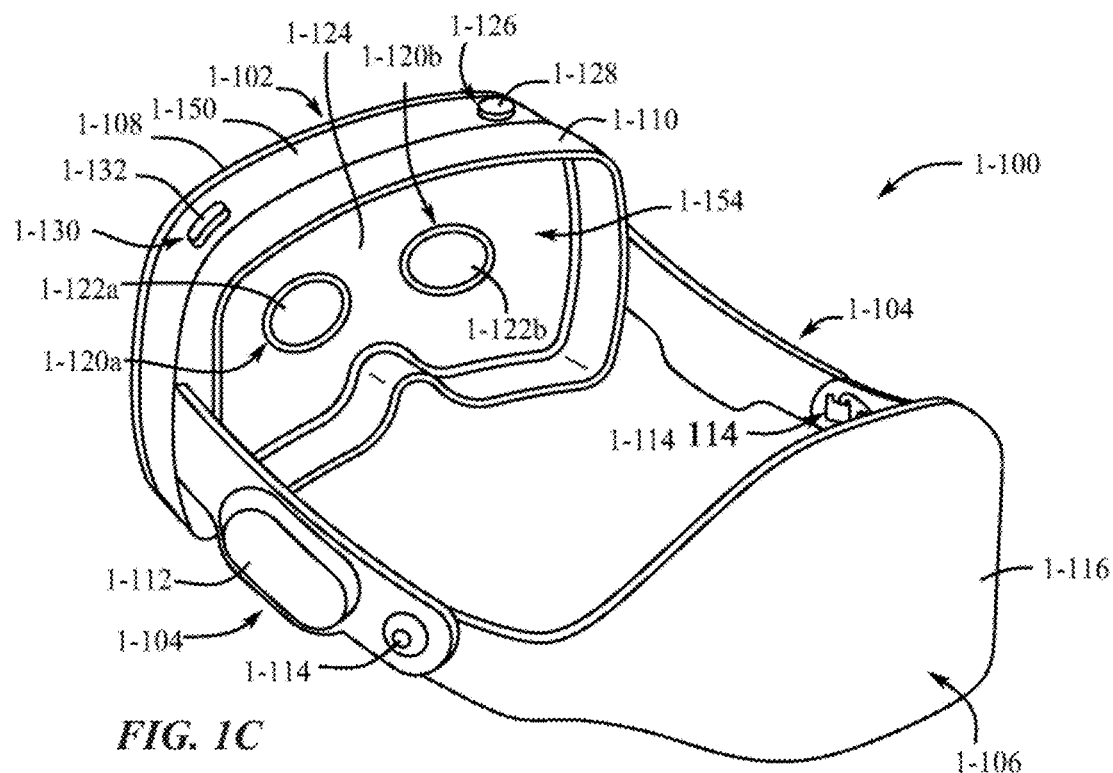
Figure 1D:
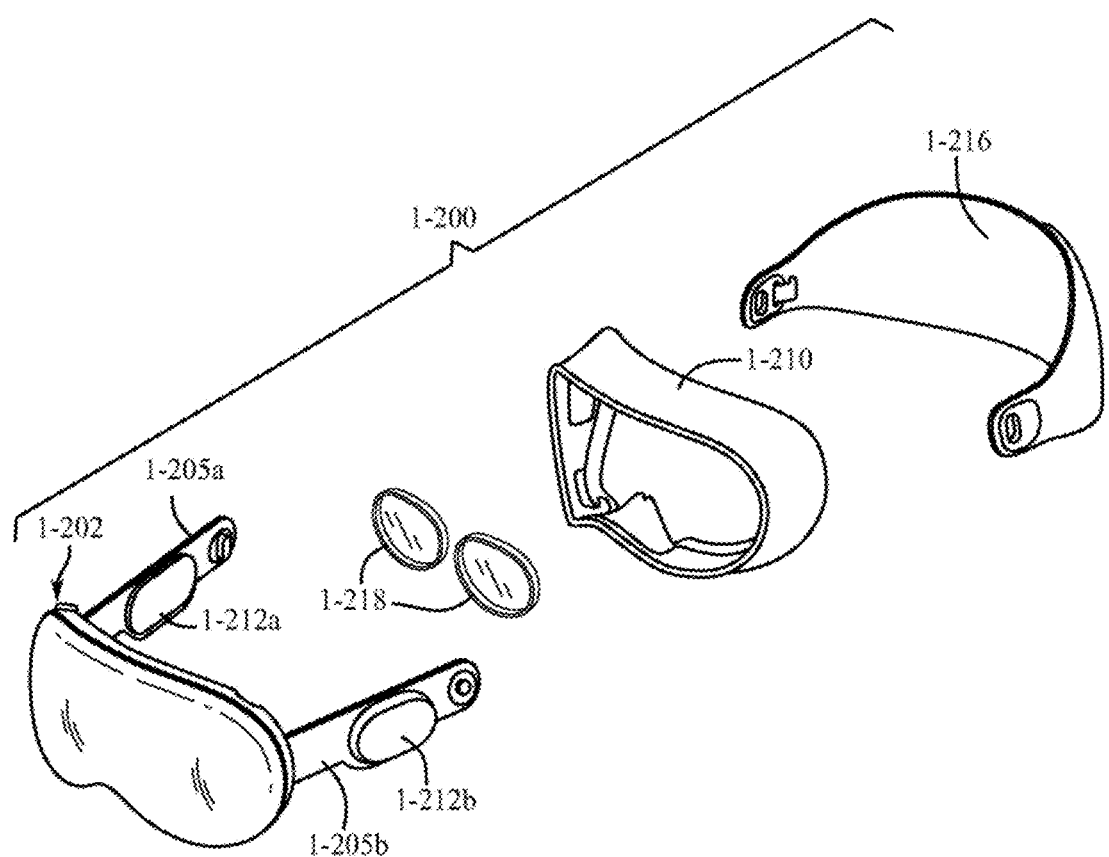
Figure 1E:
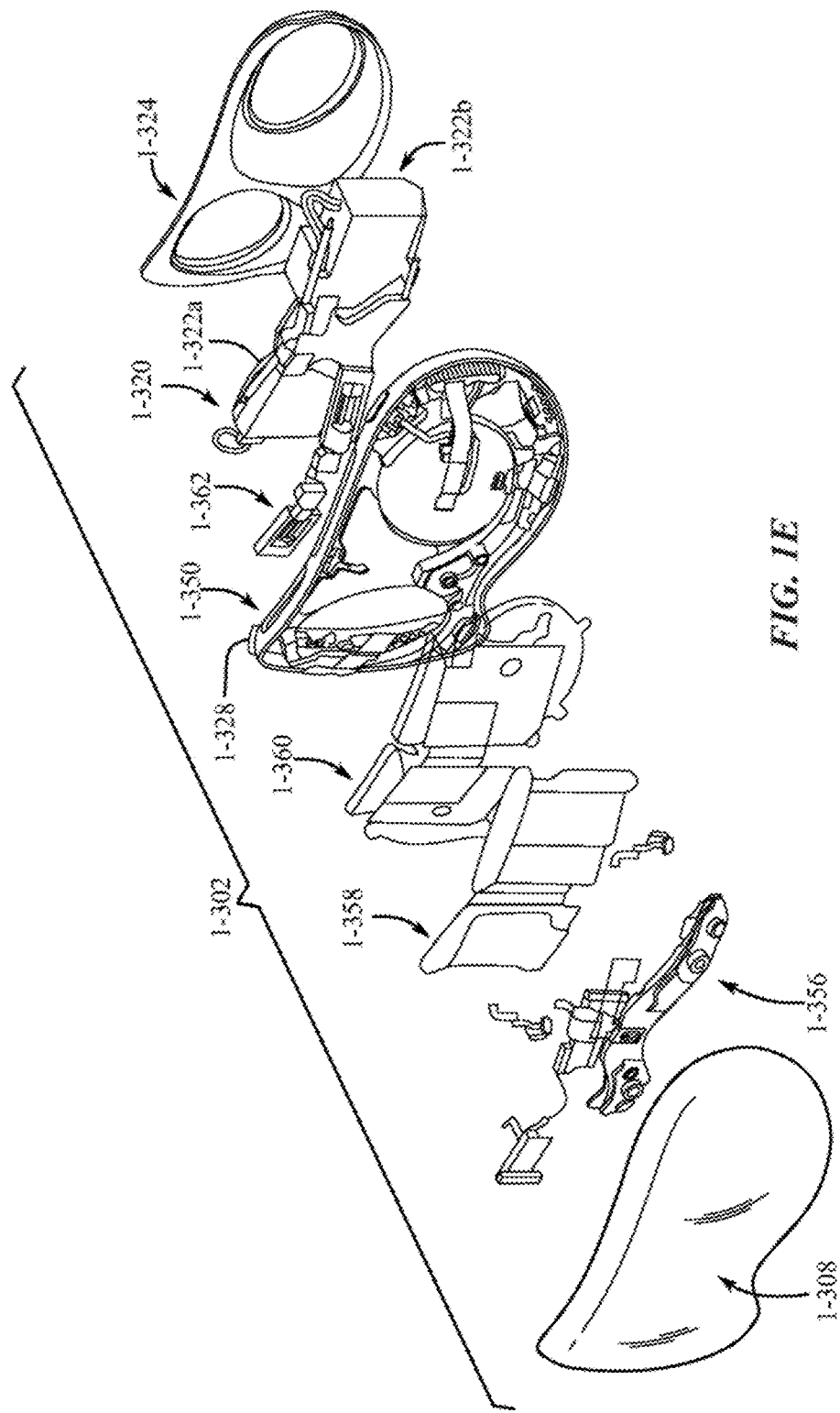
Figure 1F:
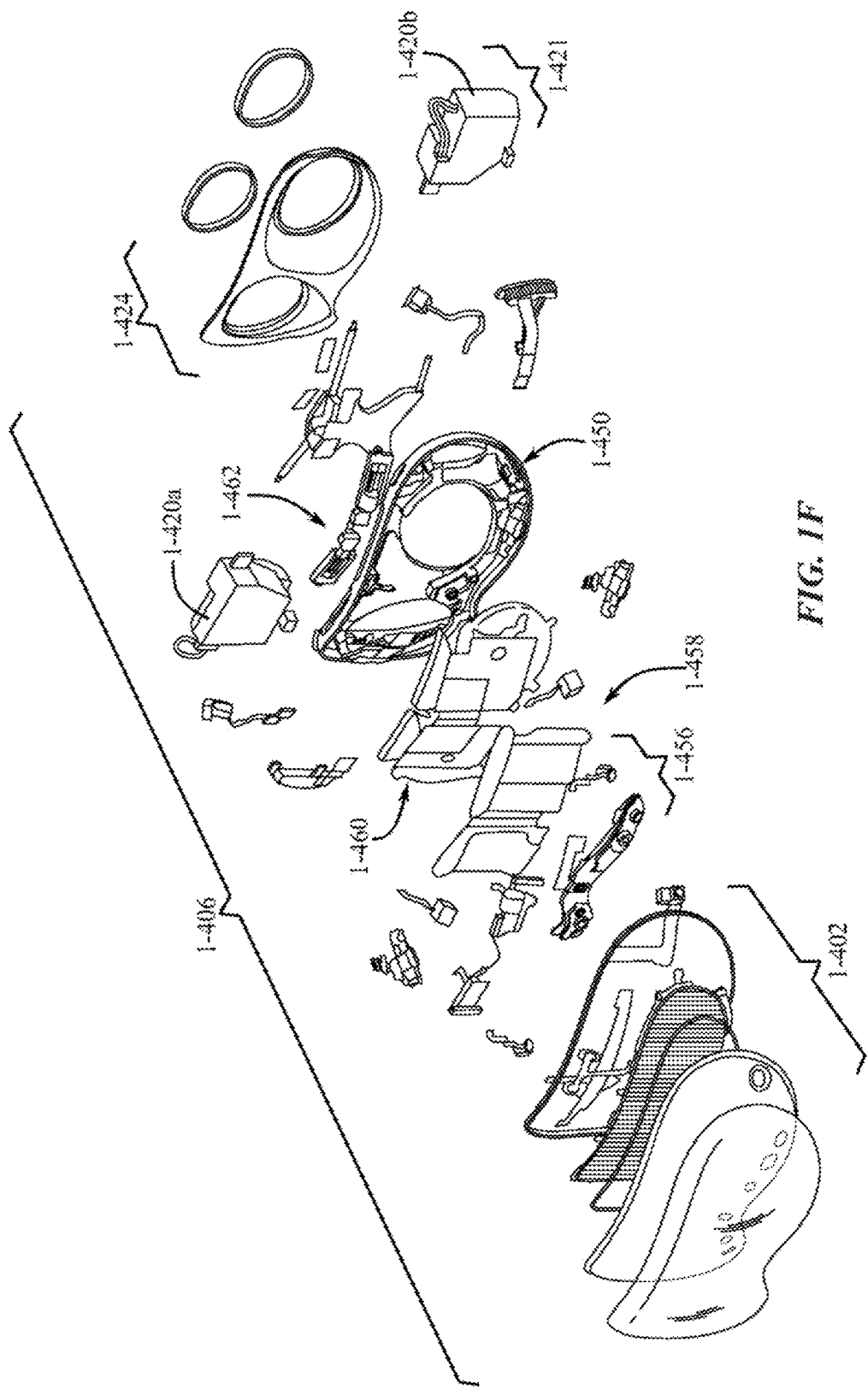
Figure 1G:
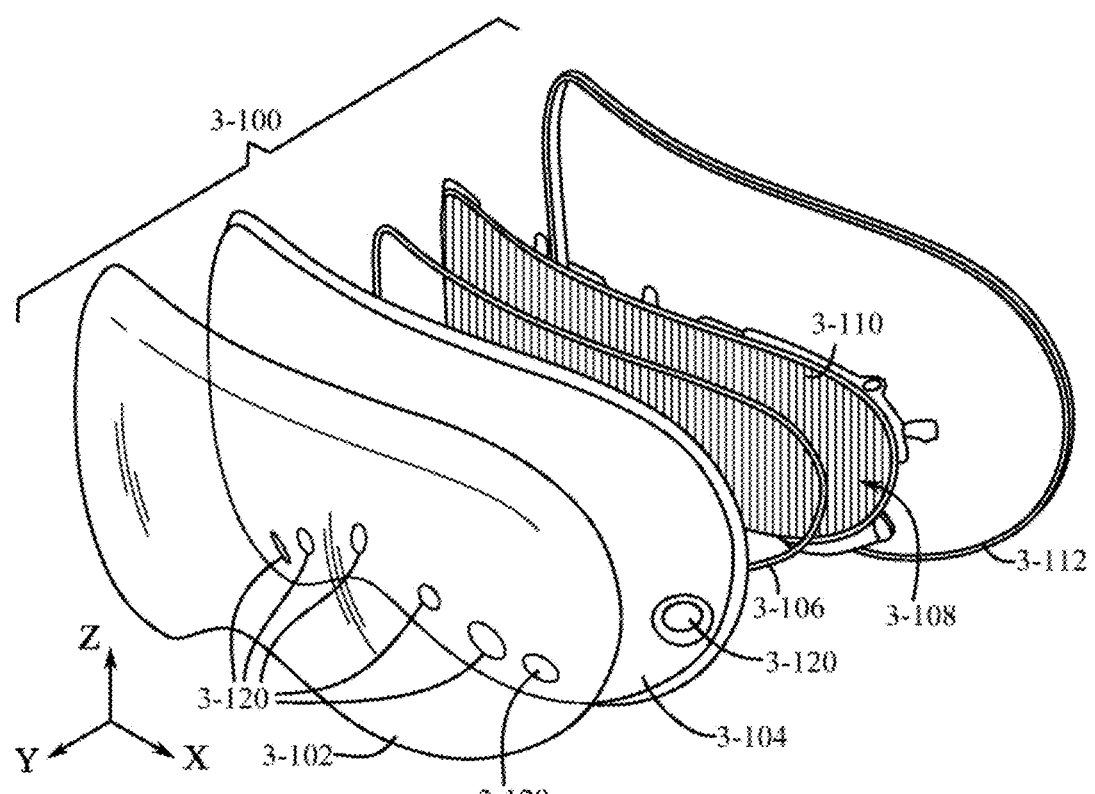
Figure 1H:
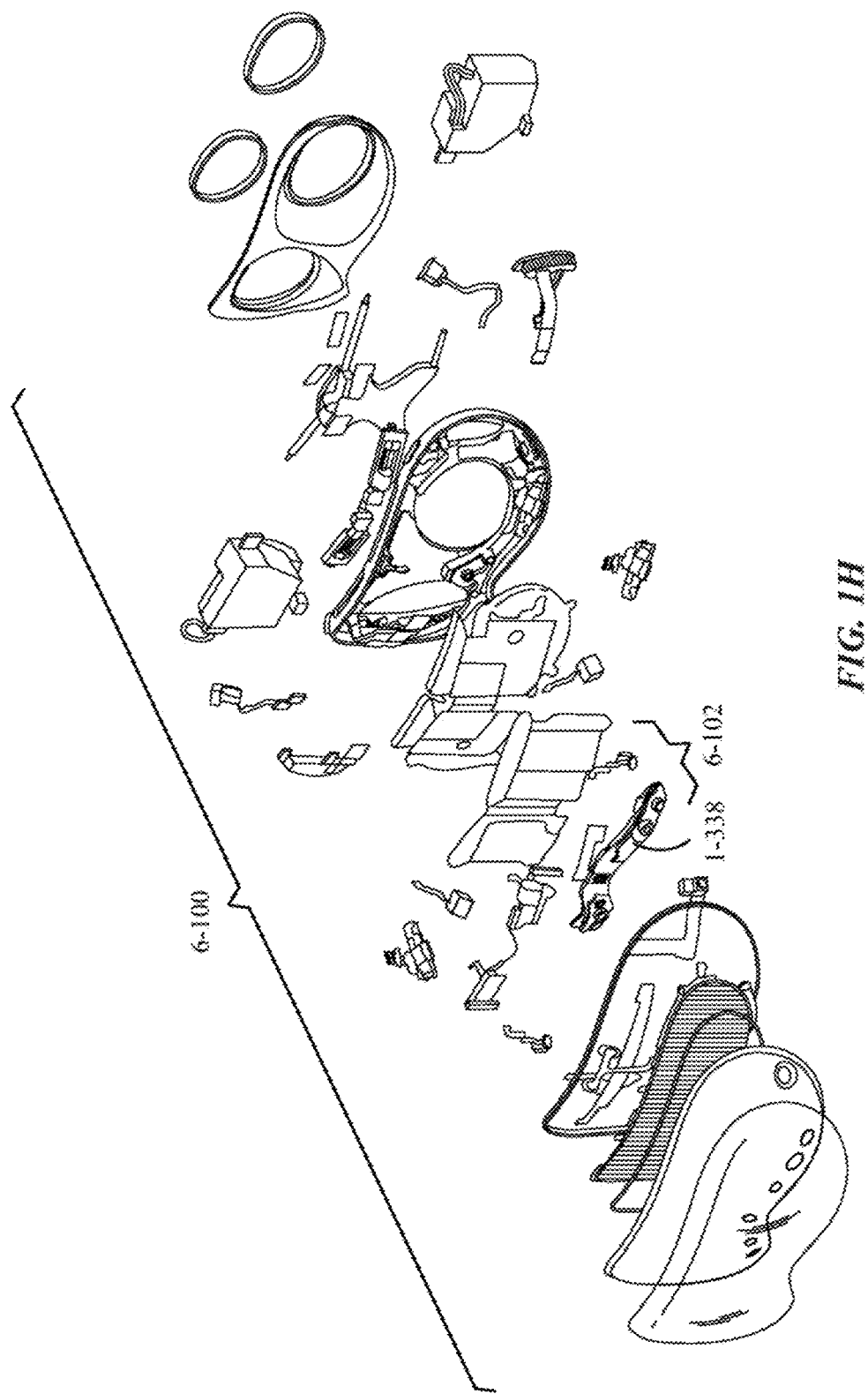
Figure 1I:
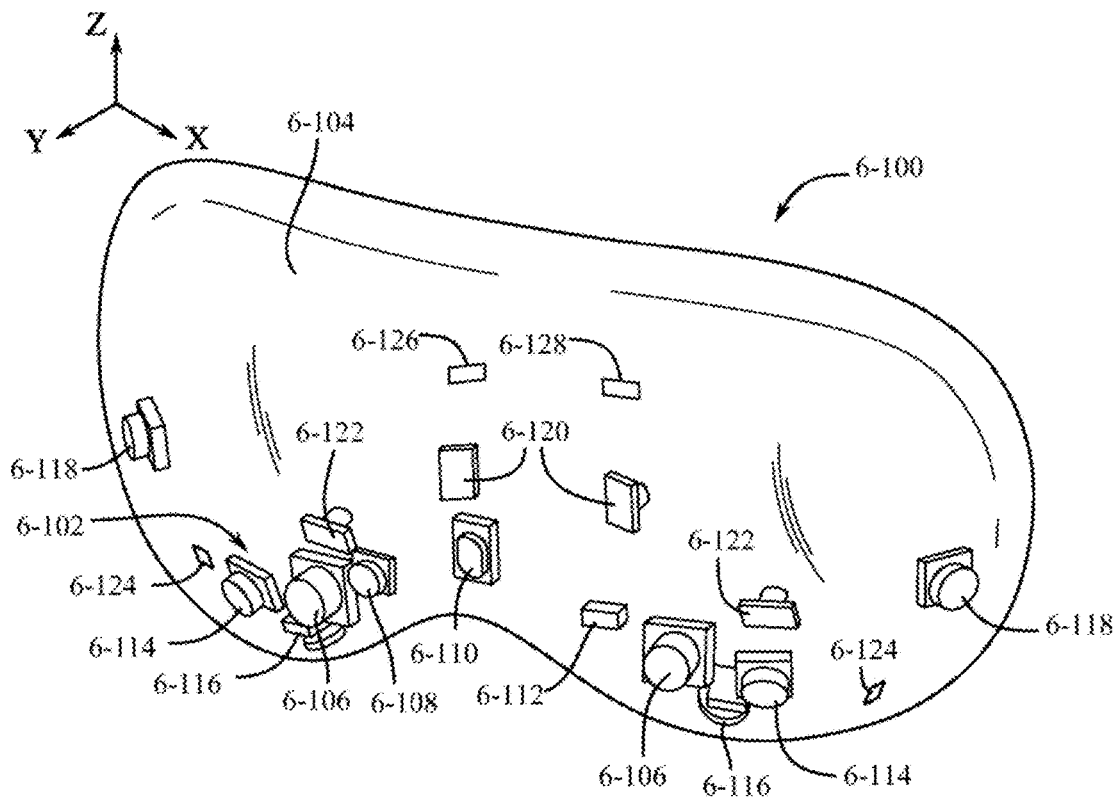
Figure 1J:
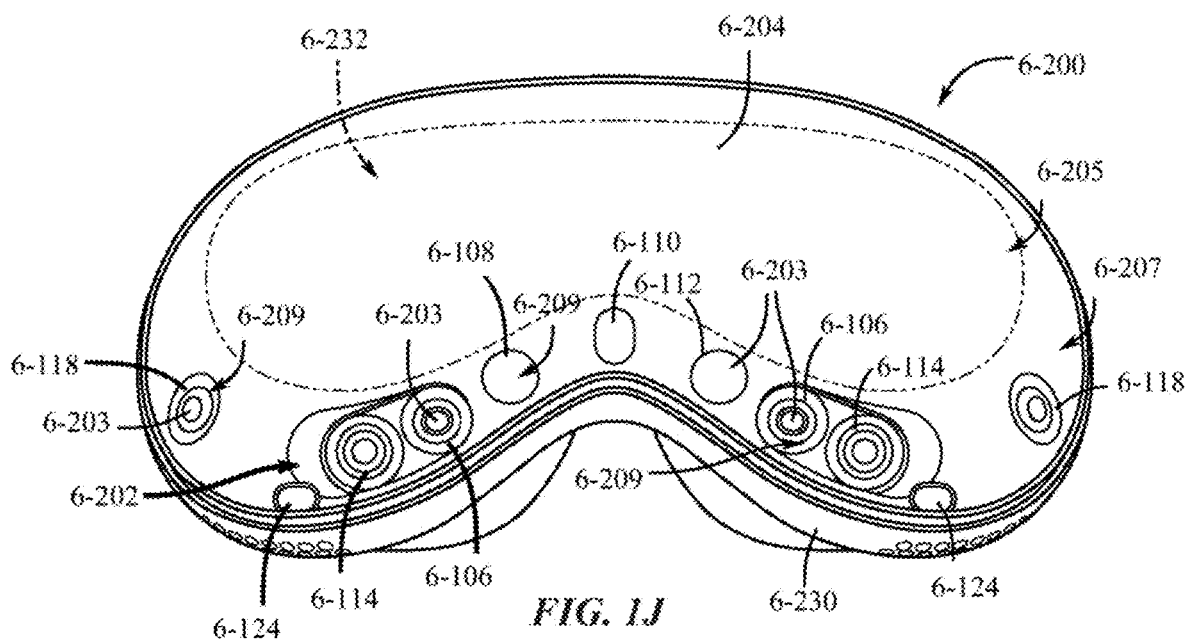
Figure 1K:
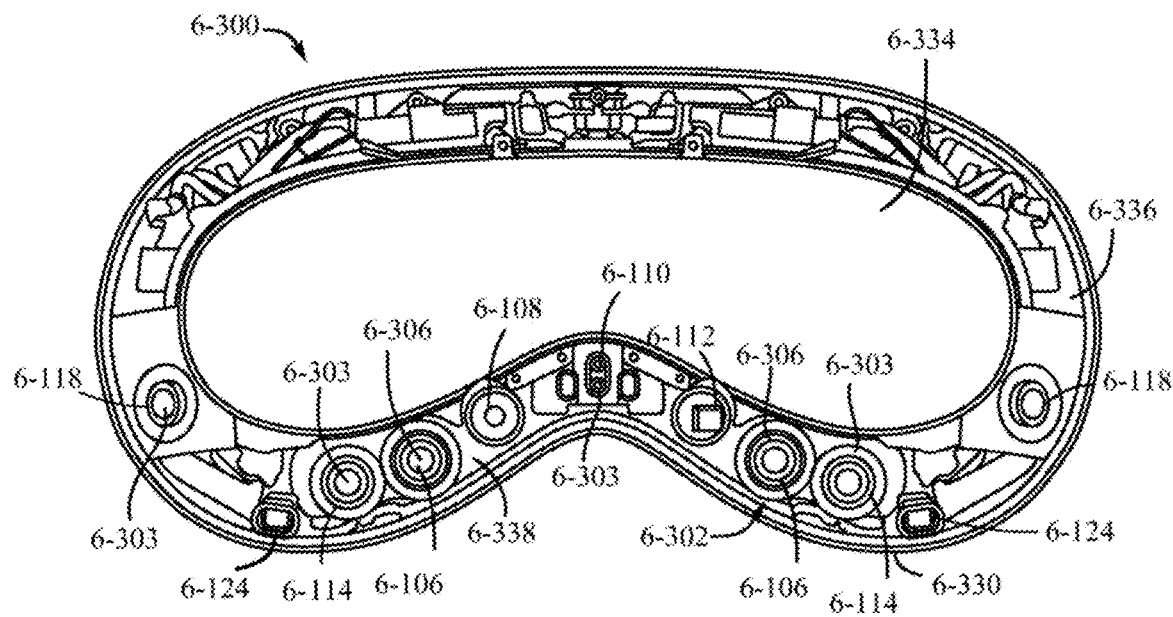
Figure 1L:
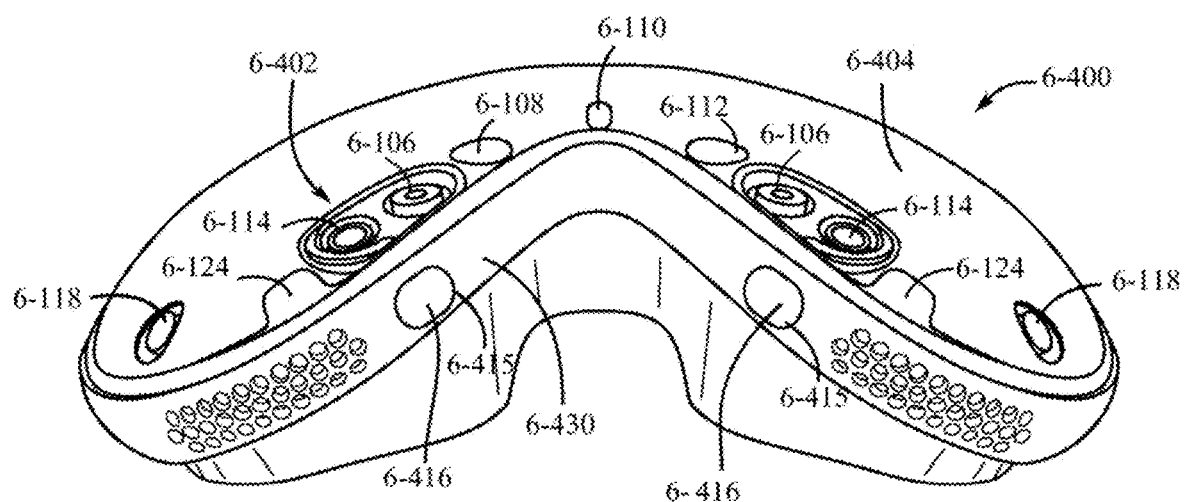
Figure 1M:
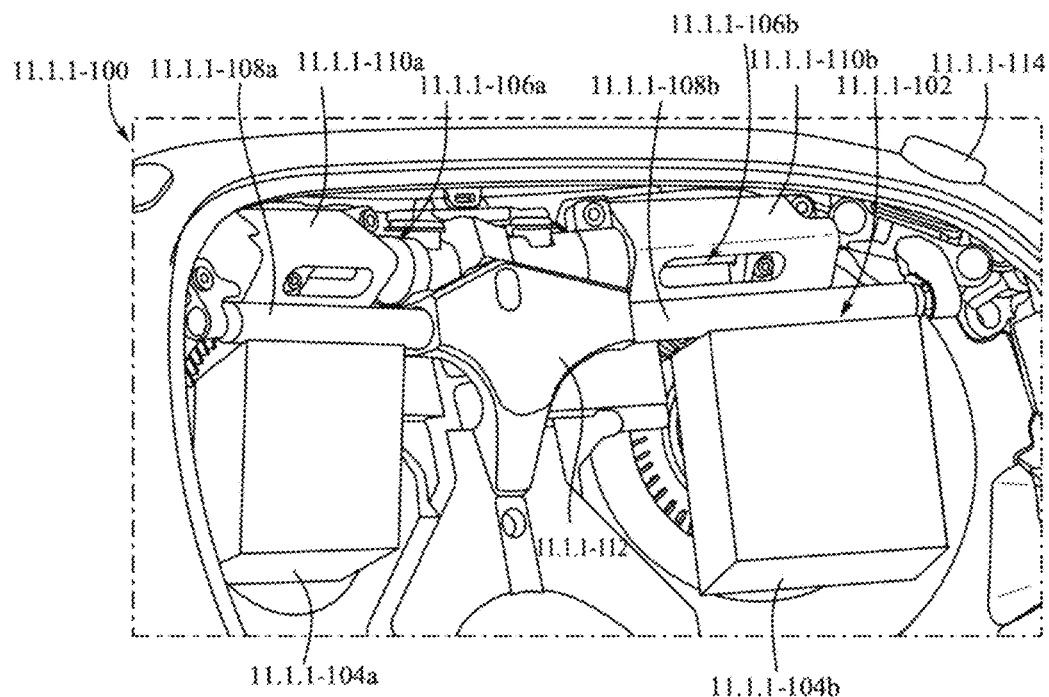
Figure 1N:
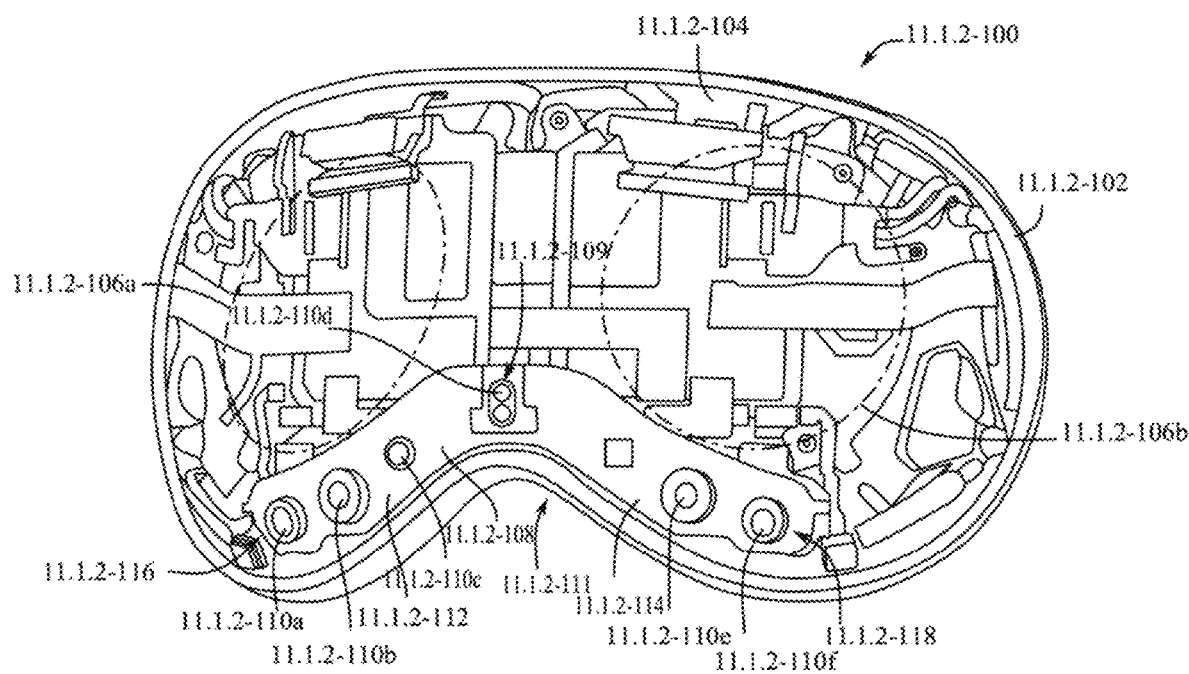
Figure 1O:
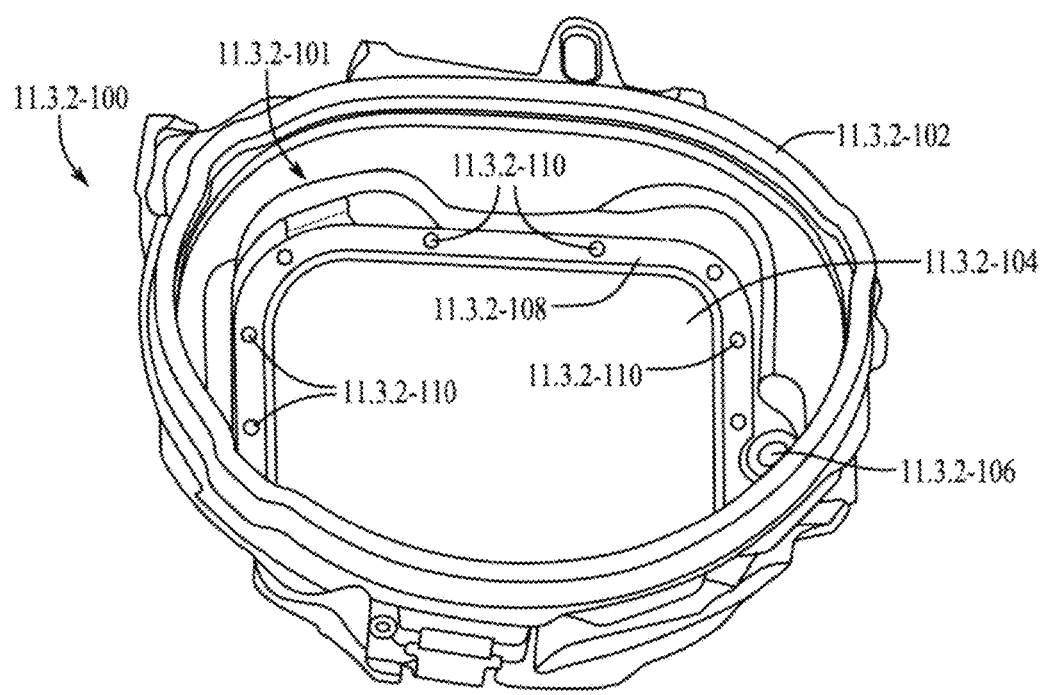
Figure 1P:
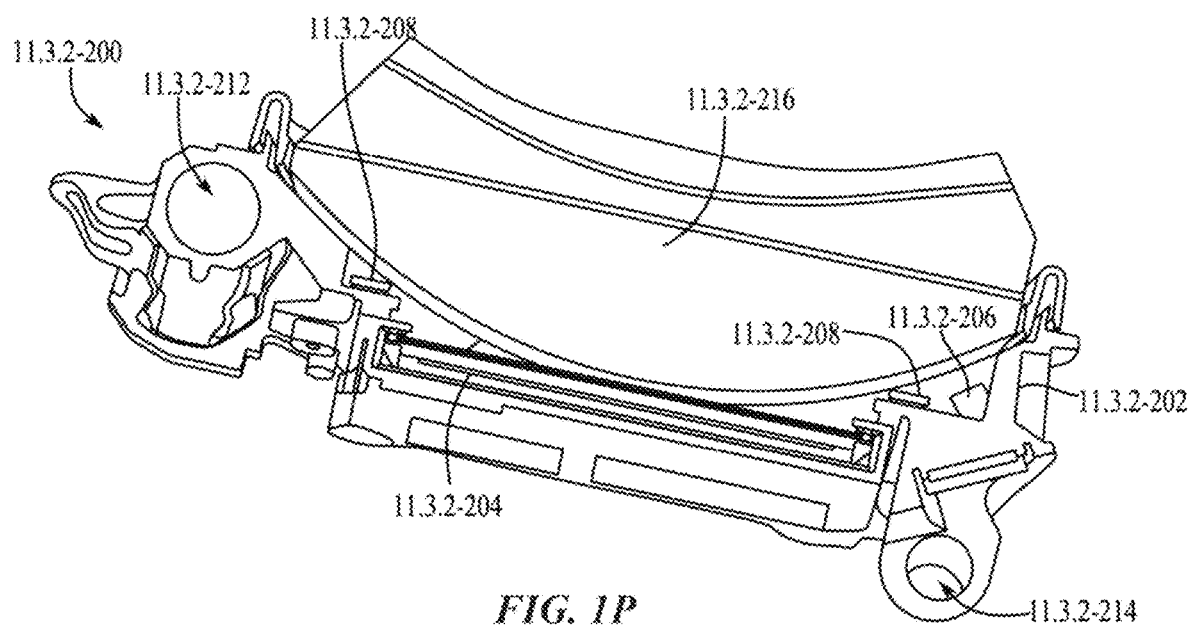

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1O or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMI) 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMI) device 6-100 described elsewhere herein. The jaw cameras 6-116, for example, can be used to capture facial expressions and movements for the face of the user below the HMD device 6-100, including the user's jaw, checks, mouth, and chin, for hand and body tracking, headset tracking, and facial avatar.

In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
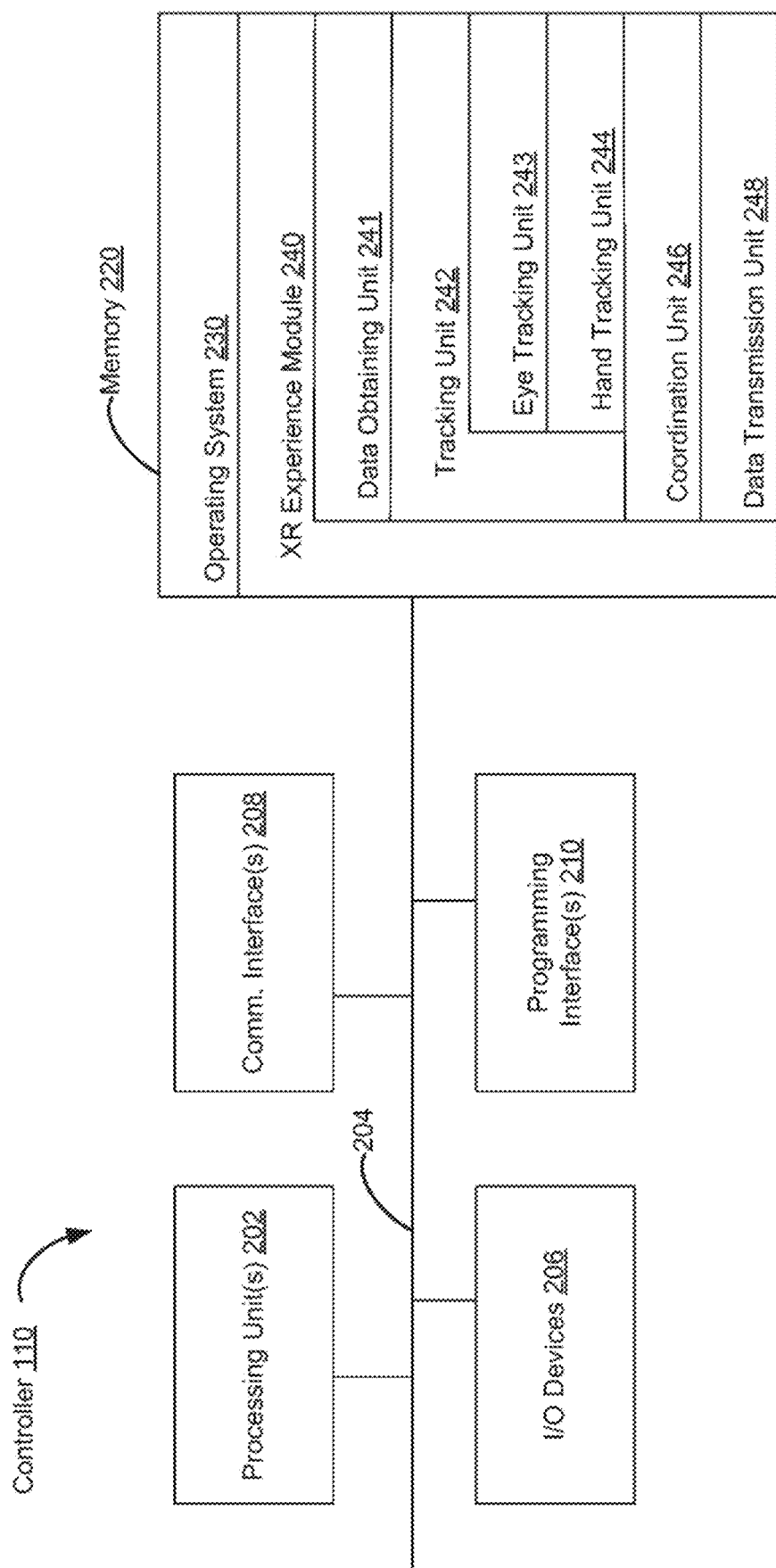
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position-location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
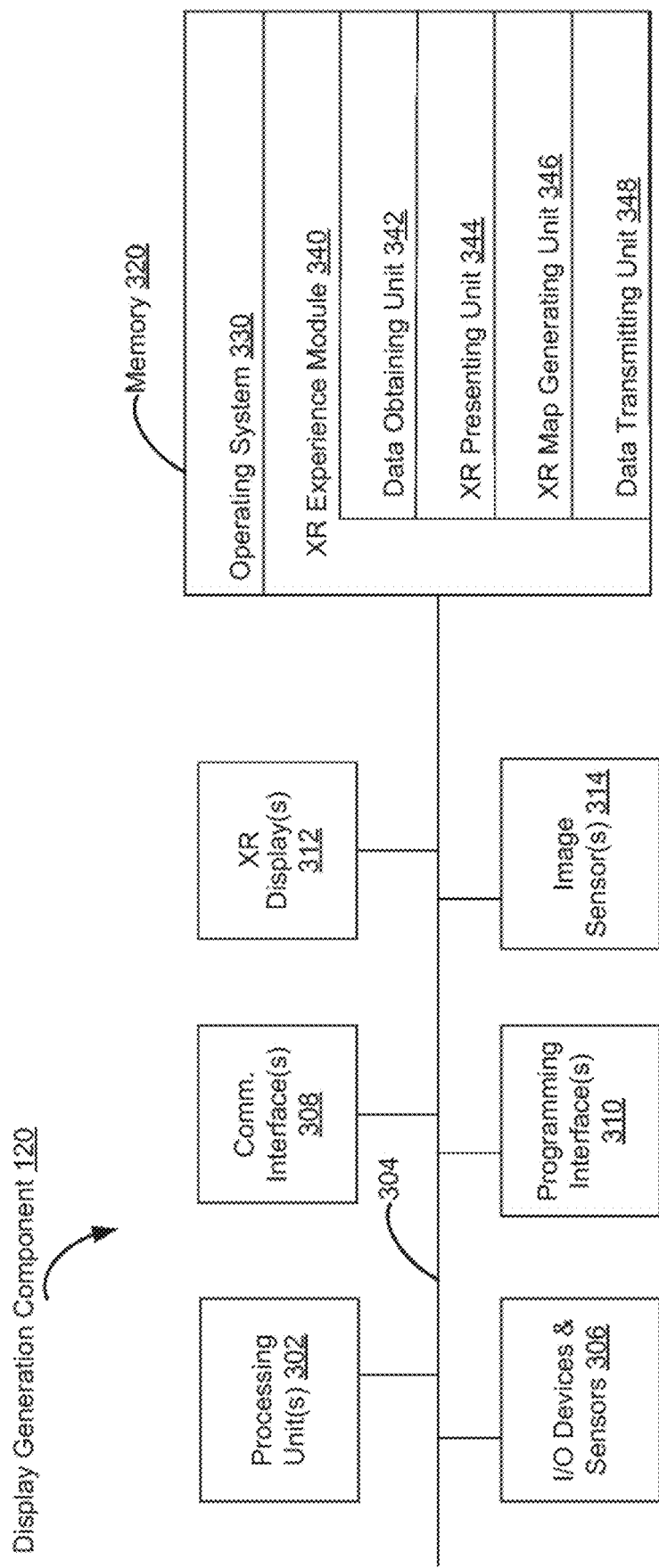

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data.

To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
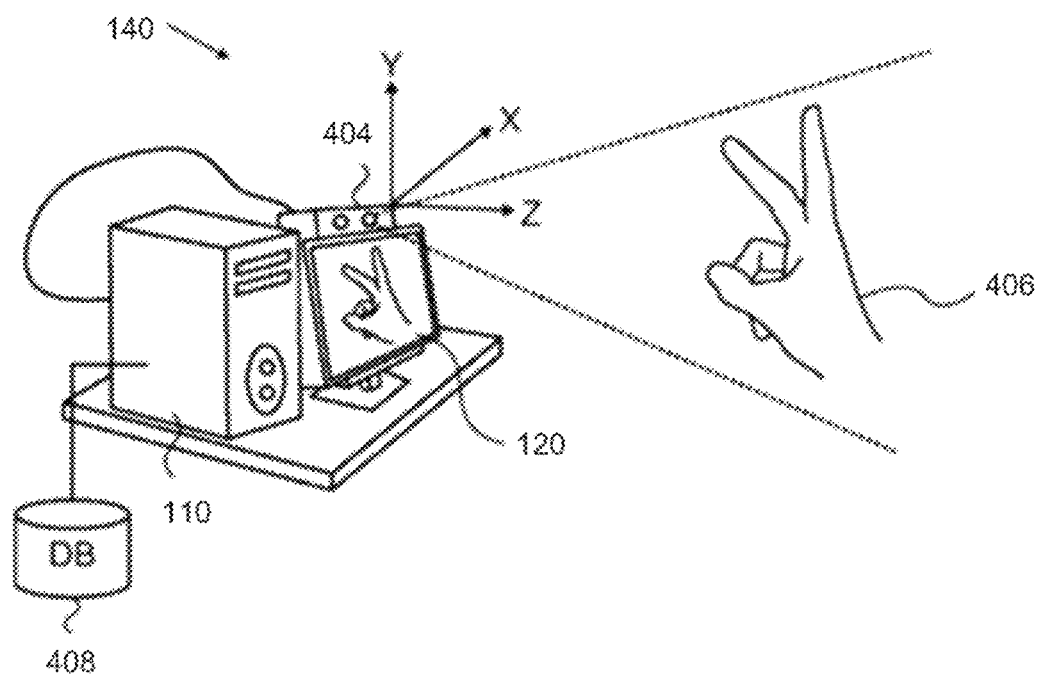
FIG. 4 is a block diagram illustrating a hand tracking unit of a computer system that is configured to capture gesture inputs of the user in some embodiments.
Figure 4:
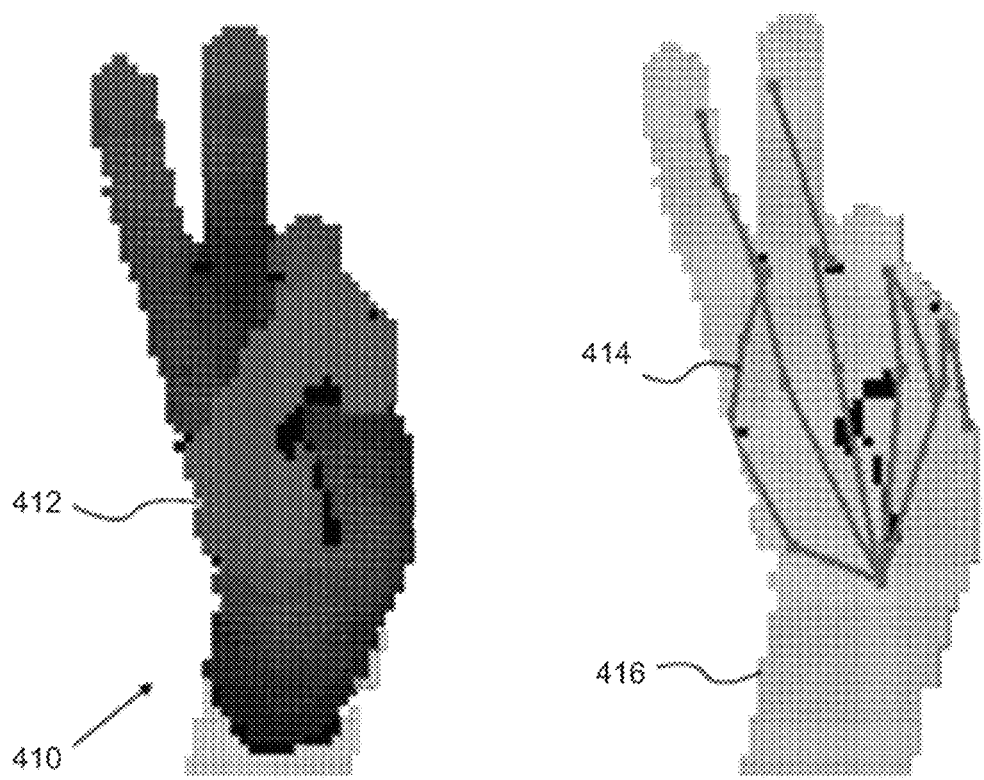

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more lingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a users finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
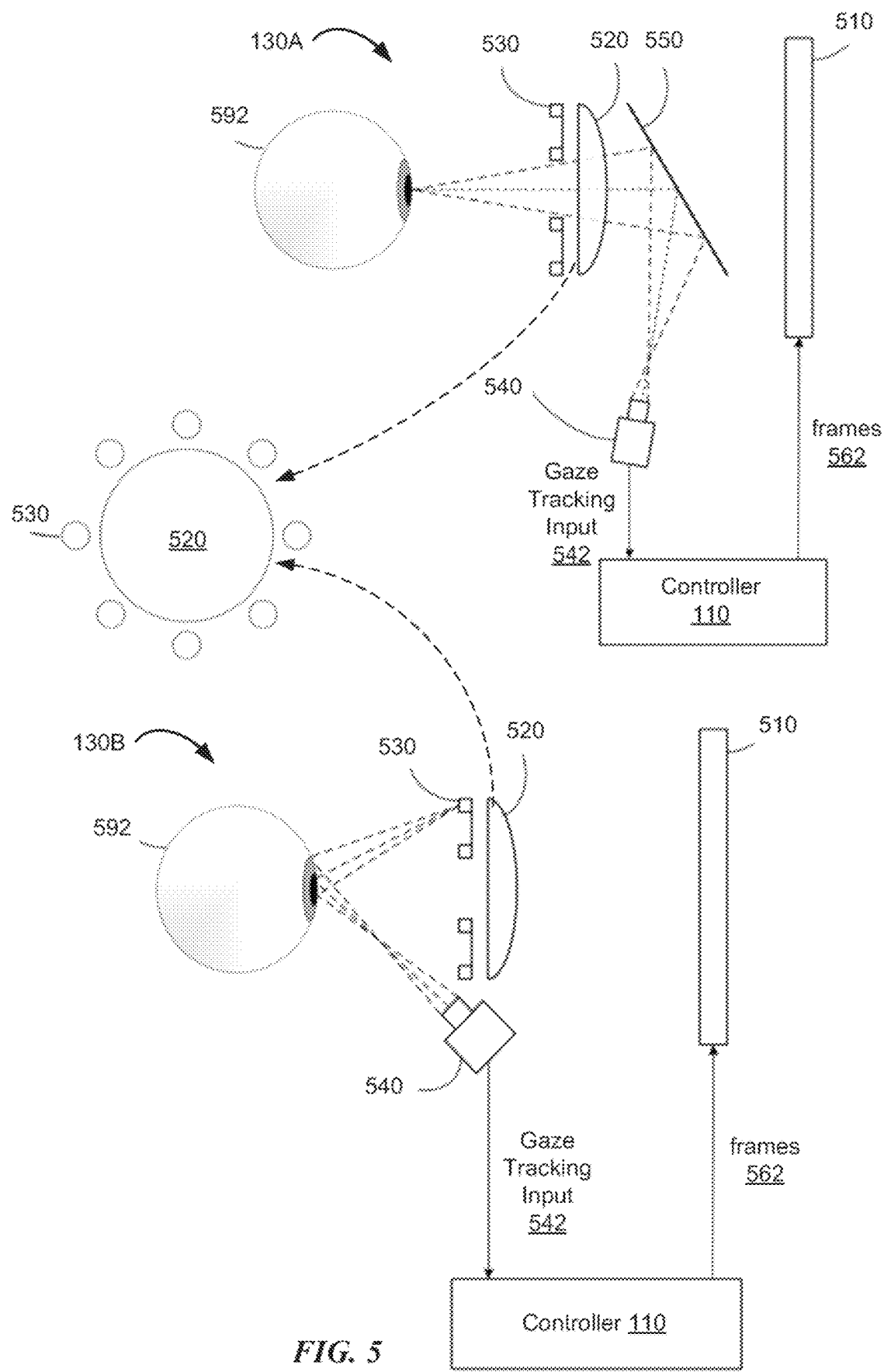
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect JR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-JR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., JR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
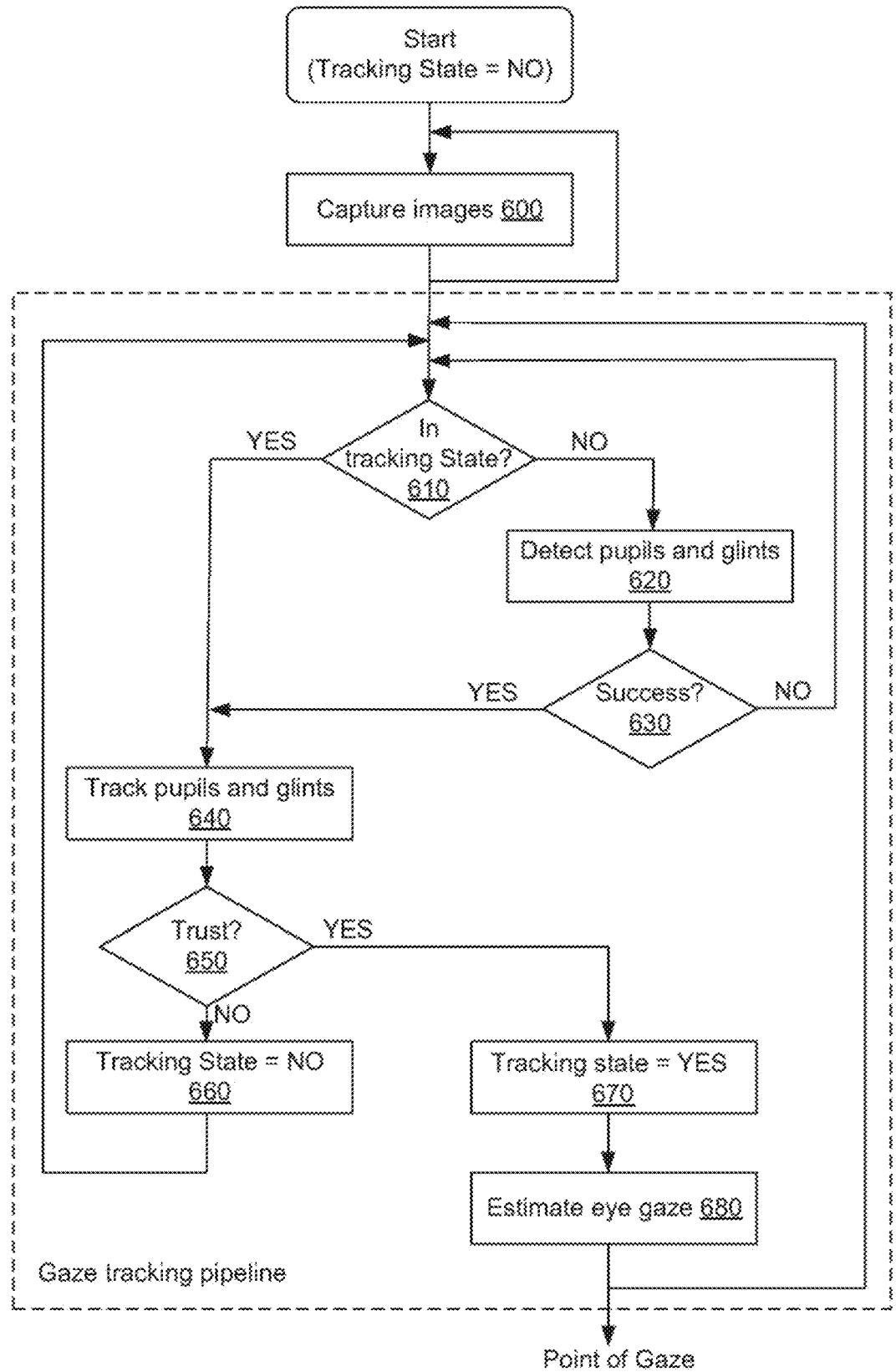
FIG. 6 is a flow diagram illustrating a glint-assisted gaze tracking pipeline in some embodiments.
Figure 7A:
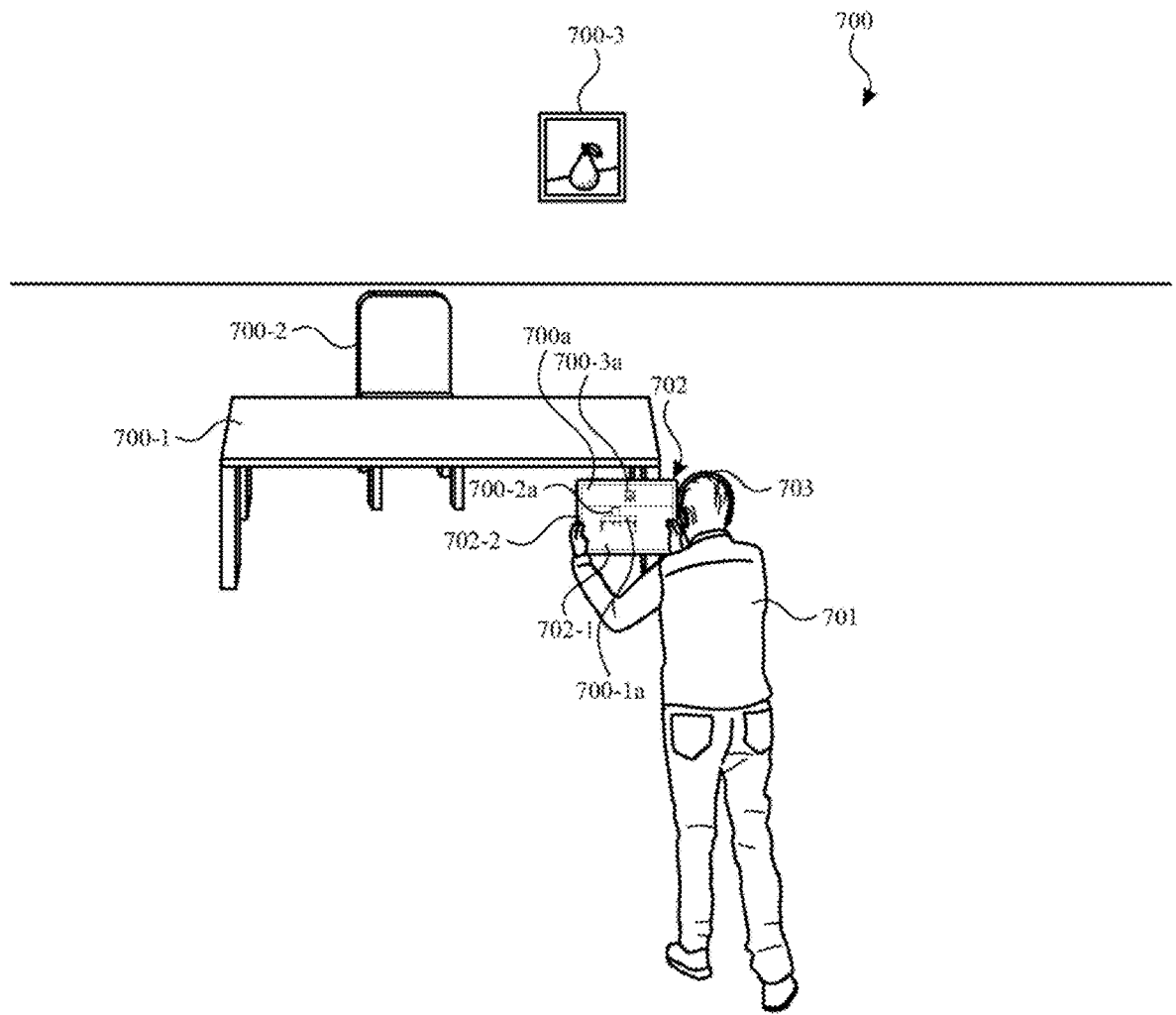
FIGS. 7A-7N illustrate example techniques for providing reminders for computer-generated user experience sessions in an extended reality environment, in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At

610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more output generation components and one or more sensors.

FIGS. 7A-7N illustrate examples of providing reminders for computer-generated user experience sessions in an extended reality environment. FIG. 8 is a flow diagram of an exemplary method 800 for providing reminders for computer-generated user experience sessions in an extended reality environment. The user interfaces in FIGS. 7A-7N are used to illustrate the processes described below, including the processes in FIG. 8.

The figures and accompanying description are provided to describe various embodiments of a computer-generated user experience session in an XR environment. The various embodiments are described with respect to an example user experience session that is provided by a meditation application operating at a computer system. This user experience session is referred to as a "meditation session." The meditation session is described herein as having various phases or portions with respective visual and audio characteristics for the meditation session and/or respective portions thereof. For example, the meditation session is described as having an introductory portion, a guided breathing portion, a reflection portion, and an outro portion. Additionally, the meditation session is described as having various visual characteristics such as, for example, virtual objects (e.g., shapes, particles, and/or user interfaces), virtual overlays, virtual wallpapers, and visual effects. The meditation session is also described as having various audio characteristics such as, for example, curated soundscapes, which may include sound effects, music, reminders, and guided instruction. The meditation session is described as being provided in an XR environment. In some embodiments, the XR environment is an AR environment. In some embodiments, the XR environment is a VR environment. In some embodiments, various options, settings, parameters, and/or characteristics of the meditation session are determined based on whether the meditation session is being performed in an AR environment or a VR environment. For example, in some embodiments, the audio and/or visual characteristics for a meditation session in a VR environment are selected from a subset of audio and/or visual characteristics that are available for a meditation session in an AR environment. In some embodiments, the visual and/or audio characteristics for a meditation session can be selected randomly (or pseudorandomly), optionally with a bias towards not repeating audio and/or visual characteristics of a previous meditation session, to provide a unique user experience for each session. For example, the reminders use different words or phrases so as not to repeat a previous reminder or become repetitive. In some embodiments, the audio and/or visual characteristics are selected pseudorandomly. For example, a random number generator is used to select audio characteristics from a superset of audio characteristics. Similarly, a random number generator is used to select the visual characteristics from a superset of visual characteristics. In some embodiments, when an audio and/or visual characteristic is selected pseudorandomly (or randomly) and the selected audio and/or visual characteristic has previously been used (or has been previously used with other particular audio and/or visual characteristics), the selected audio and/or visual characteristic is disregarded and a different audio and/or visual characteristic is selected pseudorandomly (or randomly). It should be appreciated that aspects of the various embodiments described herein can be combined, rearranged, and/or omitted in accordance with the examples described and illustrated in the respective figures. Selection of an element from a set of elements randomly or pseudorandomly entails selecting an element with apparent randomness either based on a number generated from a true source of randomness such radioactive decay or another nondeterministic source or based on a number generated from a deterministic source that is statistically random and produces a result that appears to be random even if it is not in fact truly random. Selecting an element from a set of elements with apparent randomness produces results that do not have discernable deterministic pattern to a typical user of the device.

FIG. 7A depicts physical environment 700, which is a physical room that includes physical desk 700-1, physical chair 700-2, and physical painting 700-3. User 701 is in physical environment 700, holding device 702 (e.g., a tablet or smartphone) and wearing audio output device 703 (e.g., headphones or earbuds) that are connected (e.g., wirelessly or through a wired connection) to device 702. Device 702 includes display 702-1 and one or more cameras 702-2. The device cameras are referred to collectively as camera 702-2, and can include a camera located on a display-side of the device (a front-facing camera) and/or a camera located on a different side of the device than the display (a rear-facing camera). In the embodiment depicted in FIG. 7A, the physical desk 700-1, chair 700-2, and painting 700-3 are within a field-of-view of a rear-facing camera of device 702, and a view of the physical environment is displayed on device display 702-1 while the user experience session is not active. The view of the physical environment is a representation 700a of physical environment 700, including representation 700-1a of the physical desk 700-1, representation 700-2a of physical chair 700-2, and representation 700-3a of the physical painting 700-3. In the embodiments described herein, device 702 is used to provide a user experience session (also referred to as a meditation session) in an XR environment displayed on display 702-1 of device 702. Audio of the user experience session is output at audio output device 703. In some embodiments, however, audio can be output using different audio sources such as one or more speakers of device 702. Display 702-1 is a touchscreen display that can be used to display the XR environment and detect user inputs (e.g., touch inputs, tap gestures, swipe gestures, and/or text inputs) for interacting with device 702, the user experience session, and/or the XR environment. In some embodiments, camera 702-2 can be used to detect user inputs (e.g., hand gestures, biometric inputs, and/or breathing actions or gestures) for interacting with device 702, the user experience session, and/or the XR environment. In some embodiments, device 702 includes a microphone that can be used to detect user inputs (e.g., voice commands and/or ambient sounds) for interacting with device 702, the user experience session, and/or the XR environment.

In the embodiment depicted in FIGS. 7A-7N, device 702 is a computer system (similar to computer system 101 in FIG. 1A) that is used to provide a user experience session in an XR environment. It should be appreciated, however, that the user experience session can be provided in an XR environment using a different type of computer system. For example, instead of (or in addition to) using device 702, the computer system can be a head-mounted device (HMD) that is worn by user 701, such as HMD 1-100 or HMD X702 (described below). In such embodiments, the HMD includes a display component that is analogous to display 702-1 and one or more sensors analogous to camera 702-2. For example, the display can be an opaque display screen with display components and/or a transparent or translucent display through which user 701 may directly view physical environment 700 and upon which virtual elements of the user experience session can be displayed or projected. The HMD may further include speakers and/or other audio output devices integrated into the HMD for providing audio output, and one or more cameras, microphones, and/or other sensors that are used to capture images (e.g., video and/or pictures) of physical environment 700 (e.g., for display at the HMD and/or for detecting input) and to receive user input in the form of hand gestures, voice gestures, gaze gestures, and/or other input forms described herein. Thus, while the methods for providing reminders for a user experience session in an XR environment are discussed herein with respect to device 702, it should be appreciated that the methods can be performed using other computer systems including, for example, an HMD.

Figure 7B:
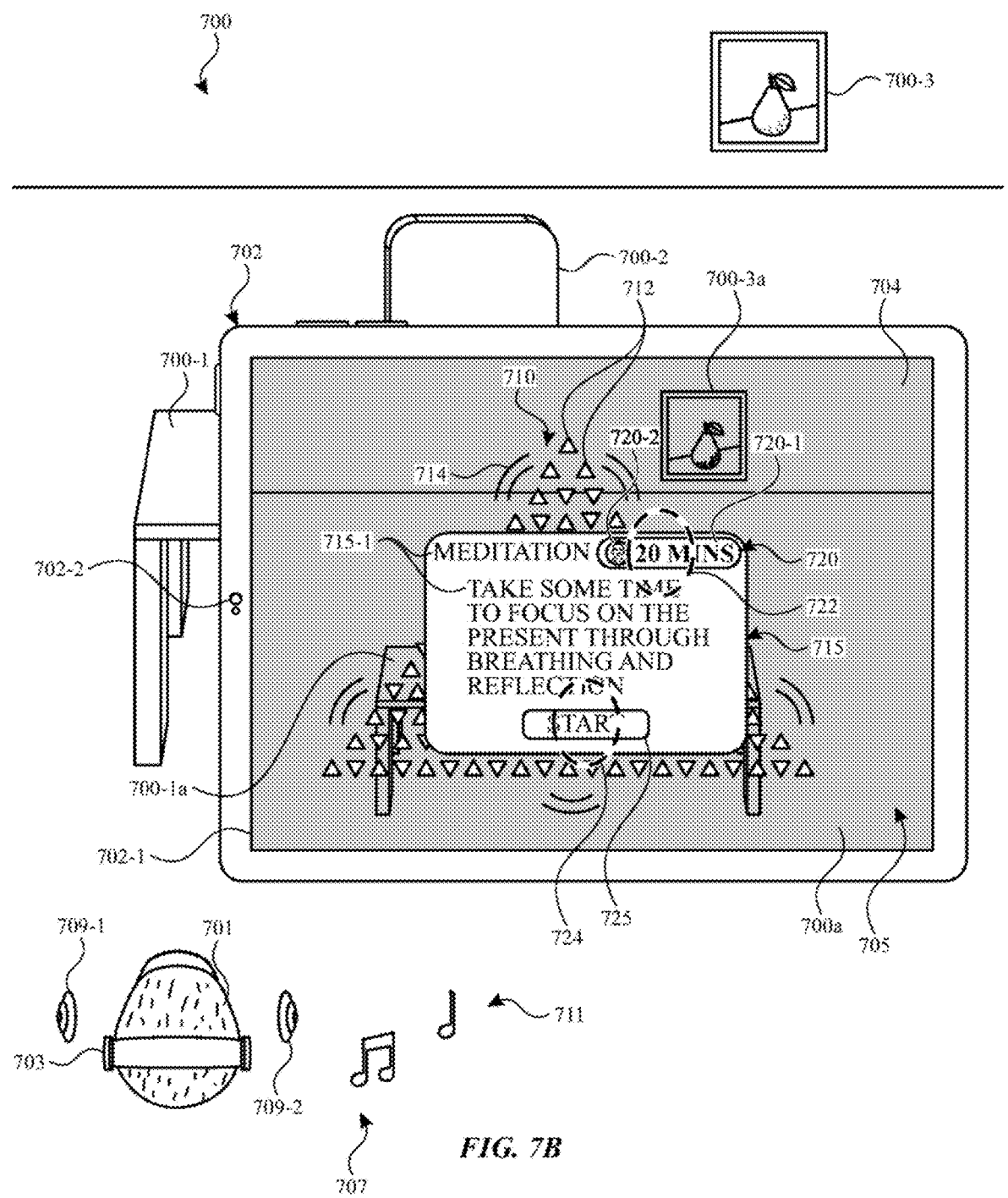

FIGS. 7B-7N depict user interfaces at device 702 for embodiments in which the mediation application is active and, in some instances, when the meditation user session is ongoing. In FIG. 7B, device 702 is providing a first portion (an introductory portion, a starting portion, and/or a portion before the guided breathing portion) of the meditation session and displays, via display 702-1, virtual interface 705 overlaying the displayed representation 700a of physical environment 700. In some embodiments, the virtual interface is displayed as part of an AR environment for the user experience session. In such embodiments, the virtual interface includes a dimming effect 704 that is displayed over the representation 700a of physical environment 700. The dimming effect dims the user's view of the physical environment by allowing, for example, 98% visibility of the physical environment by displaying the dimming effect with 98% transparency (or 2% opacity). The dimming effect can be greater or less, in some embodiments, and can have varying amounts of dimming at different portions of the device display (for example, less opacity of the dimming effect near the center of the display and increasing opacity of the dimming effect towards the perimeter of the device display). The dimming effect can indicate to user 701 that the user is viewing an AR environment and, in some embodiments, helps to focus the user on aspects of the user experience session by reducing distractions that may appear in the physical environment. In some embodiments, the virtual interface is displayed as part of a VR environment for the user experience session. In such embodiments, the virtual interface is opaque and the physical environment 700 may not be visible through the virtual interface. Unless specifically noted otherwise, the values and ranges discussed herein for the various visual effects, such as the dimming effect, are intended as non-limiting examples.

In some embodiments, virtual interface 705 is displayed as part of the user experience session in the XR environment. For example, in FIG. 7B, device 702 displays virtual interface 705 as part of the meditation session provided by a meditation application operating at device 702 and, therefore, includes additional virtual elements that are associated with the meditation session. Specifically, in FIG. 7B, device 702 displays virtual object 710, virtual particles 712, and virtual menu 715 as part of an introductory portion or introductory phase of the meditation session in the XR environment. In some embodiments, virtual interface 705, including dimming effect 704, virtual object 710, particles 712, and menu 715, are displayed by device 702 in response to launching the meditation application in the XR environment (e.g., by detecting selection of a virtual icon for the meditation application in the XR environment and/or by detecting an audio instruction to launch the mediation application in the XR environment). In some embodiments, virtual interface 705 can include a virtual wallpaper.

In some embodiments, the virtual interface is displayed as a part of an XR environment that is separate from or disassociated with the user experience session. For example, the virtual interface can be displayed as part of a virtual staging room or virtual "home" environment that the device displays as part of an XR environment prior to beginning the user experience session (e.g., prior to launching the meditation application and/or after launching the mediation application and before beginning the user experience session). Sometimes, in such embodiments, device 702 does not display virtual object 710, particles 712, or menu 715 and, instead, optionally displays icons or other virtual elements that can be selected to manage the user's experience with the XR environment and/or device 702. For example, device 702 can display icons that are selectable to launch an application operating at the device and/or to access various settings of the XR environment and/or device 702. In some embodiments, user 701 can interact with other users and share the XR environment, including applications launched in the XR environment, with other users.

Virtual object 710 is a graphical element that moves and changes appearance while the meditation application is active (e.g., during the meditation session or not during the meditation session). As shown in FIG. 7B, virtual object 710 has a generally triangular macro shape that is formed by a collection of particles 712. During the introductory portion of the meditation session, device 702 displays particles 712 moving in a rhythmic pattern such that virtual object 710 has a pulsating, swaying, and/or other rhythmic movement (represented in the drawings by lines 714) that conveys a relaxing or soothing environment to user 701. In some embodiments, device 702 displays particles 712 moving closer together and then farther apart, causing virtual object 710 to expand and contract in a rhythmic pattern that mimics a predetermined breathing cadence (or other biometric rhythm such as a heartbeat, brainwaves, or walking rate) while retaining the generally triangular macro shape. In some embodiments, virtual object 710 pulsates (expands and contracts) at a rate that is faster or slower than a predetermined breathing cadence. Additionally, virtual object 710 can have a different macro shape or appearance than that shown in FIG. 7B. For example, in some embodiments, virtual object 710 is a two-dimensional object having a macro shape that is a circle, square, triangle, rectangle, or abstract, two-dimensional shape. In some embodiments, virtual object 710 is a three-dimensional object having a macro shape that is a sphere, orb, cube, rectangular prism, pyramid, or an abstract, three-dimensional shape such as a cloud, or moving arrangement of particles that has an appearance of a floating mist or swirling paintbrush strokes.

In the embodiment illustrated in FIGS. 7B-7N, particles 712 are shown having a triangular shape. However, the particles can have different two- and or three-dimensional shapes or appearances such as circles, spheres, pyramids, petals, leaves, squares, cubes, clouds, mist droplets, paintbrush strokes, or any combination thereof. In some embodiments, some of the particles have a uniform spacing between adjacent particles. In some embodiments, some of the particles have a non-uniform spacing between adjacent particles. In some embodiments, some of the particles have an overlapping arrangement. In some embodiments, the particles move between the various appearances and spacing arrangements as virtual object 710 moves in the rhythmic pattern. For example, in an expanded state of virtual object 710, particles 712 have a spaced-apart arrangement and, in a contracted state of virtual object 710, particles 712 have an overlapping or less-spaced arrangement. Furthermore, virtual object 710 and/or particles 712 can have different visual characteristics such as an animated effect or appearance, a translucence (e.g., a partial translucence or a total translucence) of the particles, a simulated reflection of light detected in the physical environment (e.g., a simulated reflection off the particles and/or macro shape and/or a simulated bending of light), a simulated reflection of virtual lighting, or a combination thereof. In some embodiments, the visual characteristics of particles 712 and/or virtual object 710 change based on various criteria such as, for example, the physical environment, the XR environment, a state of the meditation session, movement of the user and/or device 702, user input, and/or any combination thereof. In some embodiments, the visual characteristics of the user experience session are randomly (or pseudorandomly) generated by device 702. For example, in some embodiments, device 702 generates the virtual object and or particles having different, randomly selected visual characteristics each time the meditation application is launched. In some embodiments, the visual characteristics are randomly selected with a bias towards not repeating a previously displayed set of visual characteristics for the user experience session.

In FIG. 7B, device 702 displays menu 715, which is a virtual menu user interface for selecting or modifying various aspects of the meditation session. Menu 715 includes text 715-1 providing context for the meditation session to user 701 (e.g., informing the user that the meditation application is active, indicating that the user experience session is a meditation session, and/or instructing the user to prepare for the meditation session). Menu 715 also includes options element 720, which is selectable (e.g., via input 722 and/or via an audio input) to display an options menu for the meditation session. Options element 720 also includes duration indication 720-1 indicating the currently selected duration for the meditation session (e.g., a duration of one or more portions of the meditation session and/or a combined duration for the guided breathing and reflection portions of the mediation session and, optionally, the outro portion), and coach indication 720-2 indicating the currently selected coach for the meditation session. As shown in FIG. 7B, coach indication 720-2 indicates that a male coach is currently selected for the meditation session, and duration indication 720-1 indicates that the duration of the meditation session is selected to be 20 minutes. Menu 715 also includes start element 725, which is selectable (e.g., via input 724 and/or via an audio input) to begin the meditation session by transitioning from the introductory portion to the guided breathing portion of the meditation session. In some embodiments, the meditation application is active, but the meditation session is not considered to be ongoing during the introductory and outro portions. In such embodiments, the meditation session is considered to be started by selecting start element 725. In some embodiments, the meditation session is considered to be ongoing during the introductory and outro portions. In such embodiments, the meditation session is started by launching the meditation application, and selecting start element 725 transitions from one portion of the meditation session to a different portion of the meditation session (e.g., transitioning from the introductory portion to the guided breathing portion or transitioning to another portion of the meditation session).

Figure 7C:
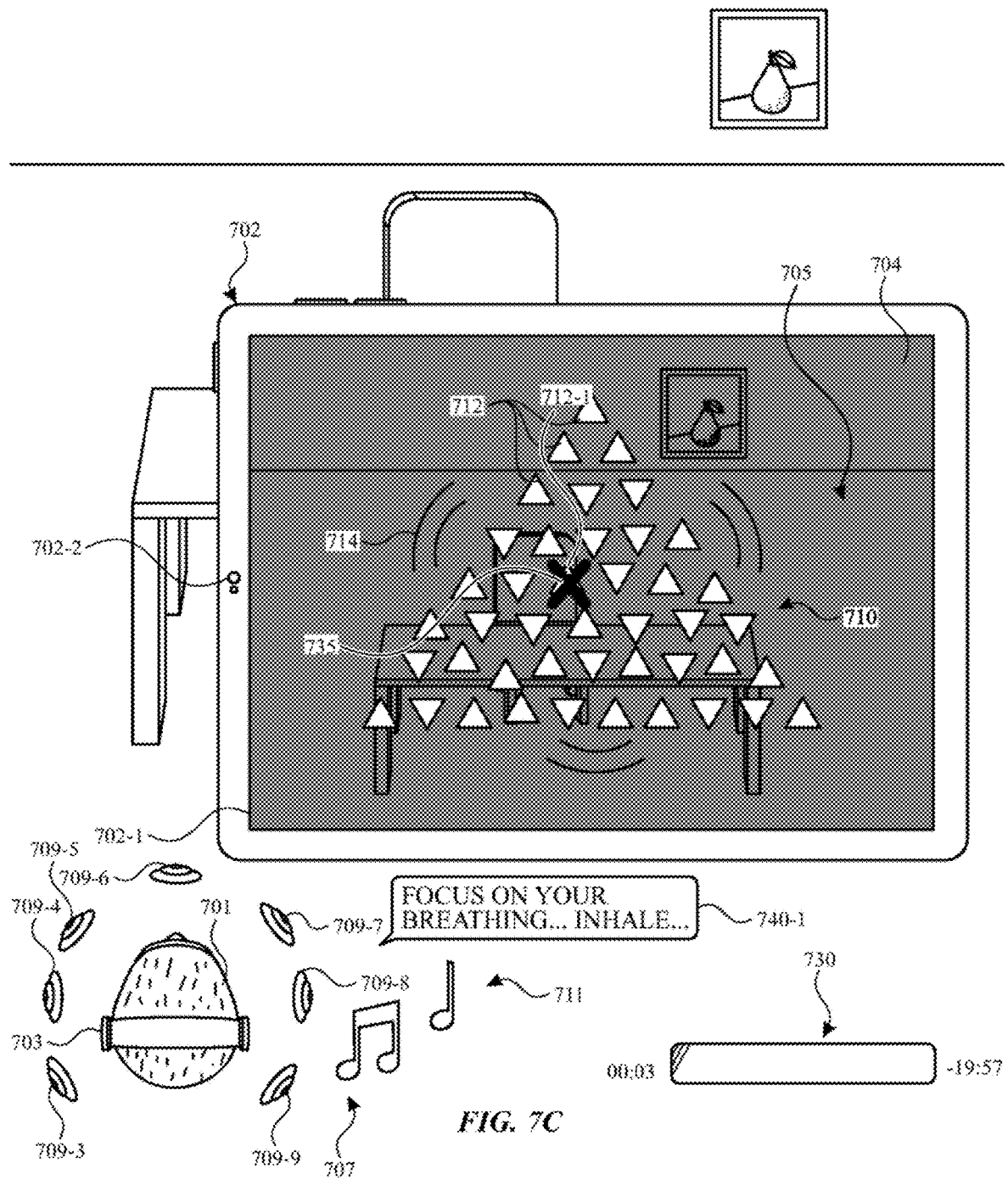

FIG. 7B also depicts audio schematic 707, which is a schematic representation of some of the characteristics of the audio output by device 702 for the user experience session. Audio schematic 707 is not part of the user interface but is provided for a better understanding of the described techniques. Audio schematic 707 shows a relative position of user 701 and audio output device 703 in physical environment 700 (showing a top-down view of the user's head). Audio schematic 707 also includes audio indicator 711, representing a particular soundscape being output during the meditation session, and spatial audio indicators 709-1 and 709-2, indicating perceived locations of the audio for the meditation session relative to the location of the user's head (the location of the audio as perceived by user 701 while the audio is played using audio output device 703). In the embodiment depicted in FIG. 7B, the audio is output in stereo. Accordingly, spatial audio indicator 709-1 represents the perceived location of a channel of the audio (e.g., left channel and/or first channel) adjacent the left side of the user's head, and spatial audio indicator 709-2 represents the perceived location of another channel of the audio (e.g., right channel and/or second channel) adjacent the right side of the user's head. Thus, as depicted in FIG. 7B, user 701 is facing forward (e.g., facing physical environment 700 as shown in FIG. 7A or/and facing device 702), and device 702 is causing the soundscape of the meditation session to be played in stereo using audio output device 703. In some embodiments, the audio output in the embodiment depicted in FIG. 7B is a preview of the soundscape that will be played during the meditation session (e.g., after the introductory portion, during the guided breathing portion, during the reflection portion, and/or during the outro portion). In some embodiments, the soundscape is played having different audio characteristics during the preview than during the meditation session. For example, the audio is output at a lower volume as indicated by the smaller size of audio indicator 711 in FIG. 7B (compared to in FIG. 7C). As another example, the soundscape is output in stereo rather than in a full audio immersion having three-dimensional, perceived spatial locations (referred to herein as "spatial audio"), as illustrated in FIG. 7C and discussed below.

In some embodiments, device 702 creates the soundscape for a particular user experience session using a collection of curated sound components. The device assembles the sound components to provide a harmonious audio experience for the user. In some embodiments, the soundscape for a particular user experience session is created to convey a particular mood or theme. For example, for the meditation session, the soundscape is created to provide relaxing audio that helps the user to focus on their breathing rhythm or a particular theme or topic. In some embodiments, device 702 randomly (or pseudorandomly) selects the sound components to create the soundscape. In some embodiments, the sound components are randomly selected, but with a bias towards not repeating a previously created or previously used soundscape. In some embodiments, the sound components that are available for creating a respective soundscape are selected to be harmonious when played together at randomly selected times. In some embodiments, the sound components selected for the soundscape repeat on loop for the user experience session or for a portion of the user experience session. In some embodiments, device 702 introduces a randomly (or pseudorandomly) generated sound component that is played at various (in some embodiments, random) moments throughout the soundscape in order to introduce variety to the soundscape. In some embodiments, a soundscape has a common start and ending sound. In some embodiments, the audio characteristics for the soundscape change based on animation of virtual object 710. For example, the audio volume modulates with the pulsing animation of virtual object 710, increasing as virtual object 710 expands, and decreasing when virtual object 710 contracts. In some embodiments, a spatial location of the audio changes with the pulsing animation of virtual object 710. For example, the audio sounds like it is moving closer towards the user when the object expands and sounds like it is moving away from the user when the object contracts.

In some embodiments, in response to detecting input 722 on options element 720, device 702 displays an options menu for customizing various settings of the meditation session. For example, the user can set a duration for the meditation session such as 5 minutes, 10 minutes, 15 minutes, or 20 minutes. In some embodiments, reminders are not provided for meditation sessions that are less than a particular duration such as, for example, 15 minutes. For example, a 5-minute or 10-minute meditation session does not include reminders in order to avoid inundating the user with feedback while the user is trying to relax or focus on the meditation session. In some embodiments, the options menu can be used to set a defined breathing cadence for the mediation session. In some embodiments, animated effects, such as the pulsating rhythm of virtual object 710, are based on the selected breathing cadence. In some embodiments, the breathing cadence can be set to seven breaths per minute (bpm), five bpm, or ten bpm. In some embodiments, the options menu can be used to select a coach for the meditation session. The selected coach is associated with one or more audio recordings that device 702 outputs as part of the soundscape during the meditation session (e.g., audio guidance 740 and or other audio recording), providing user 701 with instruction, encouragement, and/or guidance for the meditation session, and providing user 701 with a reminder to focus their attention on the meditation session if the user becomes distracted. In some embodiments, the audio recordings are comprised of different scripts recorded by the coach for playback during various portions of a meditation session. Each coach has their own distinct voice with a speaking cadence, tone, intonation, accent, and other speech characteristics that are unique to the selected coach.

In response to detecting input 724 on start element 725, device 702 transitions to a second portion (e.g., a guided breathing portion, a portion after the introductory portion, and/or a non-introductory portion) of the meditation session as depicted in FIGS. 7C-7K. When transitioning from the introductory portion to the guided breathing portion of the meditation session, device 702 increases the user's visual and audio immersion by displaying virtual object 710 growing to a larger size, increasing dimming effect 704, and transitioning from outputting the audio in stereo to outputting spatial audio. During the transition, device 702 increases dimming effect 704 by gradually increasing opacity of the dimming effect from, for example, 2% to 95% or 5% to 90%, and displays virtual object 710 and, optionally, particles 712 growing to a larger average size than in the introductory portion. In some embodiments, virtual object 710 and particles 712 are output as three-dimensional objects. In some embodiments, the transition from the introductory portion to the guided breathing portion includes displaying the virtual object and particles transitioning from two-dimensional objects to three-dimensional objects. In some embodiments, other visual characteristics of virtual object 710 and particles 712 change during the transition. For example, the objects are displayed having an increased brightness, translucence, and/or with a changed reflection of simulated or detected light. Device 702 increases the user's audio immersion by outputting the soundscape at audio output device 703 having an audio effect whereby the audio gradually increases in volume (as indicated by the larger size of audio indicator 711) and sounds as if it is moving from the right and left stereo locations to different perceived locations around the user, as discussed in greater detail below. In some embodiments, device 702 outputs, via audio output device 703, a starting sound such as, for example, a ding or chime to indicate the transition from the introductory portion to the guided breathing portion. In some embodiments, device 702 outputs, via audio output device 703, the same ding or chime sound when transitioning to an outro portion of the meditation session.

In the guided breathing portion, device 702 provides a combination of visual and audio effects to help user 701 focus their breathing to a controlled breathing rate. Device 702 displays virtual object 710 and, optionally, particles 712 having a larger average size than in the introductory portion. In some embodiments, device 702 displays particles 712 spaced apart a greater amount (e.g., a greater average amount and/or a greater instantaneous amount) than during the introductory portion. During the guided breathing portion of the meditation session, device 702 displays virtual object 710 expanding and contracting at a rate that is set by the selected breathing cadence, and outputs (e.g., using audio output device 703 and/or an audio generation component integrated into an HMD) audio guidance 740 instructing user 701 to control their breathing to match the selected breathing cadence. For example, device 702 displays virtual object 710 expanding and contracting at a rate that matches a breathing cadence of five breaths per minute, and outputs the soundscape with audio characteristics that encourage the user to conform their own breathing rate to match the selected breathing cadence of five breaths per minute. In some embodiments, virtual object 710 changes to a different (e.g., expands to a larger or contracts to a smaller) size in the guided breathing portion than during the introductory portion of the meditation session.

Figure 7D:
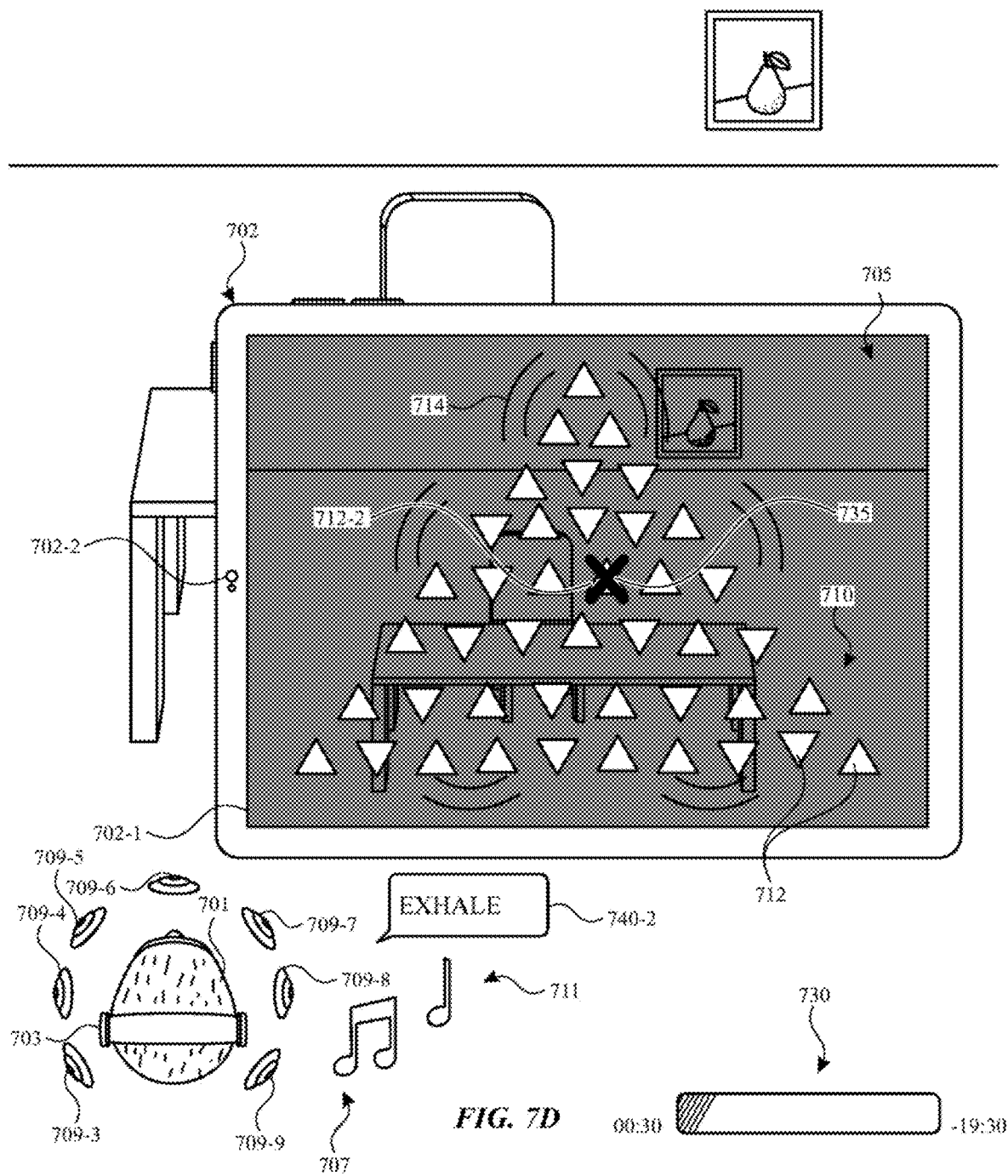
Figure 7E:
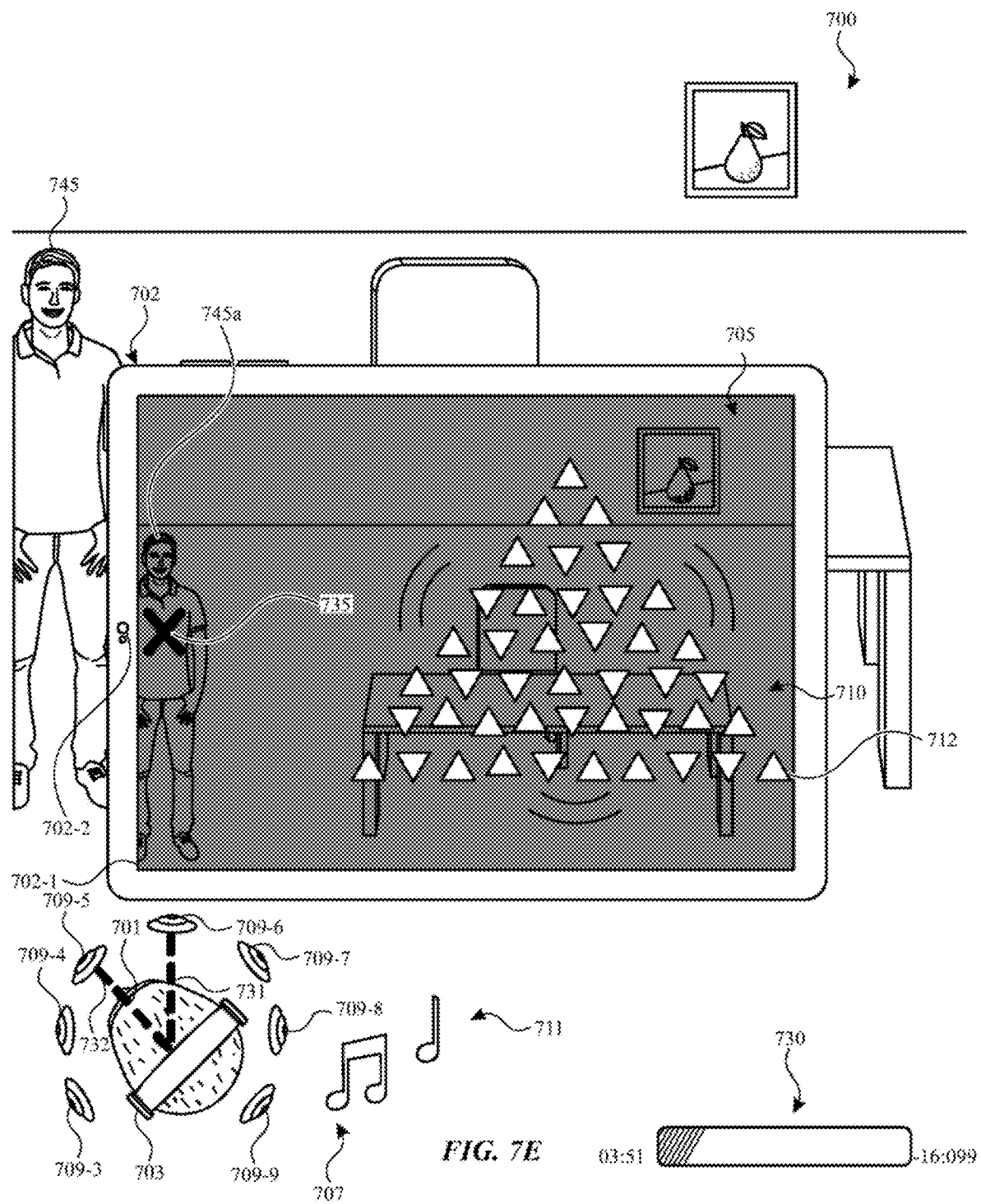
Figure 7F:
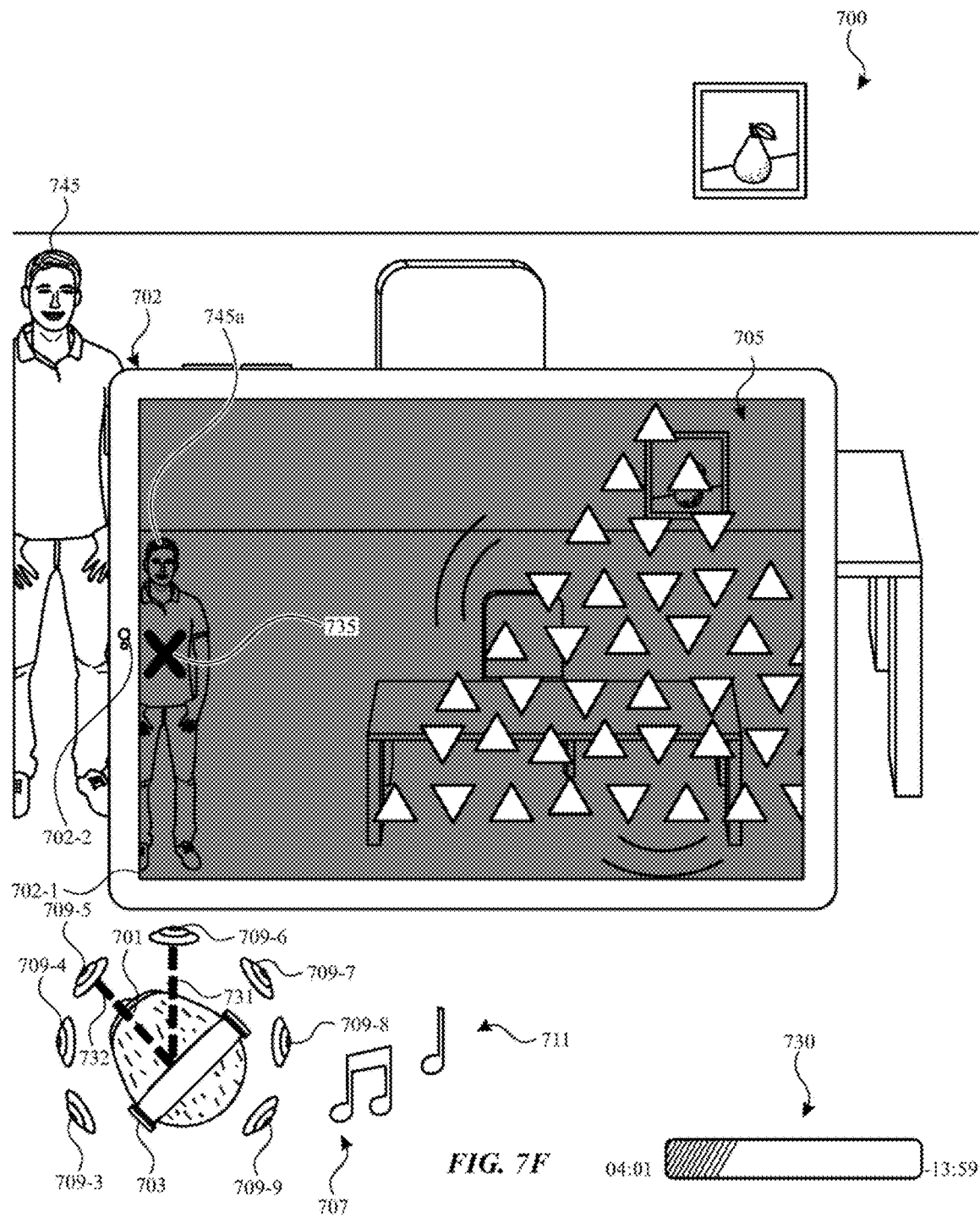
Figure 7G:
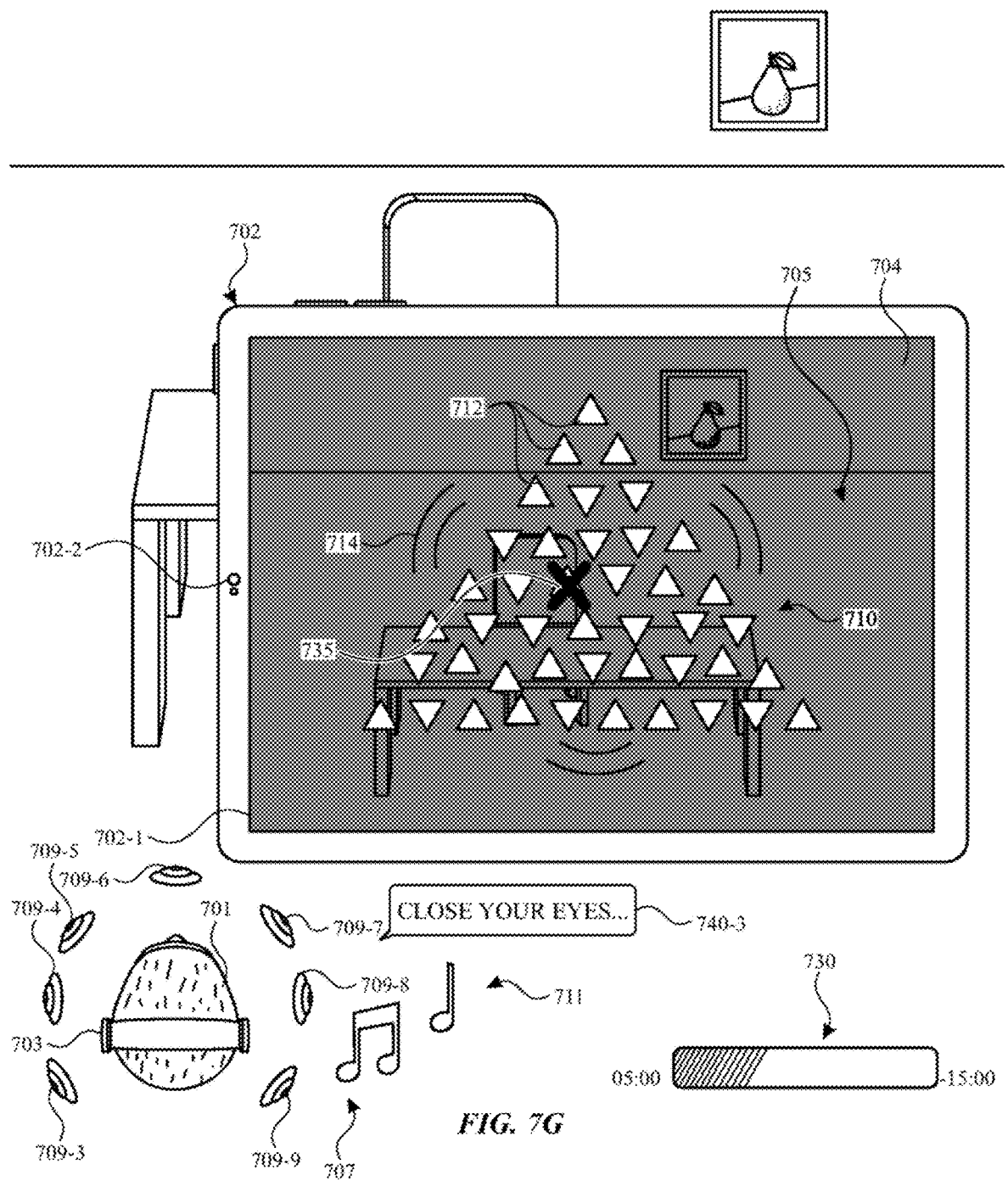
Figure 7H:
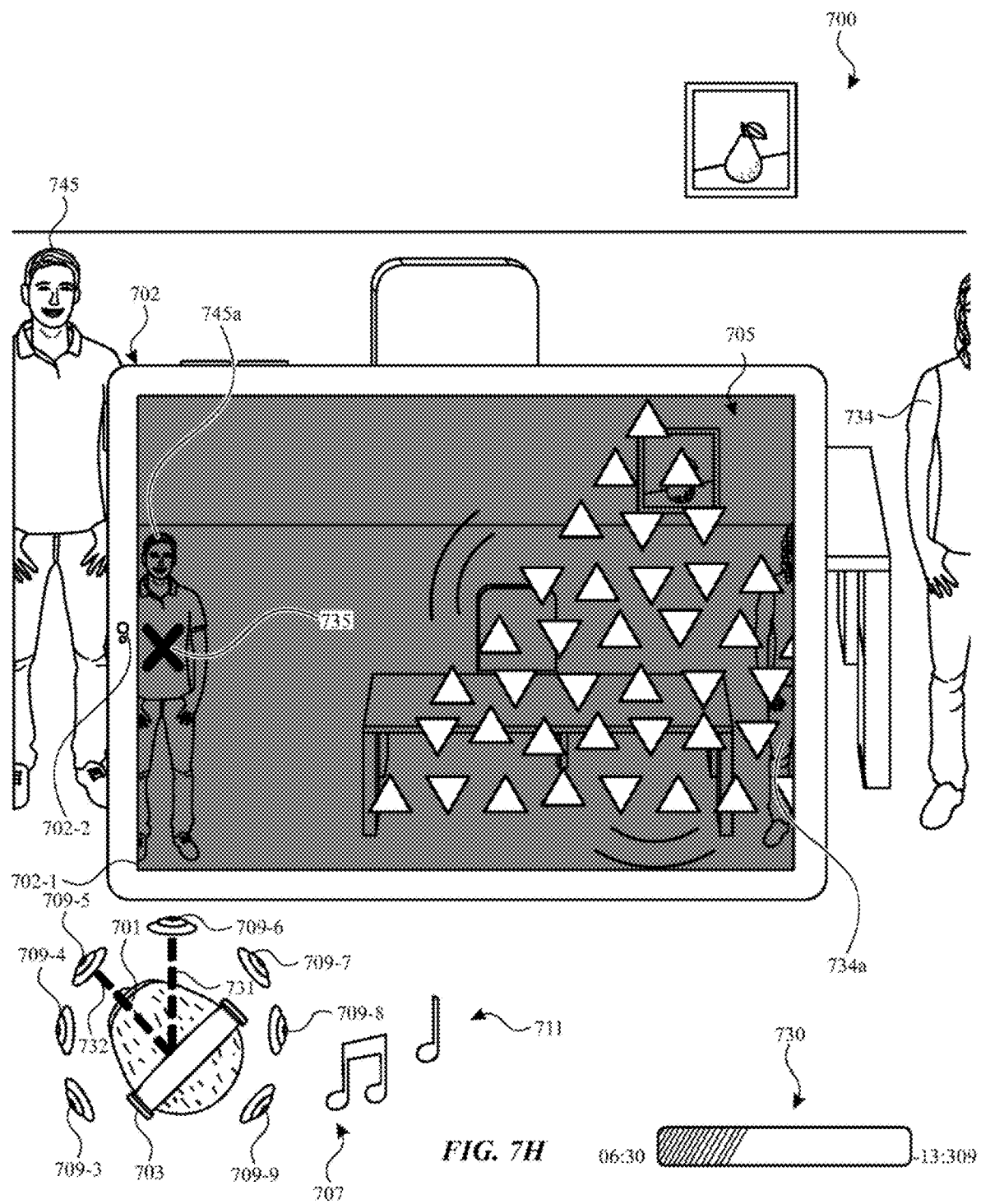
Figure 7I:
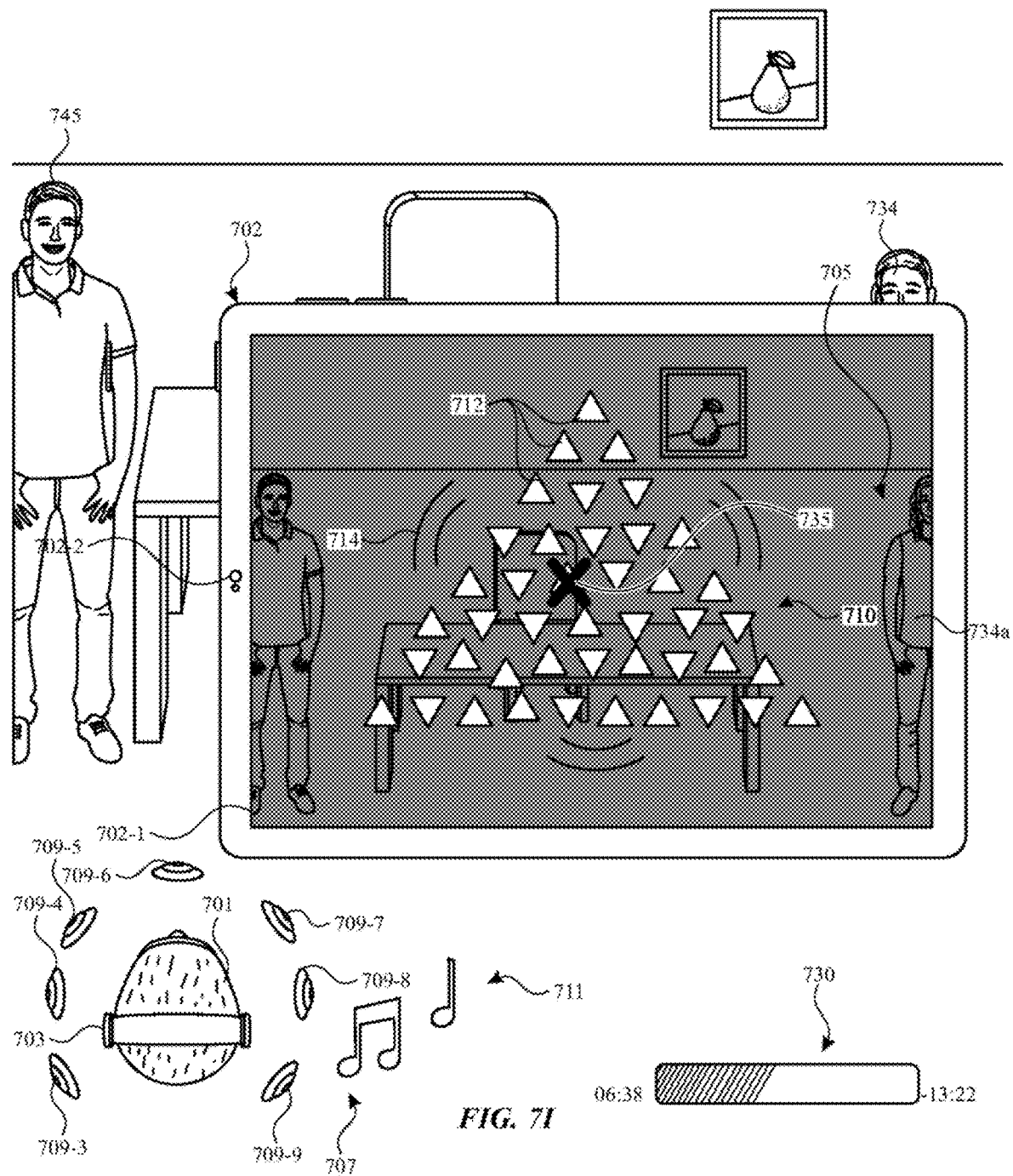
Figure 7J:
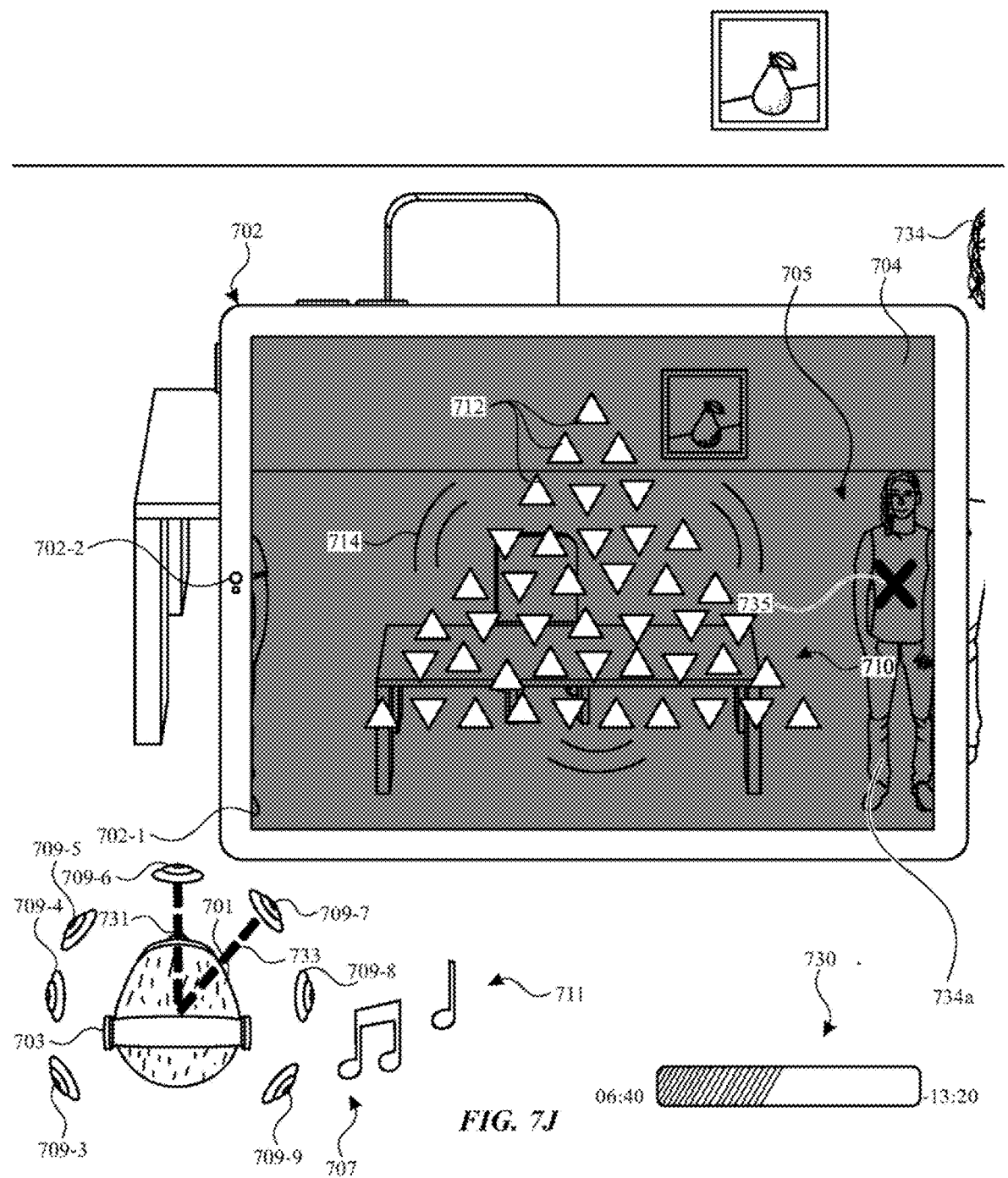
Figure 7L:
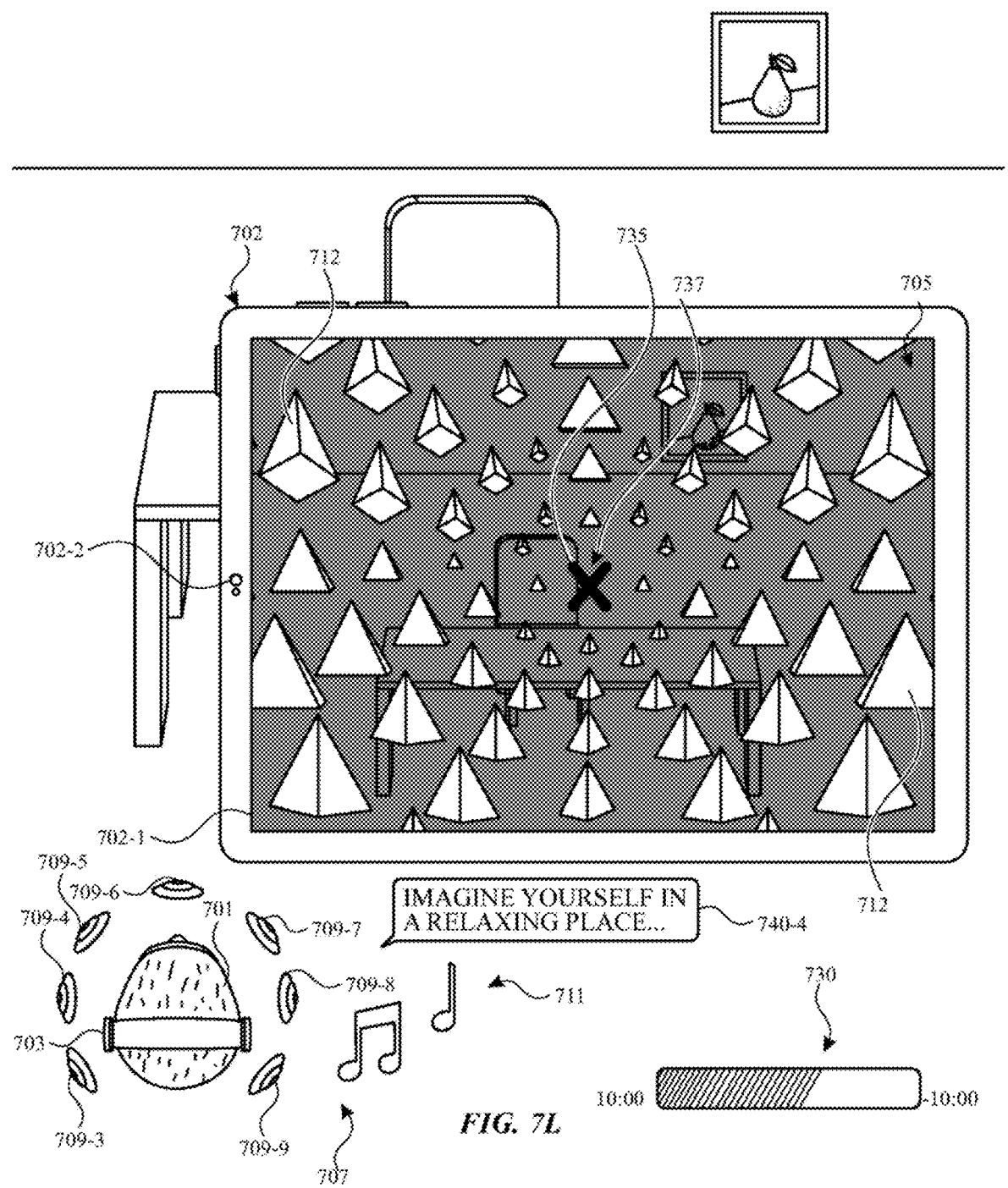

FIGS. 7C and 7D depict various moments of the guided breathing portion of the meditation session. Specifically, FIG. 7C depicts the contracted state of virtual object 710, which coincides with the expectation that user 701 is exhaling, or has just finished exhaling, and is about to inhale. While the virtual object is displayed in the contracted state, device 702 outputs the soundscape with audio guidance 740-1 in the voice of the selected coach, instructing the user to inhale. Device 702 then displays virtual object 710 expanding at a steady rate (presumably, while the user is inhaling) until it reaches the expanded state, as depicted in FIG. 7D, which coincides with the expectation that user 701 has inhaled and is about to exhale. Device 702 then outputs, at audio output device 703, audio guidance 740-2, instructing user 701 to begin exhaling. Device 702 then displays virtual object 710 contracting at a steady rate (presumably, while the user is exhaling) until it reaches the contracted state, as depicted in FIG. 7C. This process repeats during the guided breathing portion of the meditation session. In some embodiments, the process is repeated for a predetermined amount of time (e.g., half, ⅓, or ¼ of the duration indicted in FIG. 7B).

During the guided breathing portion of the meditation session, device 702 continues to output the soundscape (represented, at least partially, by audio indicator 711) as the device outputs audio guidance 740 and displays virtual object 710 expanding and contracting at the selected breathing cadence. In some embodiments, one or more components of the soundscape audio is output as spatial audio. For example, as shown in FIG. 7C, audio schematic 707 includes spatial audio indicators 709-3 to 709-9, each representing a perceived location of the audio (e.g., the soundscape and/or audio guidance) for the meditation session relative to the location of the user's head. Thus, during the guided breathing portion of the meditation session, user 701 perceives the audio as being located at multiple points around the user's head. In some embodiments, the spatial location of the audio changes during the meditation session. For example, as virtual object 710 is expanding, device 702 adjusts the spatial location of the audio to sound as if particles 712 are moving closer towards user 701, and as virtual object 710 is contracting, device 702 adjusts the spatial location of the audio to sound as if particles 712 are moving away from user 701. This movement of the spatial audio is represented by audio indicators 709-3 to 709-9 having a location closer to the user's head in FIG. 7D and a location farther from the user's head in FIG. 7C. In some embodiments, device 702 outputs sound effects as part of the soundscape. In some embodiments, parts of the soundscape are selected based on an animated effect of the virtual object and/or particles. For example, the soundscape may include an increasing whooshing sound as virtual object 710 expands and particles 712 move closer towards user 701, and a decreasing whooshing sound as the particles move away from user 701 as the virtual object contracts.

FIGS. 7C-7N depict time lapse schematic 730 indicating an amount of time that has lapsed for the meditation session, starting when user 701 selects start element 725. For example, in FIG. 7C, time lapse schematic 730 indicates that three seconds have elapsed since the meditation session started in response to input 724. In FIG. 7D, time lapse schematic 730 indicates that 30 seconds have elapsed since the meditation session started. In the embodiments depicted in FIGS. 7C-7N, time lapse schematic 730 has a total duration of 20 minutes, which corresponds to the duration of the meditation session indicated in FIG. 7B. Time lapse schematic 730 is not displayed as part of the meditation session user interface but is provided in the figures for a better understanding of the described techniques and the timing of events such as, for example, transitions to different portions of the meditation session, output of guidance, and/or output of reminders.

FIGS. 7C-7N also depict attention indicator 735, which is an indication of the location or direction of the user's focus or attention within the XR environment. In some embodiments, attention indicator 735 is a graphical object displayed in virtual interface 705. In some embodiments, attention indicator 735 is not displayed as part of virtual interface 705 but is provided in the figures for a better understanding of the described techniques. In some embodiments, a direction or location of the user's attention is determined using one or more cameras or sensors of device 702 such as, for example, camera 702-2. In some embodiments, the direction or location of the user's attention, as represented by attention indicator 735, is determined based on the location and/or direction of the user's gaze and/or the orientation of the user's head, eyes, and/or face. In some embodiments, the location of the user's attention is indicative of the user's focus on the meditation session. For example, in some embodiments, when the user's attention is located on objects displayed in the meditation session or within a predefined location in the virtual interface, device 702 determines that the user is focusing on the meditation session. Conversely, in some embodiments, when the user's attention is not located on an object displayed in the meditation session or is located outside of a predetermined location in the virtual interface, device 702 can determine, based on various criteria, that the user is not focusing on the meditation session and that, therefore, the user may be distracted.

As described in greater detail below, device 702 can output reminders to user 701 to focus on the meditation session if device 702 determines that the user is distracted and/or otherwise determines that criteria is met for outputting such reminders. In some embodiments, the criteria for outputting a reminder includes a criterion that is met when the user's attention has moved outside of a predetermined target region (e.g., a target region in the XR environment and/or a location that is co-located with virtual object 710), a criterion that is met when the user's attention has remained outside of the target region for a threshold amount of time (e.g., 10 seconds, 12 seconds, or 80% of 12 seconds), and a criterion that is met based on the progression of the meditation session. In some embodiments, the criteria based on progression of the meditation session includes a criterion that is met when at least a threshold amount of time has elapsed for the meditation session (e.g., five minutes), a criterion that is met when the meditation session has a duration of at least a threshold duration (e.g., 10 minutes), a criterion that is met when at least a threshold amount of time has elapsed since the last guidance was output (e.g., one minute), and/or a criterion that is met when there is at least a threshold amount of time (e.g., one minute) remaining before the next guidance output. In some embodiments, the criteria for outputting a reminder can include additional criteria such as, for example, a criterion that is met when the user's eyes are open and/or a criterion that is met if a reminder has not previously been output for the current meditation session. In some embodiments, the criteria for outputting a reminder can include different criteria than previously described or can include fewer criteria than previously described.

Figure 7M:
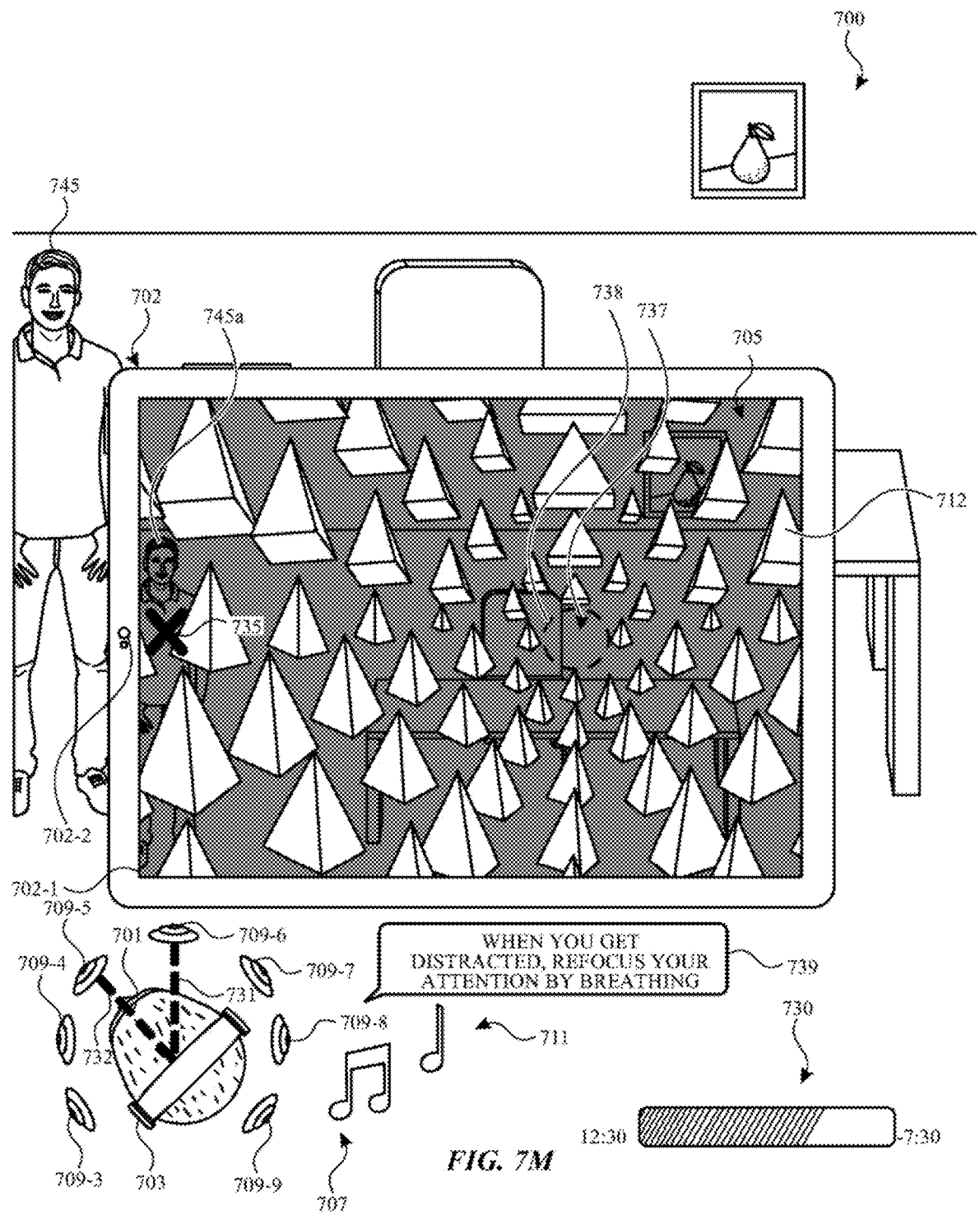
Figure 7N:
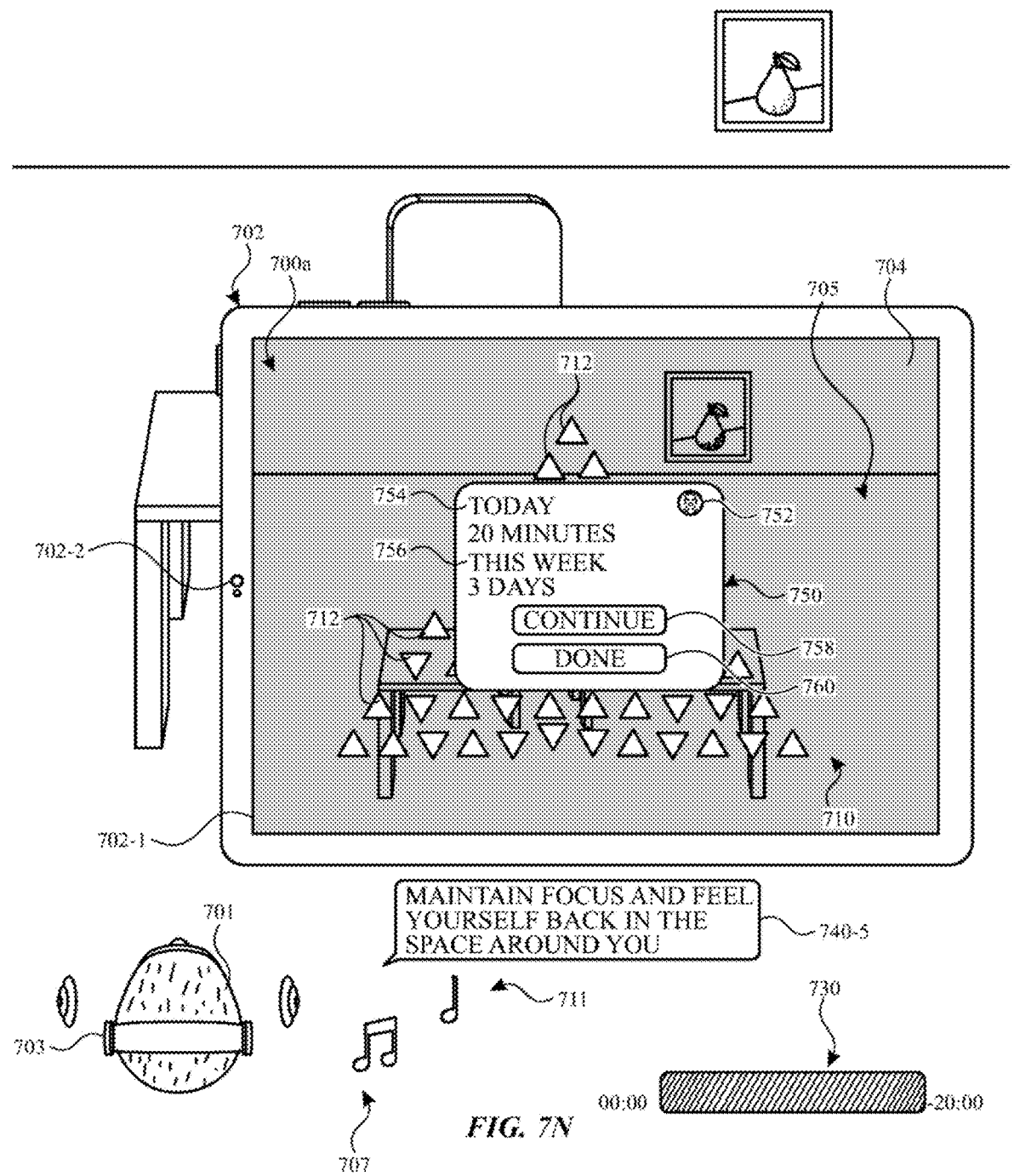

In the embodiments depicted in FIGS. 7A-7N, device 702 determines that the criteria are met for outputting a reminder when the user's attention has moved outside of virtual object 710 (or a target region within virtual object 710 as depicted in FIG. 7M) and has remained outside of virtual object 710 (or the target region) for 80% of a 12-second time period, at least five minutes has elapsed for the meditation session, the meditation session has a total duration of at least 10 minutes, at least one minute has elapsed since the last guidance was output, and at least one minute remains before the next guidance output.

In FIGS. 7C and 7D, the user's attention is on virtual object 710 as the object expands and contracts as previously described. Specifically, the user's attention, as indicated by attention indicator 735, is on particle 712-1 in FIG. 7C and shifts to particle 712-2 in FIG. 7D. Because the user's attention is on virtual object 710, device 702 determines that user 701 is focusing on the meditation session and, therefore, is not distracted. Accordingly, device 702 does not output a reminder for the user to focus on the meditation session.

As depicted in FIG. 7E, at 3:51 (three minutes and fifty-one seconds) into the meditation session, user 701 shifts their attention from the meditation session, rotating their head and the position of device 702 to look at person 745 located in physical environment 700, as indicated by attention indicator 735 located on representation 745a of person 745 and lines 731 and 732 indicating the relative movement of the user's head in schematic 707. Line 731 represents the forward direction of the user's head (e.g., as depicted in FIG. 7D) prior to the user turning their head, and line 732 represents the direction of the user's head while turned as depicted in FIG. 7E. In some embodiments, the direction of the user's attention is determined based on the direction in which the user's head is facing. For example, in FIG. 7E, the user's head is rotated to the left by approximately 45°, and the user's attention is shifted accordingly as indicated by the position of attention indicator 735 on representation 745a of person 745.

In some embodiments, the user's location (as approximated, for example, by the location and/or position of device 702) and the virtual objects in the XR environment (e.g., virtual object 710 and/or particles 712) are world-locked. For example, in FIG. 7E, as the user rotates the position of device 702, device 702 displays particles 712 from the changed perspective of device 702 as it has rotated from the position in FIG. 7D to the position in FIG. 7E. Thus, as the user rotates or moves device 702, the displayed view of the XR environment changes based on the world-locked configuration. In some embodiments, this world-locked configuration is demonstrated by device 702 modifying the output of the soundscape so as to preserve the spatial audio locations for the soundscape, relative to the XR environment, while the user moves. For example, as shown in FIG. 7E, the user's head is rotated to the left. Instead of keeping the spatial audio locked to the position of the user's head, device 702 adjusts the spatial audio to remain fixed with respect to the XR environment, as indicated by spatial audio indicators 709-3 to 709-9 maintaining their position from FIG. 7D. Accordingly, as the user moves their head, the user perceives the audio as having the same relative location in the XR environment. In some embodiments such as, for example, when device 702 is an HMD, particles 712 are spatially arranged around the viewpoint of user 701 and move relative to the viewpoint of the user as the particles move in the XR environment.

FIG. 7F depicts user 701 with their head still turned to the left with attention indicator 735 on representation 745a of person 745 at 4:01 into the meditation session. Virtual object 710 continues to contract and expand and is shown in the expanded state in FIG. 7F. In the embodiment depicted in FIGS. 7E and 7F, some of the criteria is met for outputting a reminder, but other criteria are not met. For example, the user's attention has remained outside of virtual object 710 for 10 seconds (which is more than the threshold of 80% of a 12-second time period), the total duration of the meditation session is 20 minutes (which is greater than the 10-minute threshold), and at least one minute has elapsed since the last guidance was output at the 0:30 mark of the meditation session (see FIG. 7D). However, in this embodiment, some criteria are not met and, therefore, device 702 does not output a reminder. For example, the five-minute threshold has not elapsed for the meditation session and there is less than one minute until the next guidance is output as depicted in FIG. 7G.

In FIG. 7G, the user has returned their attention to virtual object 710, and device 702 continues displaying the expanding and contracting animation of virtual object 710, with virtual object 710 shown in the contracted size in FIG. 7G. Five minutes have elapsed for the meditation session, which is the end of the threshold time for which device 702 does not output reminders. At the end of the five-minute threshold, device 702 outputs guidance 740-3 instructing user 701 to close their eyes. In some embodiments, device 702 does not output reminders during the first five minutes of the meditation session so that the user is not overwhelmed with feedback as they are becoming familiar with the meditation session and trying to relax and focus.

As depicted in FIG. 7H, person 745 and person 734 both enter physical environment 700 while device 702 continues to display the animated expanding and contracting of virtual object 710. Device 702 displays representations 745a and 734a of the people on virtual interface 705. At the 6:30 mark of the meditation session, user 701 again turns to focus on person 745 in a manner similar to that shown in FIGS. 7E and 7F and described above. User 701 continues to focus on person 745 until the 6:38 mark of the meditation session when user 701 turns forward to briefly focus on virtual object 710, as shown in FIG. 7I. At the 6:40 mark of the meditation session, user 701 then gazes to the right, without turning their head, to focus on person 734, as depicted in FIG. 7J. In FIG. 7J, schematic 707 includes line 731 representing the forward direction of the user's head and line 733 representing the direction of the user's gaze in FIG. 7J, which is angled approximately 45° to the right, relative to line 731, as the user focuses on person 734.

FIG. 7K1 depicts an embodiment in which device 702 outputs a reminder in response to detecting the reminder criteria are met. At the 6:42 mark, user 701 continues to focus on person 734, and not virtual object 710, and device 702 determines that the criteria are now met for outputting reminder 736 as shown in FIG. 7K. In the embodiment depicted in FIG. 7K1, device 702 determines that the reminder criteria are met because the user's attention has moved outside of virtual object 710, the user's attention remained outside of virtual object 710 for 80% of a 12-second time period (8 seconds looking to the left of virtual object 710 in FIG. 7H, then 2 seconds looking at virtual object 710 in FIG. 7I, and then 2 seconds looking to the right of virtual object 710 in FIG. 7K1), the five-minute period at the beginning of the meditation session has expired, the meditation session has a total duration of at least 10 minutes, at least one minute has elapsed since the last guidance was output, and at least one minute remains before the next guidance output. Because device 702 determines that the user's attention (represented by attention indicator 735) has changed direction (no longer looking at virtual object 710), and the reminder criteria are met, device 702 outputs (e.g., via audio output device 703) reminder 736, which is an audible reminder that is recorded in the coach's voice saying, "If you are distracted, use your breath to refocus." In some embodiments, the reminder is randomly (or pseudo-randomly) selected from a predetermined set of reminders. In some embodiments, the reminder criteria include a criterion that is met when the user's eyes are open. As shown in FIG. 7K 1, device 702 continues to display virtual object 710 with the expanding and contracting animation while outputting reminder 736.

In some embodiments, the techniques and user interface(s) described in FIGS. 7A-7N are provided by one or more of the devices described in FIGS. 1A-IP. For example, FIG. 7K2 illustrates an embodiment in which virtual interface 705 (e.g., as described in FIG. 7K1) is displayed on display module X702-1 of head-mounted device (HMD) X702. HMD X702 includes one or more sensors X702-2, which are used in a manner analogous to camera 702-2 of device 702. HMD X702 also includes audio generation component X703 (e.g., electronic component 1-112), which is used to provide audio output in a manner that is analogous to audio output device 703. In some embodiments, HMD X702 includes a pair of display modules that provide stereoscopic content to different eyes of the same user. For example, HMD X702 includes display module X702-1 (which provides content to a left eye of the user) and a second display module (which provides content to a right eye of the user). In some embodiments, the second display module displays a slightly different image than display module X702-1 to generate the illusion of stereoscopic depth.

FIG. 7K2 depicts an embodiment in which HMD X702 outputs a reminder in response to detecting the reminder criteria are met. At the 6:42 mark, user 701 continues to focus on person 734, and not virtual object 710, and HMD X702 determines that the criteria are now met for outputting reminder 736 as shown in FIG. 7K2. In the embodiment depicted in FIG. 7K2, HMD X702 determines that the reminder criteria are met because the user's attention has moved outside of virtual object 710, the user's attention remained outside of virtual object 710 for 80% of a 12-second time period (8 seconds looking to the left of virtual object 710 in FIG. 7H, then 2 seconds looking at virtual object 710 in FIG. 7I, and then 2 seconds looking to the right of virtual object 710 in FIG. 7K2), the five-minute period at the beginning of the meditation session has expired, the meditation session has a total duration of at least 10 minutes, at least one minute has elapsed since the last guidance was output, and at least one minute remains before the next guidance output. Because HMD X702 determines that the user's attention (represented by attention indicator 735) has changed direction (no longer looking at virtual object 710), and the reminder criteria are met, HMD X702 outputs (e.g., via audio output device X703) reminder 736, which is an audible reminder that is recorded in the coach's voice saying, "If you are distracted, use your breath to refocus." In some embodiments, the reminder is randomly (or pseudo-randomly) selected from a predetermined set of reminders. In some embodiments, the reminder criteria include a criterion that is met when the user's eyes are open. As shown in FIG. 7K2, HMD X702 continues to display virtual object 710 with the expanding and contracting animation while outputting reminder 736.

Any of the features, components, and/or parts, including the arrangements and configurations thereof shown in FIGS. 1B-1P can be included, either alone or in any combination, in HM D X702. For example, in some embodiments, HMD X702 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702-1 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X702 includes a sensor (e.g., X702-2) that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X702 includes one or more input devices, which include any of the features, components, and/or parts of any of first button 1-128, button 11.1.1-114, second button 1-132, and or dial or button 1-328, either alone or in any combination. In some embodiments, HMD X702 includes one or more audio output components (e.g., X703) (e.g., electronic component 1-112) for generating audio feedback (e.g., audio output including, for example, audio guidance (e.g., 740), reminders (e.g., 736), and/or spatial audio (e.g., 711)), optionally generated based on detected events and/or user inputs detected by the HMD X702.

FIGS. 7L-7M depict an embodiment in which device 702 has transitioned from the guided breathing portion to a third portion (e.g., a refection portion and/or a portion after the guided breathing portion) of the meditation session at about the 10:00 mark of the meditation session. Device 702 transitions from the guided breathing portion of the meditation session to the reflection portion and displays the virtual object in an exploded state in which particles 712 are displayed in a three-dimensional arrangement, as depicted in FIG. 7L. In some embodiments, device 702 displays the transition with an animated effect depicting particles 712 expanding from a configuration that forms virtual object 710, to the exploded, three-dimensional arrangement depicted in FIG. 7L. In some embodiments, device 702 outputs guidance or instruction to the user, for example, instructing the user to close their eyes, as device 702 transitions to the reflection portion of the meditation session.

In the reflection portion, device 702 prompts user 701 to focus on or contemplate a particular topic or theme and provides a combination of visual and audio effects to provide a soothing, relaxing environment to help the user focus on the topic. In some embodiments, the reflection portion builds on the relaxation of user 701 achieved during the guided breathing portion of the meditation session. During the reflection portion, device 702 continues to output the soundscape and displays particles 712 moving based on detecting the user breathing. When device 702 detects user 701 inhaling, the device displays particles 712 moving towards and/or around user 701. When device 702 detects user 701 exhaling, the device displays particles 712 moving away from user 701. FIGS. 7L and 7M depict examples of the displayed state of the meditation session based on detecting the user breathing.

During the reflection portion of the meditation session, device 702 continues to output the soundscape (represented, at least partially, by audio indicator 711) as the device outputs audio guidance 740 and displays particles 712 moving based on detected user breathing. In some embodiments, when the reflection portion starts, device 702 outputs audio guidance 740-4 prompting the user (in the voice of the coach) to focus on a particular topic or theme. Device 702 outputs the soundscape in spatial audio and adjusts audio characteristics of the soundscape during the reflection portion of the meditation session. For example, as particles 712 are moving towards the user, device 702 adjusts the spatial locations of the audio to sound as if particles 712 are moving closer towards user 701, and as particles 712 are moving away from the user, device 702 adjusts the spatial locations of the audio to sound as if particles 712 are moving away from user 701.

FIGS. 7L and 7M depict an example embodiment in which device 702 outputs a reminder during the reflection portion of the meditation session. In FIG. 7L, device 702 detects the user's attention (represented by attention indicator 735) at a target region 737 of virtual interface 705. In some embodiments, the target region is a center region of a virtual object (e.g., virtual object 710) and/or is a predefined point or region in the XR environment. In FIG. 7M, the user has been focusing on person 745 for at least the threshold amount of time to trigger a reminder (e.g., about 10 seconds). The location of the user's attention (represented by attention indicator 735) has moved outside of target region 737, which is represented by dashed circle 738. Dashed circle 738 is not displayed as part of the interface but is instead provided in the figures to indicate the location of target region 737.

In FIG. 7M, device 702 has determined that the user is distracted and that the criteria are met for outputting a reminder. For example, in the embodiment depicted in FIG. 7M, device 702 determines that the reminder criteria are met because the user's attention has moved outside of target region 737, the user's attention remained outside of target region 737 for 80% of the 12-second time period, the five-minute period at the beginning of the meditation session has expired, the meditation session has a total duration of at least 10 minutes, at least one minute has elapsed since the last guidance was output, and at least one minute remains before any future guidance output. Because device 702 determines that the user's attention (represented by attention indicator 735) has changed direction (no longer looking at target region 737), and the reminder criteria are met, device 702 outputs reminder 739, which is an audible reminder that is recorded in the coach's voice saying, "When you get distracted, refocus your attention by breathing." Device 702 outputs reminder 739 instructing the user to focus their attention on the meditation session. In some embodiments, device 702 does not output more than one reminder in a meditation session. For example, device 702 would not output reminder 739 if device 702 had previously output reminder 736. Reminder 739 is different from reminder 736 because device 702 selects reminders randomly (or pseudo-randomly) from a predetermined set of reminders in order to avoid becoming stale across meditation sessions.

FIG. 7N depicts device 702 transitioning from the reflection portion to a fourth portion (e.g., an outro portion and/or a portion after the reflection portion) of the meditation session. In some embodiments, the outro portion transitions the user out of the meditation session and brings the user's focus back to the physical world (or to a different experience in the XR environment). In some embodiments, device 702 displays particles 712 moving together (e.g., in an animated flying effect and/or in coordinated movement) to form virtual object 710. In some embodiments, device 702 reduces dimming effect 704 (e.g., reducing opacity of the dimming effect and/or otherwise reducing the dimming effect), thereby increasing visibility of the representation 700a of the physical environment 700 on device 702. In some embodiments, the transition to the outro portion is a reversal of the audio and visual effects provided in the transition from the introductory portion to the guided breathing portion. In some embodiments, device 702 dims the appearance of particles 712 and reduces the movement of the particles 712 from that in the guided breathing and reflection portions of the meditation session. In some embodiments, device 702 displays virtual object 710 pulsating in a manner similar to that in the introductory portion. In some embodiments, device 702 displays virtual object 710 with less movement than in the introductory portion.

As shown in FIG. 7N, when transitioning to the outro portion, device 702 transitions the soundscape audio from the spatial audio output to stereo, gradually decreases the volume of the soundscape (as indicated by the smaller size of audio indicator 711), and outputs audio guidance 740-5, in the coaches voice, prompting the user to increase their awareness of the environment around them. In some embodiments, device 702 outputs, via audio output device 703, a sound effect such as a ding or chime similar to when transitioning from the introductory portion to the guided breathing portion. In some embodiments, device 702 outputs the same audio when transitioning to the outro portion as when transitioning from the introductory portion to the guided breathing portion.

As depicted in FIG. 7N, device 702 displays menu 750 in the outro portion of the meditation session. Menu 750 includes text providing historical data for meditation sessions the user has experienced. Text 754 indicates that user 701 has spent 20 minutes in a meditation session today, and text 756 indicates that the user has experienced a meditation session at least once for three days in the past week. Other historical data can be provided such as, for example, a number of meditation sessions, a specific amount of time spent for each meditation session, and/or an average amount of time spent in meditation sessions. Menu 750 also includes coach indicator 752 indicating that the male coach provided the audio guidance 740 and reminders 736 and 739 for the meditation session. Menu 750 includes continue option 758, which is selectable to continue or extend the meditation session. Menu 750 also includes done option 760. In some embodiments, when the user selects done option 760, device 702 returns to the introductory portion of the meditation session (e.g., displaying the UI depicted in FIG. 7B and/or displaying a UI similar to that depicted in FIG. 713) or exits the meditation application (e.g., displaying a UI similar to that depicted in FIG. 7A or returning to a staging room or virtual home environment in the XR environment).

Additional descriptions regarding FIGS. 7A-7N are provided below in reference to method 800 described with respect to FIG. 8.

FIG. 8 is a flow diagram of an exemplary method 800 for providing reminders for computer-generated user experience sessions in an extended reality environment, in some embodiments. In some embodiments, method 800 is performed at a computer system (e.g., computer system 101 in FIG. 1A)(e.g., 702 and/or X702)(e.g., a smartphone, tablet, and/or head-mounted display generation component) that is in communication with one or more output generation components (e.g., display generation component 120 in FIGS. 1A, 3, and 4) (e.g., 702-1, X702-1, 703, and/or X703) (e.g., an audio generation component, an audio output device, a speaker, a bone conduction audio output device, a display generation component, a visual output device, a 3D display, a display having at least a portion that is transparent or translucent on which images can be projected (e.g., a see-through display), a projector, a heads-up display, a touchscreen, a display, and/or a display controller) and one or more sensors (e.g., 702-2 and/or X702-2) (e.g., a gyroscope, an accelerometer, a motion sensor, a movement sensor, a microphone, an infrared sensor, a camera sensor, a depth camera, a visible light camera, an eye-tracking sensor, a gaze-tracking sensor, a physiological sensor, and/or an image sensor). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

In method 800, while a user experience session is active (e.g., in an XR environment, in a non-XR environment)(e.g., outputting the user experience session using an application for the XR or non-XR environment that optionally includes guided instruction for breathing to relax and/or focus the user), the computer system (e.g., 702 and/or X702) detects (802), via the one or more sensors (e.g., 702-2 and/or X702-2), a change in direction of attention (e.g., 735) of a user (e.g., 701)(e.g., the user's head position and/or gaze has shifted or changed). In some embodiments, the user experience session includes ambient audio (e.g., background audio) while spoken guidance is provided in stereo audio. In some embodiments, the user experience session includes spatialized ambient audio (e.g., ambient audio that has a perceived spatial location relative to the user) and spatialized guidance audio (e.g., spoken guidance audio that has a perceived spatial location relative to the user). In some embodiments, the user experience session is provided as an XR experience in an XR environment.

In response (804) to detecting the change in direction of attention (e.g., 735) of the user (e.g., 701), the computer system (e.g., 702 and/or X702) performs the following steps. In accordance with a determination that the attention of the user (e.g., having the changed direction of attention) meets reminder criteria (e.g., the user's head position and/or gaze has moved outside of a predetermined target region, the user's head position and/or gaze has remained outside of the predetermined target region for a threshold amount of time, the user's eyes are open, and/or a timing criteria is met), the computer system (e.g., 702 and/or X702) outputs (806), via the one or more output generation components (e.g., 703 and/or X703), a reminder (e.g., 736 and/or 739) (e.g., an audible reminder and/or a visual reminder) to focus attention (e.g., focus the user's head position and/or gaze) on the user experience session (e.g., on a displayed portion of the user experience session) (e.g., while continuing to output the user experience session). In accordance with a determination that the attention of the user does not meet the reminder criteria (e.g., the user's head position and/or gaze has not moved outside of a predetermined target region, the user's head position and/or gaze has not remained outside of the predetermined target region for a threshold amount of time, the user's eyes are not open, and/or a timing criteria is not met), the computer system forgoes (808) outputting the reminder to focus attention (e.g., focus the user's head position and/or gaze) on the user experience session (e.g., while continuing to output the user experience session). Outputting the reminder to focus attention on the user experience session based on whether the attention of the user meets the reminder criteria provides improved feedback instructing a user to engage in the user experience session.

In some embodiments, the direction of attention (e.g., 735) of the user (e.g., 701) is based (e.g., at least in part) on an orientation (e.g., position) of the user's head (e.g., a direction in which the user's head is facing or positioned (e.g., as determined based on a direction and/or position of the user's face)). Determining the direction of attention of the user based on an orientation of the user's head reduces inputs at the computer system by enabling the computer system to determine whether a user is distracted or focused on the user experience without having to prompt the user for the information and to provide feedback encouraging the user to focus on the user experience session. In some embodiments, detecting the change in direction of attention of the user includes detecting (e.g., via the one or more sensors (e.g., 702-2 and/or X702-2)) a change in orientation (e.g., direction and/or position) of the head and/or face of the user (e.g., relative to a displayed element of the user experience session (e.g., 710 and/or 712)). In some embodiments, the direction of attention of the user is determined based on a direction in which the head and/or face of the user is facing. In some embodiments, the computer system determines a change in direction of attention of the user in response to detecting a change in direction of the user's head and/or face (e.g., a change in yaw, direction, and/or a directional movement of the head along an x-axis; and/or a change in pitch, tilt, and/or a directional movement of the head along a y-axis).

In some embodiments, the direction of attention (e.g., 735) of the user (e.g., 701) is based (e.g., at least in part) on a direction of the user's gaze (e.g., eye gaze). Determining the direction of attention of the user based on a direction of the user's gaze reduces inputs at the computer system by enabling the computer system to determine whether a user is distracted or focused on the user experience without having to prompt the user for the information and to provide feedback encouraging the user to focus on the user experience session. In some embodiments, detecting the change in direction of attention of the user includes detecting (e.g., via the one or more sensors (e.g., 702-2 and/or X702-2)) a change in gaze direction of the user's eyes (e.g., relative to a displayed element of the user experience session (e.g., 710 and/or 712)) (e.g., a departure of the user's gaze from a predetermined object or region (e.g., 737) of the user experience session). In some embodiments, the computer system determines a change in direction of attention of the user in response to detecting a change in the user's gaze direction.

In some embodiments, the reminder criteria include a first criterion that is met (e.g., satisfied) when the direction of the attention (e.g., 735) of the user (e.g., 701) is located outside of a predetermined region (e.g., 737) (e.g., a target region) of the user experience session (e.g., a central region of the user experience session and/or a displayed element of the user experience session). Including the first criterion that is met when the direction of the attention of the user is located outside of the predetermined region of the user experience session provides improved feedback by ensuring that reminders to focus on the user experience session are output when criteria are met indicating that the user is distracted. In some embodiments, the computer system (e.g., 702 and/or X702) determines that the first criterion is met when the user's gaze moves outside of the predetermined region (e.g., the target region) of the user experience session and/or when the user's head moves to a position that is not facing the predetermined region of the user experience session. In some embodiments, the target region is a predefined region within the user experience session in the XR environment. In some embodiments, the target region is a displayed element (e.g., 710 and/or 712) in the user experience session. In some embodiments, the target region is a predefined region of a displayed element in the user experience session.

In some embodiments, the reminder criteria include a second criterion (e.g., different from the first criterion) that is based on an amount of time that the direction of the attention (e.g., 735) of the user (e.g., 701) is located outside of the predetermined region (e.g., 737) of the user experience session. Including the second criterion that is based on an amount of time that the direction of the attention of the user is located outside of the predetermined region of the user experience session provides improved feedback by ensuring that reminders to focus on the user experience session are output when criteria are met indicating that the user is distracted. In some embodiments, the second criterion is met when the direction of the attention of the user is located outside of the predetermined region of the user experience session for a threshold amount of time. In some embodiments, the threshold amount of time is based on a percentage (e.g., 60%, 70%, 80%, or 90%) of an amount of time (e.g., 5 seconds, 8 seconds, 10 seconds, 12 seconds, or 15 seconds) for which the direction of the user's attention is located outside of the predetermined region. For example, in some embodiments, the second criterion is met when the direction of the user's attention is located outside of the predetermined region for 80% of a 12 second period, which is 9.6 seconds of the 12 second period.

In some embodiments, the predetermined region (e.g., 737) (e.g., target region) of the user experience session is based on (e.g., corresponds to and/or is co-located with) a displayed location of a user interface object (e.g., 710 and/or 712) (e.g., cube, sphere, orb, cloud, pyramid, triangle, and/or abstract object) of the user experience session. Basing the predetermined region of the user experience session on a displayed location of a user interface object of the user experience session provides improved feedback by ensuring that reminders to focus on the user experience session are output when criteria are met indicating that the user is distracted. In some embodiments, the user interface object (e.g., 710) has a plurality of particles (e.g., 712)(e.g., triangles, circles, squares, small pyramids, and/or small cubes) forming the user interface object. In some embodiments, the predetermined region is based on a displayed location of a particle forming the user interface object.

In some embodiments, the user interface object (e.g., 710 and/or 712) has an animated appearance. Displaying the user interface object having an animated appearance provides improved feedback about a state of the computer system (e.g., a state of providing the user experience session). In some embodiments, the computer system (e.g., 702 and/or X702) displays the user interface object having an animated appearance. For example, the computer system displays the user interface object having an animated effect such as a floating and/or swaying animated appearance of the user interface object and/or the particles forming the user interface object. In some embodiments, the animated appearance is based on a breathing cadence (e.g., a pattern of inhaling and exhaling) of the user such as, for example, a detected breathing cadence or an estimated breathing cadence. In some embodiments, the estimated breathing cadence is determined by the computer system (e.g., a setting that is set by an application for providing the user experience session and/or by an operating system of the computer system) or is selected by the user. In some embodiments, the user interface object is animated to appear to be expanding, growing, and/or moving towards the user (including, optionally, floating and/or swaying) as the user inhales, and contracting, shrinking, and/or moving away from the user as the user exhales. In some embodiments, the user interface object is a focus object that has a world-locked (e.g., environment-locked) location corresponding to a viewpoint of the user of the computer system in an XR environment (e.g., the viewpoint of the user is based on (e.g., selected in reference to and/or anchored to) a location and/or object in an XR environment).

In some embodiments, the first criterion is met when the direction of attention (e.g., 735) of the user (e.g., 701) is horizontally displaced (e.g., along an x-axis) from the predetermined region (e.g., 737) (e.g., a target region and/or a displayed location of the user interface object) of the user experience session (e.g., for at least a threshold amount of time). Meeting the first criterion when the direction of attention of the user is horizontally displaced from the predetermined region of the user interface object of the user experience session provides improved feedback by ensuring that reminders to focus on the user experience session are output when criteria are met indicating that the user is distracted. In some embodiments, the first criterion is met when a sum of time for which the direction of the attention of the user is located to the left or right of the target region and/or the user interface object is greater than (or equal to) a threshold amount of time for triggering the reminder.

In some embodiments, the first criterion is met when the direction of attention (e.g., 735) of the user (e.g., 701) has at least a threshold angular displacement (e.g., 35 degrees, 40 degrees, 45 degrees, 50 degrees, or 55 degrees) relative to a point in space (e.g., 735 and/or 712) (e.g., a point in the XR environment) in the user experience session (e.g., for at least a threshold amount of time). Meeting the first criterion when the direction of attention of the user has at least a threshold angular displacement relative to a point in space in the user experience session provides improved feedback by ensuring that reminders to focus on the user experience session are output when criteria are met indicating that the user is distracted. In some embodiments, the first criterion is met when the direction of the attention of the user is angled (e.g., yaw angle) by a threshold amount (e.g., 45 degrees) to either side of the point in space (e.g., a location in the XR environment, a point on a user interface object in the user experience session, and/or a point on a particle comprising the user interface object in the user experience session).

In some embodiments, the reminder criteria include progress criteria that are based on a state of progress of the user experience session (e.g., one or more criteria that are based on progression of the user experience session). Including the progress criteria that are based on a state of progress of the user experience session provides improved feedback by tailoring the output of reminders so that they are appropriate for the user's state of progress of user experience session. In some embodiments, the progress criteria include a first progress criterion that is met when the user experience session has progressed for at least a threshold amount of time (e.g., 3 minutes, 4 minutes, 5 minutes, or 6 minutes) (e.g., as shown in FIGS. 711-7M). Including the first progress criterion that is met when the user experience session has progressed for at least a threshold amount of time provides improved feedback by tailoring the output of reminders so that they are appropriate for the user's state of progress of user experience session and avoiding inundating the user with feedback while the user is adjusting to the user experience session. In some embodiments, the threshold amount of time corresponds to a respective stage or stages of the user experience session such as an introductory stage, a first stage, and/or a second stage of the user experience session. In some embodiments, the reminder is not output if the user experience session has not progressed for at least the threshold amount of time. For example, in some embodiments, a reminder is not output (even if other reminder criteria are met) if the user experience session has not progressed for at least 5 minutes or past a first stage of the user experience session.

In some embodiments, in response to determining that the user experience session has progressed for the threshold amount of time, the computer system (e.g., 702 and/or X702) prompts the user to close their eyes (e.g., as depicted in FIG. 7G)(e.g., outputting, via the one or more output generation components, an audible and/or visual output (e.g., 740-3) instructing the user to close their eyes). Prompting the user to close their eyes in response to determining that the user experience session has progressed for the threshold amount of time provides improved feedback by guiding the user to successfully complete the user experience session. In some embodiments, the computer system outputs a suggestion for the user to close their eyes at or near the time threshold for the user experience session.

In some embodiments, the progress criteria include a second progress criterion that is met when the user experience session is at least a threshold duration (e.g., the user experience session is selected to have at least a 10-minute, 15-minute, or 20-minute duration). Including the second progress criterion that is met when the user experience session is at least a threshold duration provides improved feedback by tailoring the output of reminders so that they are appropriate for the user's state of progress of user experience session and avoiding inundating and distracting the user with feedback for shorter user experience sessions. In some embodiments, the computer system (e.g., 702 and/or X702) does not output a reminder (e.g., 736 and/or 739) for a user experience session that is less than the threshold duration (e.g., even when other reminder criteria are met). For example, the computer system does not output a reminder for a user experience session that is selected to have a live-minute duration.

In some embodiments, the progress criteria include a third progress criterion that is met when at least a threshold amount of time (e.g., 15 seconds, 30 seconds, 45 seconds, 60 seconds, 75 seconds, or 90 seconds) has elapsed since output of previous (e.g., the most recent) feedback (e.g., at least the threshold amount of time has passed since the computer system previously output the most recent guidance or instruction). Including the third progress criterion that is met when at least a threshold amount of time has elapsed since output of previous feedback provides improved feedback by tailoring the output of reminders so that they are appropriate for the user's state of progress of user experience session and avoiding inundating the user with feedback while the user is experiencing the user experience session. In some embodiments the computer system (e.g., 702 and/or X702) does not output a reminder (e.g., 736 and/or 739) to focus on the user experience session if the threshold amount of time has not passed since the most recent guidance or instruction was provided for the user experience session.

In some embodiments, the progress criteria include a fourth progress criterion that is met when an amount of time until future feedback (e.g., the next feedback) is greater than a respective threshold amount of time (e.g., 15 seconds, 30 seconds, 45 seconds, 60 seconds, 75 seconds, or 90 seconds). Including the fourth progress criterion that is met when an amount of time until future feedback is greater than a respective threshold amount of time provides improved feedback by tailoring the output of reminders so that they are appropriate for the user's state of progress of user experience session and avoiding inundating the user with feedback while the user is experiencing the user experience session. In some embodiments, the computer system (e.g., 702 and/or X702) does not output a reminder (e.g., 736 and/or 739) to focus on the user experience if there is less than the respective threshold amount of time until the next guidance or instruction for the user experience session.

In some embodiments, the reminder criteria include a third criterion (e.g., different from the first and second criteria) that is met when the user's eyes are open (e.g., open more than a threshold amount). Including the third criterion that is met when the user's eyes are open provides improved feedback by ensuring that reminders to focus on the user experience session are output when criteria are met indicating that the user is distracted. In some embodiments, the computer system (e.g., 702 and/or X702) randomly or pseudorandomly selects the reminder (e.g., 736 and/or 739) to focus attention on the user experience session from a set of available reminders (e.g., a superset of audio reminders). Selecting the reminder randomly or pseudorandomly from a set of available reminders enables the computer system to provide a more realistic user experience while saving storage space by not requiring multiple different complete audio tracks and/or visual components to be stored and selected for playback. In some embodiments, the reminder is randomly selected from a set of curated reminders that have been recorded for the user experience session. In some embodiments, the set of reminders are recorded with a same voice (e.g., a voice that corresponds to a selected audio source (e.g., narrator, speaker, guide, coach, and/or person)), but having different intonation, inflection, pitch, cadence, tone, accent, and/or dialog (e.g., spoken words, instructions, and/or guidance).

In some embodiments, the one or more output generation components include a display generation component (e.g., 702-1 and/or X702-1) (e.g., a visual output device, a 3D display, a display having at least a portion that is transparent or translucent on which images can be projected (e.g., a see-through display), a projector, a heads-up display, and/or a display controller) and an audio output component (e.g., 703 and/or X703) (e.g., an audio output device, a speaker, and/or a bone conduction audio output device). In some embodiments, while the user experience session is active, the computer system (e.g., 702 and/or X702) displays, via the display generation component, a user interface (e.g., 705) for the user experience session (e.g., a UI of an application of the XR environment that optionally includes guided instruction (e.g., for breathing to relax and/or focus the user)) that includes one or more visual components (e.g., 710 and/or 712) for the user experience session (e.g., a user interface object for the user experience session and/or particles forming the user interface object for the user experience session). The computer system detects a set of one or more conditions for updating the user experience session (e.g., progression of the user experience session, an amount of elapsed time, and/or change in the direction of the user's attention). In response to detecting the set of one or more conditions for updating the user experience session, the computer system outputs, via the audio output component, audio guidance (e.g., 740-1, 740, 736, and/or 739) (e.g., audio instructions, feedback, dialog, and/or a reminder) for the user experience session; and updates display of the one or more visual components for the user experience session (e.g., displaying the user interface object and/or particles having a different appearance, displayed behavior, and/or displayed state). Outputting the audio guidance for the user experience session and updating display of the one or more visual components for the user experience session in response to detecting the set of one or more conditions for updating the user experience session provides improved feedback about a state of the computer system (e.g., a state of providing the user experience session). In some embodiments, the computer system updates or changes the visual components of the user experience session in concert with audio guidance. In some embodiments, the visual components are updated for a first type of audio guidance (e.g., guidance given when progressing to a different stage of the user experience session) and are not updated for a different type of audio guidance (e.g., a reminder).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a users general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more output generation components and one or more sensors, the computer system comprising:
one or more processors; and
memory storing one or more programs configured to be executed by the one or more processors, the one or more programs including instructions for:
while a user experience session is active, detecting, via the one or more sensors, a change in direction of attention of a user; and
in response to detecting the change in direction of attention of the user:
in accordance with a determination that the attention of the user meets reminder criteria, outputting, via the one or more output generation components, a reminder to focus attention on the user experience session, wherein the reminder criteria include progress criteria that are based on a state of progress of the user experience session, and wherein the progress criteria include a first progress criterion that is met when an amount of time until future feedback is greater than a respective first threshold amount of time; and
in accordance with a determination that the attention of the user does not meet the reminder criteria, forgoing outputting the reminder to focus attention on the user experience session.

2. The computer system of claim 1, wherein the direction of attention of the user is based on an orientation of the user's head.

3. The computer system of claim 1, wherein the direction of attention of the user is based on a direction of the user's gaze.

4. The computer system of claim 1, wherein the reminder criteria include a first criterion that is met when the direction of the attention of the user is located outside of a predetermined region of the user experience session.

5. The computer system of claim 4, wherein the reminder criteria include a second criterion that is based on an amount of time that the direction of the attention of the user is located outside of the predetermined region of the user experience session.

6. The computer system of claim 4, wherein the predetermined region of the user experience session is based on a displayed location of a user interface object of the user experience session.

7. The computer system of claim 6, wherein the user interface object has an animated appearance.

8. The computer system of claim 4, wherein the first criterion is met when the direction of attention of the user is horizontally displaced from the predetermined region of the user experience session.

9. The computer system of claim 4, wherein the first criterion is met when the direction of attention of the user has at least a threshold angular displacement relative to a point in space in the user experience session.

10. The computer system of claim 1, wherein the progress criteria include a second progress criterion that is met when the user experience session has progressed for at least a second threshold amount of time.

11. The computer system of claim 10, the one or more programs further including instructions for:
in response to determining that the user experience session has progressed for the second threshold amount of time, prompting the user to close their eyes.

12. The computer system of claim 1, wherein the progress criteria include a third progress criterion that is met when the user experience session is at least a threshold duration.

13. The computer system of claim 1, wherein the progress criteria include a fourth progress criterion that is met when at least a third threshold amount of time has elapsed since output of previous feedback.

14. The computer system of claim 1, wherein the reminder criteria include a third criterion that is met when the user's eyes are open.

15. The computer system of claim 1, wherein the reminder to focus attention on the user experience session is selected randomly or pseudorandomly from a set of available reminders.

16. The computer system of claim 1, wherein the one or more output generation components include a display generation component and an audio output component, the one or more programs further including instructions for:
　while the user experience session is active:
　　displaying, via the display generation component, a user interface for the user experience session that includes one or more visual components for the user experience session;
　　detecting a set of one or more conditions for updating the user experience session; and
　　in response to detecting the set of one or more conditions for updating the user experience session:
　　　outputting, via the audio output component, audio guidance for the user experience session; and
　　　updating display of the one or more visual components for the user experience session.

17. A non-transitory computer-readable storage medium storing one or more programs configured to be executed by one or more processors of a computer system that is in communication with one or more output generation components and one or more sensors, the one or more programs including instructions for:
　while a user experience session is active, detecting, via the one or more sensors, a change in direction of attention of a user; and
　in response to detecting the change in direction of attention of the user:
　　in accordance with a determination that the attention of the user meets reminder criteria, outputting, via the one or more output generation components, a reminder to focus attention on the user experience session, wherein the reminder criteria include progress criteria that are based on a state of progress of the user experience session, and wherein the progress criteria include a first progress criterion that is met when an amount of time until future feedback is greater than a respective threshold amount of time; and
　　in accordance with a determination that the attention of the user does not meet the reminder criteria, forgoing outputting the reminder to focus attention on the user experience session.

18. The non-transitory computer-readable storage medium of claim 17, wherein the direction of attention of the user is based on an orientation of the user's head.

19. The non-transitory computer-readable storage medium of claim 17, wherein the direction of attention of the user is based on a direction of the user's gaze.

20. The non-transitory computer-readable storage medium of claim 17, wherein the reminder criteria include a first criterion that is met when the direction of the attention of the user is located outside of a predetermined region of the user experience session.

21. The non-transitory computer-readable storage medium of claim 20, wherein the reminder criteria include a second criterion that is based on an amount of time that the direction of the attention of the user is located outside of the predetermined region of the user experience session.

22. The non-transitory computer-readable storage medium of claim 20, wherein the predetermined region of the user experience session is based on a displayed location of a user interface object of the user experience session.

23. The non-transitory computer-readable storage medium of claim 22, wherein the user interface object has an animated appearance.

24. The non-transitory computer-readable storage medium of claim 20, wherein the first criterion is met when the direction of attention of the user is horizontally displaced from the predetermined region of the user experience session.

25. The non-transitory computer-readable storage medium of claim 20, wherein the first criterion is met when the direction of attention of the user has at least a threshold angular displacement relative to a point in space in the user experience session.

26. The non-transitory computer-readable storage medium of claim 17, wherein the progress criteria include a second progress criterion that is met when the user experience session has progressed for at least a second threshold amount of time.

27. The non-transitory computer-readable storage medium of claim 26, the one or more programs further including instructions for:
　in response to determining that the user experience session has progressed for the second threshold amount of time, prompting the user to close their eyes.

28. The non-transitory computer-readable storage medium of claim 17, wherein the progress criteria include a third progress criterion that is met when the user experience session is at least a threshold duration.

29. The non-transitory computer-readable storage medium of claim 17, wherein the progress criteria include a fourth progress criterion that is met when at least a third threshold amount of time has elapsed since output of previous feedback.

30. The non-transitory computer-readable storage medium of claim 17, wherein the reminder criteria include a third criterion that is met when the user's eyes are open.

31. The non-transitory computer-readable storage medium of claim 17, wherein the reminder to focus attention on the user experience session is selected randomly or pseudorandomly from a set of available reminders.

32. The non-transitory computer-readable storage medium of claim 17, wherein the one or more output generation components include a display generation component and an audio output component, the one or more programs further including instructions for:
　while the user experience session is active:
　　displaying, via the display generation component, a user interface for the user experience session that includes one or more visual components for the user experience session;
　　detecting a set of one or more conditions for updating the user experience session; and
　　in response to detecting the set of one or more conditions for updating the user experience session:
　　　outputting, via the audio output component, audio guidance for the user experience session; and
　　　updating display of the one or more visual components for the user experience session.

33. A method, comprising:
　at a computer system that is in communication with one or more output generation components and one or more sensors:

while a user experience session is active, detecting, via the one or more sensors, a change in direction of attention of a user; and in response to detecting the change in direction of attention of the user:
  in accordance with a determination that the attention of the user meets reminder criteria, outputting, via the one or more output generation components, a reminder to focus attention on the user experience session, wherein the reminder criteria include progress criteria that are based on a state of progress of the user experience session, and wherein the progress criteria include a first progress criterion that is met when an amount of time until future feedback is greater than a respective threshold amount of time; and
  in accordance with a determination that the attention of the user does not meet the reminder criteria, forgoing outputting the reminder to focus attention on the user experience session.

34. The method of claim 33, wherein the direction of attention of the user is based on an orientation of the user's head.

35. The method of claim 33, wherein the direction of attention of the user is based on a direction of the user's gaze.

36. The method of claim 33, wherein the reminder criteria include a first criterion that is met when the direction of the attention of the user is located outside of a predetermined region of the user experience session.

37. The method of claim 36, wherein the reminder criteria include a second criterion that is based on an amount of time that the direction of the attention of the user is located outside of the predetermined region of the user experience session.

38. The method of claim 36, wherein the predetermined region of the user experience session is based on a displayed location of a user interface object of the user experience session.

39. The method of claim 38, wherein the user interface object has an animated appearance.

40. The method of claim 36, wherein the first criterion is met when the direction of attention of the user is horizontally displaced from the predetermined region of the user experience session.

41. The method of claim 36, wherein the first criterion is met when the direction of attention of the user has at least a threshold angular displacement relative to a point in space in the user experience session.

42. The method of claim 33, wherein the progress criteria include a second progress criterion that is met when the user experience session has progressed for at least a second threshold amount of time.

43. The method of claim 42, further comprising:
  in response to determining that the user experience session has progressed for the second threshold amount of time, prompting the user to close their eyes.

44. The method of claim 33, wherein the progress criteria include a third progress criterion that is met when the user experience session is at least a threshold duration.

45. The method of claim 33, wherein the progress criteria include a fourth progress criterion that is met when at least a third threshold amount of time has elapsed since output of previous feedback.

46. The method of claim 33, wherein the reminder criteria include a third criterion that is met when the user's eyes are open.

47. The method of claim 33, wherein the reminder to focus attention on the user experience session is selected randomly or pseudorandomly from a set of available reminders.

48. The method of claim 33, wherein the one or more output generation components include a display generation component and an audio output component, further comprising:
  while the user experience session is active:
    displaying, via the display generation component, a user interface for the user experience session that includes one or more visual components for the user experience session;
    detecting a set of one or more conditions for updating the user experience session; and
    in response to detecting the set of one or more conditions for updating the user experience session:
      outputting, via the audio output component, audio guidance for the user experience session; and
      updating display of the one or more visual components for the user experience session.

* * * * *